US008018501B2

(12) United States Patent  (10) Patent No.: US 8,018,501 B2
Sasaki  (45) Date of Patent: Sep. 13, 2011

(54) IMAGE PROCESSING APPARATUS, COMPUTER-READABLE RECORDING MEDIUM RECORDING IMAGE PROCESSING PROGRAM, AND IMAGE PROCESSING METHOD

(75) Inventor: Hiroshi Sasaki, Hachioji (JP)

(73) Assignee: Olympus Corporation, Tokyo (JP)

( * ) Notice: Subject to any disclaimer, the term of this patent is extended or adjusted under 35 U.S.C. 154(b) by 423 days.

(21) Appl. No.: 12/345,381

(22) Filed: Dec. 29, 2008

(65) Prior Publication Data

US 2009/0115870 A1  May 7, 2009

Related U.S. Application Data

(63) Continuation of application No. PCT/JP2007/062132, filed on Jun. 15, 2007.

(30) Foreign Application Priority Data

Jun. 29, 2006  (JP) ................................. 2006-180434
Feb. 20, 2007  (JP) ................................. 2007-039922

(51) Int. Cl.
*H04N 9/73* (2006.01)
(52) U.S. Cl. ..................................... 348/223.1; 382/300
(58) Field of Classification Search ............... 348/223.1; 382/300
See application file for complete search history.

(56) References Cited

U.S. PATENT DOCUMENTS

| 5,373,322 | A   | * | 12/1994 | Laroche et al. | 348/273   |
|-----------|-----|---|---------|----------------|-----------|
| 5,382,976 | A   |   | 1/1995  | Hibbard        |           |
| 6,570,616 | B1  | * | 5/2003  | Chen           | 348/272   |
| 7,391,903 | B2  | * | 6/2008  | Ishiga         | 382/167   |
| 7,551,214 | B2  | * | 6/2009  | Hasegawa       | 348/280   |
| 7,710,437 | B2  | * | 5/2010  | Kang           | 345/606   |
| 7,825,965 | B2  | * | 11/2010 | Achong et al.  | 348/246   |
| 2006/0092298 | A1 |   | 5/2006  | Ishiga         |           |
| 2007/0013794 | A1 | * | 1/2007  | Tsuruoka       | 348/241   |
| 2010/0086202 | A1 | * | 4/2010  | Omata et al.   | 382/162   |
| 2010/0134661 | A1 | * | 6/2010  | Shima          | 348/252   |
| 2011/0069192 | A1 | * | 3/2011  | Sasaki         | 348/222.1 |

FOREIGN PATENT DOCUMENTS

| EP | 1 641 283 A1 | 3/2006  |
|----|--------------|---------|
| JP | 08-237672    | 9/1996  |
| JP | 11-275373    | 10/1999 |
| JP | 2005-072786  | 3/2005  |
| WO | 2004/112401  | 12/2004 |

\* cited by examiner

*Primary Examiner* — King Poon
*Assistant Examiner* — Abdelaaziz Tissire
(74) *Attorney, Agent, or Firm* — Volpe and Koeing, P.C.

(57) ABSTRACT

An image processing apparatus includes: interpolation G calculating units that calculate a plurality of types of G interpolation candidates $G_t$ for an X (X is R or B) pixel of a G pixel missing position in an RGB Bayer array image; subtracting units that calculate a plurality of types of color difference candidates $X-G_t$ based on the G interpolation candidates $G_t$; and surrounding similarity calculating units, a determining unit, and a color difference selecting unit that calculate a color difference similarity based on the color difference candidates $X-G_t$ and color difference candidates $X-G_t$ of X calculated for surrounding positions based on G interpolation candidates $G_t$ of a same type t and that select a color difference candidate $X-G_p$ calculated based on a G interpolation candidate $G_p$ among the plurality of types of G interpolation candidates $G_t$ in accordance with the color difference similarity.

37 Claims, 19 Drawing Sheets

FIG.3
*103:* COLOR DIFFERENCE INTERPOLATION PROCESSING UNIT
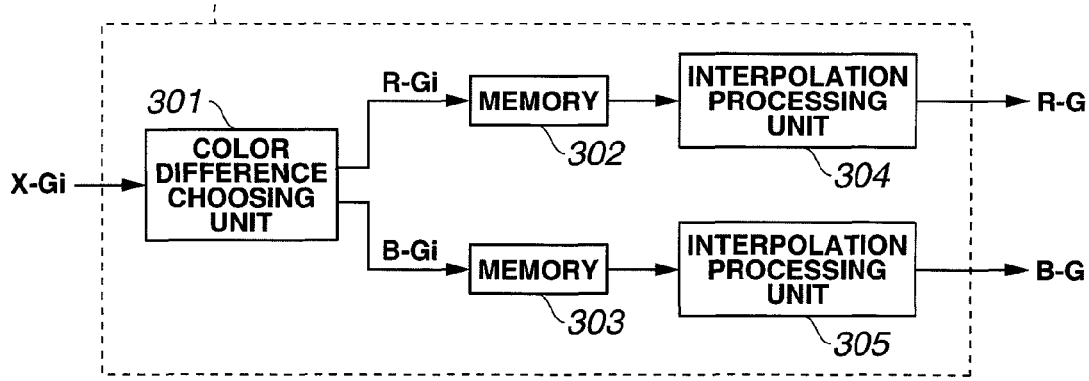
FIG.4
*104:* RGB CALCULATING UNIT
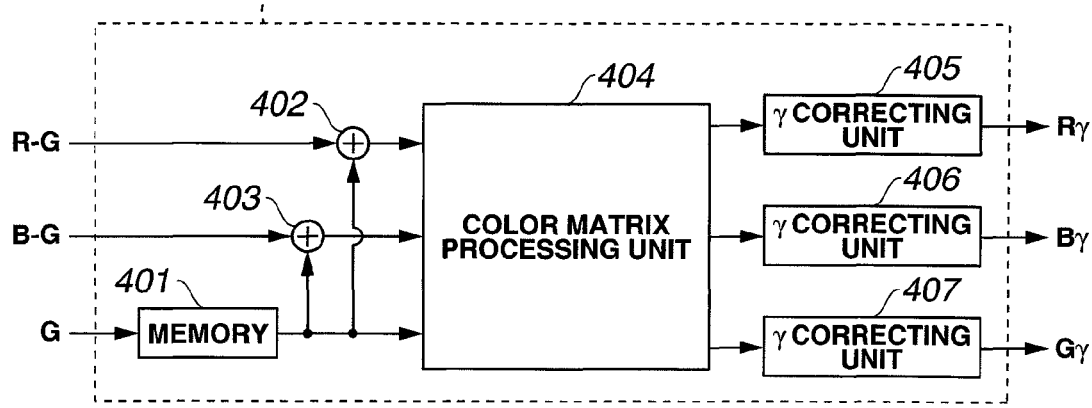
FIG.5
| Rs | Gs | Rs | Gs | Rs | Gs |
|----|----|----|----|----|----|
| Gs | Bs | Gs | Bs | Gs | Bs |
| Rs | Gs | Rs | Gs | Rs | Gs |
| Gs | Bs | Gs | Bs | Gs | Bs |
| Rs | Gs | Rs | Gs | Rs | Gs |
| Gs | Bs | Gs | Bs | Gs | Bs |

FIG.6
| Gi | Gs | Gi | Gs | Gi | Gs |
|----|----|----|----|----|----|
| Gs | Gi | Gs | Gi | Gs | Gi |
| Gi | Gs | Gi | Gs | Gi | Gs |
| Gs | Gi | Gs | Gi | Gs | Gi |
| Gi | Gs | Gi | Gs | Gi | Gs |
| Gs | Gi | Gs | Gi | Gs | Gi |
FIG.7
| R-Gi | 0 | R-Gi | 0 | R-Gi | 0 |
|------|---|------|---|------|---|
| 0 | B-Gi | 0 | B-Gi | 0 | B-Gi |
| R-Gi | 0 | R-Gi | 0 | R-Gi | 0 |
| 0 | B-Gi | 0 | B-Gi | 0 | B-Gi |
| R-Gi | 0 | R-Gi | 0 | R-Gi | 0 |
| 0 | B-Gi | 0 | B-Gi | 0 | B-Gi |
FIG.8
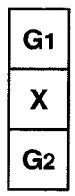
FIG.9
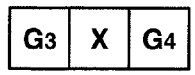

| X-Gv<br>(k-2, l-2) | | X-Gv<br>(k, l-2) | | X-Gv<br>(k+2, l-2) |
|---|---|---|---|---|
| | | | | |
| X-Gv<br>(k-2, l) | | X-Gv<br>(k, l) | | X-Gv<br>(k+2, l) |
| | | | | |
| X-Gv<br>(k-2, l+2) | | X-Gv<br>(k, l+2) | | X-Gv<br>(k+2, l+2) |

| X-Gh<br>(k-2, l-2) | | X-Gh<br>(k, l-2) | | X-Gh<br>(k+2, l-2) |
|---|---|---|---|---|
| | | | | |
| X-Gh<br>(k-2, l) | | X-Gh<br>(k, l) | | X-Gh<br>(k+2, l) |
| | | | | |
| X-Gh<br>(k-2, l+2) | | X-Gh<br>(k, l+2) | | X-Gh<br>(k+2, l+2) |

FIG.13

| X-Ga (k-2, l-2) | | X-Ga (k, l-2) | | X-Ga (k+2, l-2) |
|---|---|---|---|---|
| | | | | |
| X-Ga (k-2, l) | | X-Ga (k, l) | | X-Ga (k+2, l) |
| | | | | |
| X-Ga (k-2, l+2) | | X-Ga (k, l+2) | | X-Ga (k+2, l+2) |

FIG.20

|  | G5 |  | G7 |  |
|---|---|---|---|---|
| G9 |  | G1 |  | G10 |
|  | G3 | X | G4 |  |
| G11 |  | G2 |  | G12 |
|  | G6 |  | G8 |  |

FIG.21

| X-Gd (k-2, l-2) |  | X-Gd (k, l-2) |  | X-Gd (k+2, l-2) |
|---|---|---|---|---|
|  |  |  |  |  |
| X-Gd (k-2, l) |  | X-Gd (k, l) |  | X-Gd (k+2, l) |
|  |  |  |  |  |
| X-Gd (k-2, l+2) |  | X-Gd (k, l+2) |  | X-Gd (k+2, l+2) |

FIG.24

| | Gs (i-1, j-2) | X (i, j-2) | Gs (i+1, j-2) | |
|---|---|---|---|---|
| Gs (i-2, j-1) | | Gs (i, j-1) | | Gs (i+2, j-1) |
| X (i-2, j) | Gs (i-1, j) | X (i, j) | Gs (i+1, j) | X (i+2, j) |
| Gs (i-2, j+1) | | Gs (i, j+1) | | Gs (i+2, j+1) |
| | Gs (i-1, j+2) | X (i, j+2) | Gs (i+1, j+2) | |

FIG.27

| X-Gv (k-2, l-2) |  | X-Gv (k, l-2) |  | X-Gv (k+2, l-2) |
|---|---|---|---|---|
|  | X^-Gv (k-1, l-1) |  | X^-Gv (k+1, l-1) |  |
| X-Gv (k-2, l) |  | X-Gv (k, l) |  | X-Gv (k+2, l) |
|  | X^-Gv (k-1, l+1) |  | X^-Gv (k+1, l+1) |  |
| X-Gv (k-2, l+2) |  | X-Gv (k, l+2) |  | X-Gv (k+2, l+2) |

FIG.28

| X-Gh (k-2, l-2) |  | X-Gh (k, l-2) |  | X-Gh (k+2, l-2) |
|---|---|---|---|---|
|  | X^-Gh (k-1, l-1) |  | X^-Gh (k+1, l-1) |  |
| X-Gh (k-2, l) |  | X-Gh (k, l) |  | X-Gh (k+2, l) |
|  | X^-Gh (k-1, l+1) |  | X^-Gh (k+1, l+1) |  |
| X-Gh (k-2, l+2) |  | X-Gh (k, l+2) |  | X-Gh (k+2, l+2) |

FIG.29

| X-Ga (k-2, l-2) |  | X-Ga (k, l-2) |  | X-Ga (k+2, l-2) |
|---|---|---|---|---|
|  | X^-Ga (k-1, l-1) |  | X^-Ga (k+1, l-1) |  |
| X-Ga (k-2, l) |  | X-Ga (k, l) |  | X-Ga (k+2, l) |
|  | X^-Ga (k-1, l+1) |  | X^-Ga (k+1, l+1) |  |
| X-Ga (k-2, l+2) |  | X-Ga (k, l+2) |  | X-Ga (k+2, l+2) |

FIG.30
| X-Gd (k-2, l-2) | | X-Gd (k, l-2) | | X-Gd (k+2, l-2) |
|---|---|---|---|---|
| | X^-Gd (k-1, l-1) | | X^-Gd (k+1, l-1) | |
| X-Gd (k-2, l) | | X-Gd (k, l) | | X-Gd (k+2, l) |
| | X^-Gd (k-1, l+1) | | X^-Gd (k+1, l+1) | |
| X-Gd (k-2, l+2) | | X-Gd (k, l+2) | | X-Gd (k+2, l+2) |
FIG.31
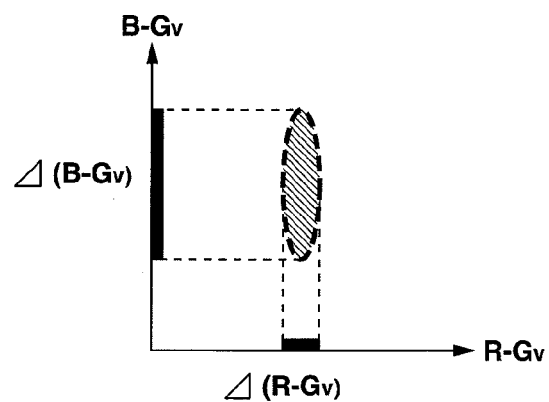
FIG.32
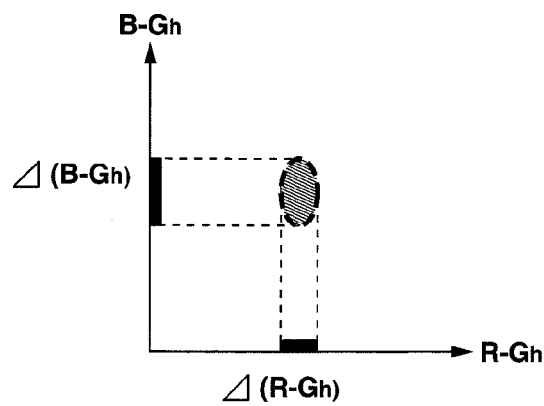

FIG.33
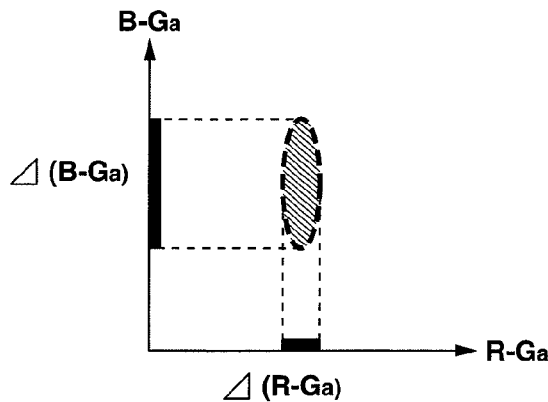
FIG.34
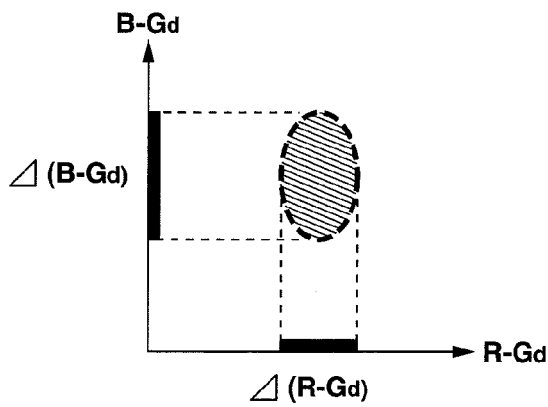
FIG.35
| B | G | B | G | B | G |
|---|---|---|---|---|---|
| G | R | G | R | G | R |
| B | G | B | G | B | G |
FIG.36
| B | G | B | G | B | G |
|---|---|---|---|---|---|
| G | R | G | R | G | R |
| B | G | B | G | B | G |

IMAGE PROCESSING APPARATUS, COMPUTER-READABLE RECORDING MEDIUM RECORDING IMAGE PROCESSING PROGRAM, AND IMAGE PROCESSING METHOD

CROSS REFERENCE TO RELATED APPLICATION

This application is a continuation application of PCT/JP2007/062132 filed on Jun. 15, 2007 and claims benefit of Japanese Applications No. 2006-180434 filed in Japan on Jun. 29, 2006 and No. 2007-039922 filed in Japan on Feb. 20, 2007, the entire contents of which are incorporated herein by their reference.

BACKGROUND OF THE INVENTION

1. Field of the Invention

The present invention relates to an image processing apparatus, a computer-readable recording medium recording an image processing program, and an image processing method for generating a color image with sampling positions where RGB pixels coincide from an RGB Bayer array image.

2. Description of the Related Art

Image pickup apparatuses that pick up optical images to acquire electrical color images are roughly classified into a three-plate image pickup device configuration capable of obtaining three color (for example, RGB three primary colors) signals at a pixel position and a single-plate image pickup device configuration capable of obtaining one of the three color signals at each pixel position.

In general, digital cameras currently available in the market have single-plate image pickup device configurations. Meanwhile, the three-plate image pickup device configuration and the single-plate image pickup device configuration are mixed in digital video cameras currently available in the market.

Constituting the image pickup apparatus with three-plate image pickup device configuration makes it possible to obtain three color signals at each pixel position of a picked up image when picking up an image. Therefore, the image is usually in high quality. However, the image is costly because the structure is complicated requiring more components.

Meanwhile, although the image pickup apparatus with single-plate image pickup device configuration is advantageous in that the structure is simplified compared to the three-plate image pickup configuration, R, G, and B filters need to be arranged in mosaic (see Bayer array as shown in FIG. 5 of the present invention) pixel by pixel to obtain three types of color signals. Therefore, only a single color signal can be obtained at each pixel position of the picked up image. Thus, missing color signals at each pixel position are interpolated using color signals of surrounding pixel positions to obtain three color signals in each pixel in the image pickup device in a single-plate image pickup device configuration with Bayer array.

In the Bayer array, 2×2 pixels is the basic unit of the pixel array. Two pixels of G filters are arranged in one of the diagonal directions in the 2×2 pixels, while one pixel of an R filter and one pixel of a B filter are arranged in the other diagonal direction. Therefore, the sampling density of G pixel is twice as high as the sampling density of R pixel and the sampling density of B pixel. If an image is picked up by such an image pickup device with sample density that differs depending on the color signal, aliasing of a high spatial frequency, which can be expressed in G signals, to the low frequency side occurs in R signals and B signals in an image pickup area with high spatial frequency such as an edge. It is known that the execution of the interpolation process in each color pixel may generate a false color (color that does not usually exist) at the edge or around the edge.

The simplest means to reduce the false color is to reduce the characteristic of a lens or an optical low-pass filter to a spatial frequency that allows reproduction of a sampling interval of R signals or B signals in a Bayer array and form an optical image in the spatial frequency on the image pickup device. However, an image with half the spatial frequency that can be reproduced can be picked up by employing the means, and an unclear image with low resolution is formed. Therefore, in general, an optical system is designed such that the resolution of an optical image formed on the image pickup device shows a spatial frequency characteristic in which the moiré due to the aliasing distortion is not generated at the sampling interval of G signal.

Conventionally, various techniques have been proposed to reduce the false color using an optical system designed in such a manner.

For example, Japanese Patent Application Laid-Open Publication No. 8-237672 describes a technique of applying an interpolation process to set the interpolation positions of three color (R, G, and B) signals to intermediate positions of the pixels both in the horizontal direction and in the vertical direction. The technique focuses on the fact that the interpolation process to the position makes it possible to approximate the frequency characteristics of R, G, and B with half the frequency of the Nyquist frequency. Although the technique described in the Publication is designed to reduce the false color, the false color in an edge area including frequency components close to the Nyquist frequency is not sufficiently suppressed. Furthermore, since the pixels are interpolated at half-pixel positions horizontally and vertically in the technique described in the Publication, attenuation of high frequency components depending on the frequency characteristic of the interpolation filter cannot be prevented, and the resolution is reduced.

Another technique for reducing the false color has been proposed that is different from Japanese Patent Application Laid-Open Publication No. 8-237672 in which the interpolation process of the color signals are realized by filters with uniform characteristics within the image. In the technique, a method is proposed in which an interpolation filter is switched in accordance with at least one direction dependency among a G signal similarity of a local area of the image, a color signal similarity between G signal and R signal, and a color signal similarity between G signal and B signal.

For example, U.S. Pat. No. 5,382,976 describes a technique of calculating a similarity in the horizontal direction and a similarity in the vertical direction among four G signals around a pixel position of a missing G signal (describing with reference to FIGS. 8 to 10 of the present invention, the vertical similarity=$|G_1-G_2|$, and the horizontal similarity=$|G_3-G_4|$), and the interpolation is performed using only the pixels in the direction with higher similarity. In accordance with the calculated similarity, a G interpolation candidate is selected as an interpolation value of the missing G signal from G interpolation candidates $\{(G_1+G_2)/2, (G_3+G_4)/2,$ and $(G_1+G_2+G_3+G_4)/4\}$ obtained by three linear interpolation methods using the G signal as shown in FIGS. 8 to 10 of the present invention.

However, in the technique, an optimal interpolation selection is not performed when the similarities of the G signals in the horizontal direction and the vertical direction are the same as described, for example, in Japanese Patent Application Laid-Open Publication No. 11-275373. Instead, $(G_1+G_2+G_3+G_4)/4$ is selected in some cases. In that case, an interpolation error occurs.

A technique for improving the problem is described in Japanese Patent Application Laid-Open Publication No. 11-275373. Specifically, in the technique described in the Publication, one of vertical interpolation, horizontal interpolation, and interpolation in which the two interpolations are weighted and averaged is selected according to the similarity between an R signal or a B signal at a pixel position for creating an interpolation G signal and surrounding four G pixels ($G_1$, $G_2$, $G_3$, and $G_4$ as shown in FIGS. 8 to 10 of the present invention, and vertical similarity=$|X-G_1|+|X-G_2|$ and horizontal similarity=$|X-G_3|+|X-G_4|$ (X is R signal or B signal)). The technique is advantageous in that the false color of an achromatic edge area can be effectively reduced. On the other hand, the chroma may be reduced in an area with high chroma.

The false color is more conspicuously detected in an achromatic edge area. The achromatic area indicates an area in which the values of R signal, G signal, and B signal are substantially the same and the ratio of R signal to G signal as well as the ratio of B signal to G signal are substantially 1. The false color is generated by the ratio of R signal, G signal, and B signal becoming different from 1 (separated) that is supposed to be 1, as a result of the interpolation process.

The technique described in Japanese Patent Application Laid-Open Publication No. 11-275373 is a technique of selecting, from a plurality of prepared interpolation candidates, an interpolation for approximating the ratio of R signal to G signal or the ratio of B signal to G signal to 1. Therefore, generation of false color in the achromatic area is consequently prevented.

However, when the technique is used, an interpolation for approximating the ratio of R signal to G signal or the ratio of B signal to G signal to 1 is also selected in the chromatic area, as in the achromatic area, in which the ratio of R signal to G signal or the ratio of B signal to G signal is basically not 1. Therefore, there is a problem that the chroma that is supposed to be reproduced is reduced in the chromatic area.

The problem will be described with a simple example. In an area considered herein, the color in the horizontal direction is the same, and the color in the vertical direction changes.

It is assumed that the values of R signals are all 200 and the values of G signals are all 10 in a certain line including R signals in a Bayer array. The values are constant values. It is also assumed that the values of G signals located on a line above the focused line are all 5 and the values of G signals located on a line below the focused line are all 45. The values are constant values. B signals on the lines above and below the focused line will not be taken into consideration to simplify the description.

Applying the technique described in Japanese Patent Application Laid-Open Publication No. 11-275373 to the specific value examples, a vertical similarity is $|200-5|+|200-45|=350$, and a horizontal similarity is $|200-10|+|200-10|=380$. The vertical similarity is determined to be higher than the horizontal similarity. Therefore, although the horizontal interpolation should be selected, the vertical interpolation is selected. As a result, a G signal interpolation value obtained in the R signal position on the focused line is $(5+45)/2=25$. In that case, a color difference R−G of the focused line is $200-25=175$, which is a value smaller than a color difference R−G=$200-10=190$ that is supposed to be reproduced. Therefore, the chroma is reduced.

In the conventional technique, the false color may be generated in the edge section, the resolution may be reduced when attempting to reduce the false color, or the image quality may be degraded due to an adaptive error when an adaptive interpolation method using a pixel correlation is applied to prevent the false color or the reduction in resolution when interpolating a missing color signal based on surrounding color signals in a Bayer array image with one color in each pixel that is picked up by a single-plate image pickup device to generate a color image including a plurality of color signals in each pixel. The conventional technique is not enough to prevent the generation of false color, the reduction in resolution, and the reduction in chroma.

The present invention has been made in view of the circumstances, and an object of the present invention is to provide an image processing apparatus, a computer-readable recording medium recording an image processing program, and an image processing method capable of interpolating a missing color signal in an RGB Bayer array image while sufficiently preventing the generation of false color and the reduction in resolution without reducing the chroma.

SUMMARY OF THE INVENTION

To attain the object, a first aspect of the present invention provides an image processing apparatus that generates a color image with sampling positions where RGB pixels coincide from an RGB Bayer array image in which a sampling density of G (green) pixels is higher than a sampling density of R (red) pixels and a sampling density of B (blue) pixels and in which the sampling positions of the pixels are different, the image processing apparatus includes: interpolation candidate calculating means for calculating M types (M is an integer 2 or more) of G interpolation candidates $G_t(x_0,y_0)$ ($t=1, \ldots, M$) for $X(x_0,y_0)$ when a position on the RGB Bayer array image is expressed by (x,y) (x is an integer indicative of a pixel position in a horizontal direction, while y is an integer indicative of a pixel position in a vertical direction), and an R pixel or a B pixel of a G pixel missing position $(x_0,y_0)$ is defined as $X(x_0,y_0)$; color difference candidate calculating means for calculating a plurality of types of color difference candidates $X(x_0,y_0)-G_t(x_0,y_0)$ based on the calculated M types of G interpolation candidates $G_t(x_0,y_0)$; and optimal color difference selecting means for calculating M types of color difference similarities, based on a plurality of color difference candidates $X(x_0+n,y_0+m)-G_t(x_0+n,y_0+m)$ of X that are calculated for the surrounding positions $(x_0+n,y_0+m)$ based on G interpolation candidates $G_t(x_0+n,y_0+m)$ that are the same type t as the G interpolation candidates $G_t(x_0,y_0)$ used to calculate the color difference candidates $X(x_0,y_0)-G_t(x_0,y_0)$ and that are calculated at surrounding positions $(x_0+n,y_0+m)$ (n and m are arbitrary integers that are not 0 at the same time), and based on the color difference candidates $X(x_0,y_0)-G_t(x_0,y_0)$ and for selecting, as a color difference, based on the calculated M types of color differences similarities, a color difference candidate $X(x_0,y_0)-G_p(x_0,y_0)(1\leq p\leq M)$ calculated based on a G interpolation candidate $G_p(x_0,y_0)$ among the M types of G interpolation candidates $G_t(x_0,y_0)$.

According to the first aspect, the false color generated by interpolating the missing color signals is prevented, and a color image, in which the chroma that should be reproduced is maintained, can be obtained from a plurality of color signals of a Bayer array or the like picked up by a single-plate image pickup device.

A second aspect of the present invention provides the image processing apparatus according to the first aspect, wherein the optimal color difference selecting means calculates the color difference similarities based on similarities between the color difference candidates $X(x_0,y_0)-G_t(x_0,y_0)$ and color difference candidates $X(x_0+n,y_0+m)-G_t(x_0+n,y_0+m)$ of the same color X of the color difference candidates $X(x_0,y_0)-G_t(x_0,y_0)$.

According to the second aspect, the false color generated by interpolating the missing color signals is prevented, and a color image, in which the chroma that should be reproduced is maintained, can be obtained from a plurality of color signals of a Bayer array or the like picked up by a single-plate image pickup device.

A third aspect of the present invention provides the image processing apparatus according to the second aspect, wherein the optimal color difference selecting means includes G interpolation value outputting means for outputting a G interpolation candidate $G_p(x_0,y_0)$ corresponding to the selected color difference candidate $X(x_0,y_0)-G_p(x_0,y_0)$ as a G pixel value of the position $(x_0,y_0)$.

According to the third aspect, the false color generated by interpolating the missing color signals is prevented, and a high-resolution color image, in which the chroma that should be reproduced is maintained, can be obtained from a plurality of color signals of a Bayer array or the like picked up by a single-plate image pickup device.

A fourth aspect of the present invention provides the image processing apparatus according to the third aspect, further includes: color difference interpolating means for applying a process of interpolating a color difference of a position in which the color difference is not calculated by the optimal color difference selecting means based on the color difference of the same color around the position calculated by the optimal color difference selecting means to a color difference of R pixel and a color difference of B pixel when the position is a G pixel on the RGB Bayer array image, to a color difference of B pixel when the position is an R pixel on the RGB Bayer array image, and to a color difference of R pixel when the position is a B pixel on the RGB Bayer array image; and RGB pixel calculating means for calculating an R pixel, a G pixel, and a B pixel based on the color difference calculated by the optimal color difference selecting means or the color difference interpolating means and a G pixel at the same position as the color difference.

According to the fourth aspect, the false color generated by interpolating the missing color signals is prevented, and a high-resolution color image, in which the chroma that should be reproduced is maintained, can be obtained from a plurality of color signals of a Bayer array or the like picked up by a single-plate image pickup device.

A fifth aspect of the present invention provides the image processing apparatus according to the second aspect, wherein the interpolation candidate calculating means includes: first interpolation calculating means for calculating an average of two G pixels adjacent above and below the X pixel as one type of G interpolation candidate among the M types of G interpolation candidates; second interpolation calculating means for calculating an average of two G pixels adjacent left and right of the X pixel as one type of G interpolation candidate among the M types of G interpolation candidates; and third interpolation calculating means for calculating an average of four G pixels adjacent above, below, left, and right of the X pixel as one type of G interpolation candidate among the M types of G interpolation candidates.

According to the fifth aspect, interpolation candidates applied to a horizontal edge, a vertical edge, and other areas are prepared. Therefore, an interpolation adapted to an image can be selected, the false color can be reduced without depending on the direction of the edge, and the reduction in resolution in the horizontal and vertical directions can be prevented.

A sixth aspect of the present invention provides the image processing apparatus according to the fifth aspect, wherein the interpolation candidate calculating means further includes fourth interpolation calculating means for using twelve G pixels $G(x_0-1, y_0)$, $G(x_0+1, y_0)$, $G(x_0, y_0-1)$, $G(x_0, y_0+1)$, $G(x_0-2, y_0-1)$, $G(x_0-2, y_0+1)$, $G(x_0+2, y_0-1)$, $G(x_0+2, y_0+1)$, $G(x_0-1, y_0-2)$, $G(x_0-1, y_0+2)$, $G(x_0+1, y_0-2)$, $G(x_0+1, y_0+2)$ located near the $X(x_0,y_0)$ to calculate one type of G interpolation candidate $G_t(x_0,y_0)$ among the M types of G interpolation candidates based on the following formula $$G_t(x_0, y_0) = \{G(x_0-1, y_0) + G(x_0+1, y_0) + G(x_0, y_0-1) + G(x_0, y_0+1)\} \times \alpha - \{G(x_0-2, y_0-1) + G(x_0-2, y_0+1) + G(x_0+2, y_0-1) + G(x_0+2, y_0+1) + G(x_0-1, y_0-2) + G(x_0-1, y_0+2) + G(x_0+1, y_0-2) + G(x_0+1, y_0+2)\} \times \beta$$

($\alpha$ and $\beta$ are arbitrary constants satisfying $\alpha \times 4 - \beta \times 8 = 1$ in which $\alpha > (1/4)$ and $\beta > 0$).

According to the sixth aspect, interpolation candidates applied to an edge area in a diagonal direction are prepared. Therefore, further generation of false color of an edge in the diagonal direction can be reduced, and the reduction in resolution in the diagonal direction can be prevented.

A seventh aspect of the present invention provides the image processing apparatus according to the fifth aspect, wherein the color difference candidate calculating means includes bandwidth limiting means for calculating a modified pixel $X_L$ in which an X pixel is bandwidth-limited using a surrounding same color X and uses the modified pixel $X_L$ to calculate a color difference candidate based on the G interpolation candidate calculated by the third interpolation calculating means.

According to the seventh aspect, the color difference is calculated after making a modification to approximate the frequency characteristic of R pixel or B pixel to the frequency characteristic of the G pixel interpolation by adjacent four pixels. Therefore, the false color caused by a difference in frequency characteristics can be reduced.

An eighth aspect of the present invention provides the image processing apparatus according to the fifth aspect, wherein the optimal color difference selecting means includes: G pixel variation calculating means for calculating a variation of G pixel values around a G pixel missing position to calculate a weighting factor based on the variation; and multiplying means for multiplying a similarity with the surrounding color difference candidate of the color difference candidate of the G pixel missing position calculated based on the G interpolation candidate calculated by the third interpolation calculating means by the weighting factor.

According to the eighth aspect, an unnatural distortion pattern that may be generated by an erroneous selection of a plurality of G interpolation candidates often switching due to noise or the like can be prevented in an image flat section.

A ninth aspect of the present invention provides the image processing apparatus according to the fifth aspect, wherein the optimal color difference selecting means includes selecting means for selecting, as a similarity with the surrounding color difference candidate of the color difference candidate of the G pixel missing position calculated based on the G interpolation candidate calculated by the first interpolation calculating means, a similarity with not a lower similarity between: a similarity calculated without weighting eight color difference candidates of the same color X and the same type t located closest around the G pixel missing position; and a similarity calculated by weighting two color difference candidates located above and below among the eight color difference candidates of the same color X and the same type t located closest around the G pixel missing position.

According to the ninth aspect, vertically adjacent G pixel interpolation can be more reliably selected in a steep vertical edge section. Therefore, the image degradation associated with interpolation that may occur due to an erroneous selection in the edge border section can be prevented.

A tenth aspect of the present invention provides the image processing apparatus according to the fifth aspect, wherein the optimal color difference selecting means includes selecting means for selecting, as a similarity with the surrounding color difference candidate of the color difference candidate of the G pixel missing position calculated based on the G interpolation candidate calculated by the second interpolation calculating means, a similarity with not a lower similarity between: a similarity calculated without weighting eight color difference candidates of the same color X and the same type t located closest around the G pixel missing position; and a similarity calculated by weighting two color difference candidates located left and right among the eight color difference candidates of the same color X and the same type t located closest around the G pixel missing position.

According to the tenth aspect, horizontally adjacent G pixel interpolation can be more reliably selected in a steep horizontal edge section. Therefore, the image degradation associated with interpolation that may occur due to an erroneous selection in the edge border section can be prevented.

An eleventh aspect of the present invention provides the image processing apparatus according to the second aspect, wherein the similarity is a difference absolute value sum of a color difference candidate of a G pixel missing position and one or more color difference candidates of the same color X and the same type t located around the G pixel missing position, and the optimal color difference selecting means includes selecting means for selecting a color difference candidate corresponding to a similarity that provides a minimum value among the M types of similarities and sets the color difference candidate selected by the selecting means as a color difference.

According to the eleventh aspect, an optimal color difference and G pixel interpolation can be determined while reducing the circuit size for building hardware.

A twelfth aspect of the present invention provides the image processing apparatus according to the second aspect, further includes bandwidth limiting means for calculating $X_L(x_0,y_0)$ in which the $X(x_0,y_0)$ is bandwidth-limited using a surrounding same color X, wherein the color difference candidate calculating means calculates a plurality of types of color difference candidates $X(x_0,y_0)-G_t(x_0,y_0)$ or $X_L(x_0,y_0)-G_t(x_0,y_0)$ based on calculated M types of G interpolation candidates $G_t(x_0,y_0)$, and the optimal color difference selecting means selects, based on the similarity, a color difference candidate $X(x_0,y_0)-G_p(x_0,y_0)$ or $X_L(x_0,y_0)-G_q(x_0,y_0)$ ($1 \leq p \leq M$ and $1 \leq q \leq M$) calculated based on a G interpolation candidate $G_p(x_0,y_0)$ or $G_q(x_0,y_0)$ among the M types of G interpolation candidates $G_t(x_0,y_0)$ as a color difference.

According to the twelfth aspect, the false color generated by interpolating the missing color signals is prevented, and a color image, in which the chroma that should be reproduced is maintained, can be obtained from a plurality of color signals of a Bayer array or the like picked up by a single-plate image pickup device.

A thirteenth aspect of the present invention provides the image processing apparatus according to the twelfth aspect, wherein the optimal color difference selecting means includes G interpolation value outputting means for outputting a G interpolation candidate $G_p(x_0,y_0)$ or $G_q(x_0,y_0)$ corresponding to the selected color difference candidate $X(x_0,y_0)-G_p(x_0,y_0)$ or $X_L(x_0,y_0)-G_q(x_0,y_0)$ as a G pixel value of the position $(x_0,y_0)$.

According to the thirteenth aspect, the false color generated by interpolating the missing color signals is prevented, and a high-resolution color image, in which the chroma that should be reproduced is maintained, can be obtained from a plurality of color signals of a Bayer array or the like picked up by a single-plate image pickup device.

A fourteenth aspect of the present invention provides the image processing apparatus according to the thirteenth aspect, further includes: color difference interpolating means for applying a process of interpolating a color difference of a position in which the color difference is not calculated by the optimal color difference selecting means based on the color difference of the same color around the position calculated by the optimal color difference selecting means to a color difference of R pixel and a color difference of B pixel when the position is a G pixel on the RGB Bayer array image, to a color difference of B pixel when the position is an R pixel on the RGB Bayer array image, and to a color difference of R pixel when the position is a B pixel on the RGB Bayer array image; and RGB pixel calculating means for calculating an R pixel, a G pixel, and a B pixel based on the color difference calculated by the optimal color difference selecting means or the color difference interpolating means and a G pixel at the same position as the color difference.

According to the fourteenth aspect, the false color generated by interpolating the missing color signals is prevented, and a high-resolution color image, in which the chroma that should be reproduced is maintained, can be obtained from a plurality of color signals of a Bayer array or the like picked up by a single-plate image pickup device.

A fifteenth aspect of the present invention provides the image processing apparatus according to the twelfth aspect, wherein the interpolation candidate calculating means includes: first interpolation calculating means for calculating an average of two G pixels adjacent above and below the X pixel as one type of G interpolation candidate among the M types of G interpolation candidates; second interpolation calculating means for calculating an average of two G pixels adjacent left and right of the X pixel as one type of G interpolation candidate among the M types of G interpolation candidates; and third interpolation calculating means for calculating an average of four G pixels adjacent above, below, left, and right of the X pixel as one type of G interpolation candidate among the M types of G interpolation candidates.

According to the fifteenth aspect, interpolation candidates applied to a horizontal edge, a vertical edge, and other areas are prepared. Therefore, an interpolation adapted to an image can be selected, the false color can be reduced without depending on the direction of the edge, and the reduction in resolution in the horizontal and vertical directions can be prevented.

A sixteenth aspect of the present invention provides the image processing apparatus according to the fifteenth aspect, wherein the interpolation candidate calculating means further includes fourth interpolation calculating means for using twelve G pixels $G(x_0-1, y_0)$, $G(x_0+1, y_0)$, $G(x_0, y_0-1)$, $G(x_0, y_0+1)$, $G(x_0-2, y_0-1)$, $G(x_0-2, y_0+1)$, $G(x_0+2, y_0-1)$, $G(x_0+2, y_0+1)$, $G(x_0-1, y_0-2)$, $G(x_0-1, y_0+2)$, $G(x_0+1, y_0-2)$, $G(x_0+1, y_0+2)$ located near the $X(x_0,y_0)$ to calculate one type of G interpolation candidate $G_t(x_0,y_0)$ among the M types of G interpolation candidates based on the following formula $$G_t(x_0, y_0) =$$
$$\{G(x_0-1, y_0) + G(x_0+1, y_0) + G(x_0, y_0-1) + G(x_0, y_0+1)\} \times \alpha -$$
$$\{G(x_0-2, y_0-1) + G(x_0-2, y_0+1) + G(x_0+2, y_0-1) +$$
$$G(x_0+2, y_0+1) + G(x_0-1, y_0-2) + G(x_0-1, y_0+2) +$$
$$G(x_0+1, y_0-2) + G(x_0+1, y_0+2)\} \times \beta$$

($\alpha$ and $\beta$ are arbitrary constants satisfying $\alpha \times 4 - \beta \times 8 = 1$ in which $\alpha > (\frac{1}{4})$ and $\beta > 0$).

According to the sixteenth aspect, interpolation candidates applied to an edge area in a diagonal direction are prepared. Therefore, further generation of false color of an edge in the diagonal direction can be reduced, and the reduction in resolution in the diagonal direction can be prevented.

A seventeenth aspect of the present invention provides the image processing apparatus according to the fifteenth aspect, wherein the optimal color difference selecting means includes: G pixel variation calculating means for calculating a variation of G pixel values around a G pixel missing position to calculate a weighting factor based on the variation; and multiplying means for multiplying a similarity with the surrounding color difference candidate of the color difference candidate of the G pixel missing position calculated based on the G interpolation candidate calculated by the third interpolation calculating means by the weighting factor.

According to the seventeenth aspect, an unnatural distortion pattern that may be generated by an erroneous selection of a plurality of G interpolation candidates often switching due to noise or the like can be prevented in an image flat section.

An eighteenth aspect of the present invention provides the image processing apparatus according to the fifteenth aspect, wherein the optimal color difference selecting means includes selecting means for selecting, as a similarity with the surrounding color difference candidate of the color difference candidate of the G pixel missing position calculated based on the G interpolation candidate calculated by the first interpolation calculating means, a similarity with not a lower similarity between: a similarity calculated without weighting eight color difference candidates of the same color X and the same type t located closest around the G pixel missing position; and a similarity calculated by weighting two color difference candidates located above and below among the eight color difference candidates of the same color X and the same type t located closest around the G pixel missing position.

According to the eighteenth aspect, vertically adjacent G pixel interpolation can be more reliably selected in a steep vertical edge section. Therefore, the image degradation associated with interpolation that may occur due to an erroneous selection in the edge border section can be prevented.

A nineteenth aspect of the present invention provides the image processing apparatus according to the fifteenth aspect, wherein the optimal color difference selecting means includes selecting means for selecting, as a similarity with the surrounding color difference candidate of the color difference candidate of the G pixel missing position calculated based on the G interpolation candidate calculated by the second interpolation calculating means, a similarity with not a lower similarity between: a similarity calculated without weighting eight color difference candidates of the same color X and the same type t located closest around the G pixel missing position; and a similarity calculated by weighting two color difference candidates located left and right among the eight color difference candidates of the same color X and the same type t located closest around the G pixel missing position.

According to the nineteenth aspect, horizontally adjacent G pixel interpolation can be more reliably selected in a steep horizontal edge section. Therefore, the image degradation associated with interpolation that may occur due to an erroneous selection in the edge border section can be prevented.

A twentieth aspect of the present invention provides the image processing apparatus according to the twelfth aspect, wherein the similarity is a difference absolute value sum of a color difference candidate of a G pixel missing position and one or more color difference candidates of the same color X and the same type t located around the G pixel missing position, and the optimal color difference selecting means includes selecting means for selecting a color difference candidate corresponding to a similarity that provides a minimum value among the M types of similarities and sets the color difference candidate selected by the selecting means as a color difference.

According to the twentieth aspect, an optimal color difference and G pixel interpolation can be determined while reducing the circuit size for building hardware.

A twenty-first aspect of the present invention provides a computer-readable recording medium recording an image processing program causing a computer to execute a process of generating a color image with sampling positions where RGB pixels coincide from an RGB Bayer array image in which a sampling density of G (green) pixels is higher than a sampling density of R (red) pixels and a sampling density of B (blue) pixels and in which the sampling positions of the pixels are different, a computer-readable recording medium recording an image processing program causing a computer to execute: interpolation candidate calculating step of calculating M types (M is an integer 2 or more) of G interpolation candidates $G_t(x_0,y_0)$ ($t=1, \ldots, M$) for $X(x_0,y_0)$ when a position on the RGB Bayer array image is expressed by (x,y) (x is an integer indicative of a pixel position in a horizontal direction, while y is an integer indicative of a pixel position in a vertical direction), and an R pixel or a B pixel of a G pixel missing position $(x_0,y_0)$ is defined as $X(x_0,y_0)$; color difference candidate calculating step of calculating a plurality of types of color difference candidates $X(x_0,y_0)-G_t(x_0,y_0)$ based on the calculated M types of G interpolation candidates $G_t(x_0,y_0)$; and optimal color difference selecting step of calculating, based on G interpolation candidates $G_t(x_0+n,y_0+m)$ that are the same type t as the G interpolation candidates $G_t(x_0,y_0)$ used to calculate the color difference candidates $X(x_0,y_0)-G_t(x_0,y_0)$ and that are calculated at surrounding positions $(x_0+n,y_0+m)$ (n and m are arbitrary integers that are not 0 at the same time), M types of color difference similarities based on a plurality of color difference candidates $X(x_0+n,y_0+m)-G_t(x_0+n,y_0+m)$ of X calculated for the surrounding positions $(x_0+n,y_0+m)$ and the color difference candidates $X(x_0,y_0)-G_t(x_0,y_0)$ and of selecting, based on the calculated M types of color difference similarities, a color difference candidate $X(x_0,y_0)-G_p(x_0,y_0)$ ($1 \leq p \leq M$) calculated based on a G interpolation candidate $G_p(x_0,y_0)$ among the M types of G interpolation candidates $G_t(x_0,y_0)$ as a color difference.

According to the twenty-first aspect, the false color generated by interpolating the missing color signals is prevented, and a color image, in which the chroma that should be reproduced is maintained, can be obtained from a plurality of color signals of a Bayer array or the like picked up by a single-plate image pickup device.

A twenty-second aspect of the present invention provides an image processing method for generating a color image with sampling positions where RGB pixels coincide from an RGB Bayer array image in which a sampling density of G (green) pixels is higher than a sampling density of R (red) pixels and a sampling density of B (blue) pixels and in which the sampling positions of the pixels are different, the image processing method includes: interpolation candidate calculating step of calculating M types (M is an integer 2 or more) of G interpolation candidates $G_t(x_0,y_0)$ (t=1, . . . , M) for $X(x_0,y_0)$ when a position on the RGB Bayer array image is expressed by (x,y) (x is an integer indicative of a pixel position in a horizontal direction, while y is an integer indicative of a pixel position in a vertical direction), and an R pixel or a B pixel of a G pixel missing position $(x_0,y_0)$ is defined as $X(x_0,y_0)$; color difference candidate calculating step of calculating a plurality of types of color difference candidates $X(x_0,y_0)-G_t(x_0,y_0)$ based on the calculated M types of G interpolation candidates $G_t(x_0,y_0)$; and optimal color difference selecting step of calculating, based on G interpolation candidates $G_t(x_0+n,y_0+m)$ that are the same type t as the G interpolation candidates $G_t(x_0,y_0)$ used to calculate the color difference candidates $X(x_0,y_0)-G_t(x_0,y_0)$ and that are calculated at surrounding positions $(x_0+n,y_0+m)$ (n and m are arbitrary integers that are not 0 at the same time), M types of color difference similarities based on a plurality of color difference candidates $X(x_0+n,y_0+m)-G_t(x_0+n,y_0+m)$ of X calculated for the surrounding positions $(x_0+n,y_0+m)$ and the color difference candidates $X(x_0,y_0)-G_t(x_0,y_0)$ and of selecting, based on the calculated M types of color difference similarities, a color difference candidate $X(x_0,y_0)-G_p(x_0,y_0)$ ($1 \leq p \leq M$) calculated based on a G interpolation candidate $G_p(x_0,y_0)$ among the M types of G interpolation candidates $G_t(x_0,y_0)$ as a color difference.

According to the twenty-second aspect, the false color generated by interpolating the missing color signals is prevented, and a color image, in which the chroma that should be reproduced is maintained, can be obtained from a plurality of color signals of a Bayer array or the like picked up by a single-plate image pickup device.

A twenty-third aspect of the present invention provides the image processing apparatus according to the first aspect, wherein the optimal color difference selecting means calculates the color difference similarities based on similarities based on the color difference candidates $X(x_0,y_0)-G_t(x_0,y_0)$ and a plurality of color difference candidates $X(x_0+n,y_0+m)-G_t(x_0+n,y_0+m)$ of the same color X of the color difference candidates $X(x_0,y_0)-G_t(x_0,y_0)$ and similarities based on a plurality of color difference candidates X $(x_0+n,y_0+m)-G_t(x_0+n,y_0+m)$ in a color X different from that of the color difference candidates $X(x_0,y_0)-G_t(x_0,y_0)$.

According to the twenty-third aspect, a determination error of the color difference surrounding similarity due to a pixel value change of an arbitrary spatial frequency in a calculation area of the color difference surrounding similarity can be reduced, and the generation of false color can be further prevented.

A twenty-fourth aspect of the present invention provides the image processing apparatus according to the twenty-third aspect, wherein the optimal color difference selecting means includes G interpolation value outputting means for outputting a G interpolation candidate $G_p(x_0,y_0)$ corresponding to the selected color difference candidate $X(x_0,y_0)-G_p(x_0,y_0)$ as a G pixel value of the position $(x_0,y_0)$.

According to the twenty-fourth aspect, the same advantage as in the third aspect can be further achieved in the twenty-third aspect.

A twenty-fifth aspect of the present invention provides the image processing apparatus according to the twenty-fourth aspect, further includes: color difference interpolating means for applying a process of interpolating a color difference of a position in which the color difference is not calculated by the optimal color difference selecting means based on the color difference of the same color around the position calculated by the optimal color difference selecting means to a color difference of R pixel and a color difference of B pixel when the position is a G pixel on the RGB Bayer array image, to a color difference of B pixel when the position is an R pixel on the RGB Bayer array image, and to a color difference of R pixel when the position is a B pixel on the RGB Bayer array image; and RGB pixel calculating means for calculating an R pixel, a G pixel, and a B pixel based on the color difference calculated by the optimal color difference selecting means or the color difference interpolating means and a G pixel at the same position as the color difference.

According to the twenty-fifth aspect, the same advantage as in the fourth aspect can be further achieved in the twenty-third aspect.

A twenty-sixth aspect of the present invention provides the image processing apparatus according to the twenty-third aspect, wherein the interpolation candidate calculating means includes: first interpolation calculating means for calculating an average of two G pixels adjacent above and below the X pixel as one type of G interpolation candidate among the M types of G interpolation candidates; second interpolation calculating means for calculating an average of two G pixels adjacent left and right of the X pixel as one type of G interpolation candidate among the M types of G interpolation candidates; and third interpolation calculating means for calculating an average of four G pixels adjacent above, below, left, and right of the X pixel as one type of G interpolation candidate among the M types of G interpolation candidates.

According to the twenty-sixth aspect, the same advantage as in the fifth aspect can be further achieved in the twenty-third aspect.

A twenty-seventh aspect of the present invention provides the image processing apparatus according to the twenty-sixth aspect, wherein the interpolation candidate calculating means further includes fourth interpolation calculating means for using twelve G pixels $G(x_0-1, y_0)$, $G(x_0+1, y_0)$, $G(x_0, y_0-1)$, $G(x_0, y_0+1)$, $G(x_0-2, y_0-1)$, $G(x_0-2, y_0+1)$, $G(x_0+2, y_0-1)$, $G(x_0+2, y_0+1)$, $G(x_0-1, y_0-2)$, $G(x_0-1, y_0+2)$, $G(x_0+1, y_0-2)$, $G(x_0+1, y_0+2)$ located near the $X(x_0,y_0)$ to calculate one type of G interpolation candidate $G_t(x_0,y_0)$ among the M types of G interpolation candidates based on the following formula $$G_t(x_0, y_0) = \{G(x_0-1, y_0) + G(x_0+1, y_0) + G(x_0, y_0-1) + G(x_0, y_0+1)\} \times \alpha - \{G(x_0-2, y_0-1) + G(x_0-2, y_0+1) + G(x_0+2, y_0-1) + G(x_0+2, y_0+1) + G(x_0-1, y_0-2) + G(x_0-1, y_0+2) + G(x_0+1, y_0-2) + G(x_0+1, y_0+2)\} \times \beta$$

($\alpha$ and $\beta$ are arbitrary constants satisfying $\alpha \times 4 - \beta \times 8 = 1$ in which $\alpha > (\frac{1}{4})$ and $\beta > 0$).

According to the twenty-seventh aspect, the same advantage as in the sixth aspect can be further achieved in the twenty-third aspect.

A twenty-eighth aspect of the present invention provides the image processing apparatus according to the twenty-sixth aspect, wherein the color difference candidate calculating means includes bandwidth limiting means for calculating a modified pixel $X_L$ in which an X pixel is bandwidth-limited using a surrounding same color X and uses the modified pixel $X_L$ to calculate a color difference candidate based on the G interpolation candidate calculated by the third interpolation calculating means.

According to the twenty-eighth aspect, the same advantage as in the seventh aspect can be further achieved in the twenty-third aspect.

A twenty-ninth aspect of the present invention provides the image processing apparatus according to the twenty-sixth aspect, wherein the optimal color difference selecting means includes: G pixel variation calculating means for calculating a variation of G pixel values around a G pixel missing position to calculate a weighting factor based on the variation; and multiplying means for multiplying a similarity with the surrounding color difference candidate of the color difference candidate of the G pixel missing position calculated based on the G interpolation candidate calculated by the third interpolation calculating means by the weighting factor.

According to the twenty-ninth aspect, the same advantage as in the eighth aspect can be further achieved in the twenty-third aspect.

A thirtieth aspect of the present invention provides the image processing apparatus according to the twenty-third aspect, wherein the similarity is a difference absolute value sum of color difference candidates of the same color X and the same type t, and the optimal color difference selecting means includes selecting means for selecting a color difference candidate corresponding to a similarity that provides a minimum value among the M types of similarities and sets the color difference candidate selected by the selecting means as a color difference.

According to the thirtieth aspect, substantially the same advantage as in the eleventh aspect can be further achieved in the twenty-third aspect.

A thirty-first aspect of the present invention provides the image processing apparatus according to the twenty-third aspect, further includes bandwidth limiting means for calculating $X_L(x_0,y_0)$ in which the $X(x_0,y_0)$ is bandwidth-limited using a surrounding same color X, wherein the color difference candidate calculating means calculates a plurality of types of color difference candidates $X(x_0,y_0)-G_t(x_0,y_0)$ or $X_L(x_0,y_0)-G_t(x_0,y_0)$ based on calculated M types of G interpolation candidates $G_t(x_0,y_0)$, and the optimal color difference selecting means selects, based on the similarity, a color difference candidate $X(x_0,y_0)-G_p(x_0,y_0)$ or $X_L(x_0,y_0)-G_q(x_0,y_0)$ ($1 \leq p \leq M$ and $1 \leq q \leq M$) calculated based on a G interpolation candidate $G_p(x_0,y_0)$ or $G_q(x_0,y_0)$ among the M types of G interpolation candidates $G_t(x_0,y_0)$ as a color difference.

According to the thirty-first aspect, the same advantage as in the twelfth aspect can be further achieved in the twenty-third aspect.

A thirty-second aspect of the present invention provides the image processing apparatus according to the thirty-first aspect, wherein the optimal color difference selecting means includes G interpolation value outputting means for outputting a G interpolation candidate $G_p(x_0,y_0)$ or $G_q(x_0,y_0)$ corresponding to the selected color difference candidate $X(x_0,y_0)-G_p(x_0,y_0)$ or $X_L(x_0,y_0)-G_q(x_0,y_0)$ as a G pixel value of the position $(x_0,y_0)$.

According to the thirty-second aspect, the same advantage as in the thirteenth aspect can be further achieved in the twenty-third aspect.

A thirty-third aspect of the present invention provides the image processing apparatus according to the thirty-second aspect, further includes: color difference interpolating means for applying a process of interpolating a color difference of a position in which the color difference is not calculated by the optimal color difference selecting means based on the color difference of the same color around the position calculated by the optimal color difference selecting means to a color difference of R pixel and a color difference of B pixel when the position is a G pixel on the RGB Bayer array image, to a color difference of B pixel when the position is an R pixel on the RGB Bayer array image, and to a color difference of R pixel when the position is a B pixel on the RGB Bayer array image; and RGB pixel calculating means for calculating an R pixel, a G pixel, and a B pixel based on the color difference calculated by the optimal color difference selecting means or the color difference interpolating means and a G pixel at the same position as the color difference.

According to the thirty-third aspect, the same advantage as in the fourteenth aspect can be further achieved in the twenty-third aspect.

A thirty-fourth aspect of the present invention provides the image processing apparatus according to the thirty-first aspect, wherein the interpolation candidate calculating means includes: first interpolation calculating means for calculating an average of two G pixels adjacent above and below the X pixel as one type of G interpolation candidate among the M types of G interpolation candidates; second interpolation calculating means for calculating an average of two G pixels adjacent left and right of the X pixel as one type of G interpolation candidate among the M types of G interpolation candidates; and third interpolation calculating means for calculating an average of four G pixels adjacent above, below, left, and right of the X pixel as one type of G interpolation candidate among the M types of G interpolation candidates.

According to the thirty-fourth aspect, the same advantage as in the fifteenth aspect can be further achieved in the twenty-third aspect.

A thirty-fifth aspect of the present invention provides the image processing apparatus according to the thirty-fourth aspect, wherein the interpolation candidate calculating means further includes fourth interpolation calculating means for using twelve G pixels $G(x_0-1, y_0)$, $G(x_0+1, y_0)$, $G(x_0, y_0-1)$, $G(x_0, y_0+1)$, $G(x_0-2, y_0-1)$, $G(x_0-2, y_0+1)$, $G(x_0+2, y_0-1)$, $G(x_0+2, y_0+1)$, $G(x_0-1, y_0-2)$, $G(x_0-1, y_0+2)$, $G(x_0+1, y_0-2)$, $G(x_0+1, y_0+2)$ located near the $X(x_0,y_0)$ to calculate one type of G interpolation candidate $G_t(x_0,y_0)$ among the M types of G interpolation candidates based on the following formula $$G_t(x_0, y_0) = \\ \{G(x_0-1, y_0) + G(x_0+1, y_0) + G(x_0, y_0-1) + G(x_0, y_0+1)\} \times \alpha - \\ \{G(x_0-2, y_0-1) + G(x_0-2, y_0+1) + G(x_0+2, y_0-1) + \\ G(x_0+2, y_0+1) + G(x_0-1, y_0-2) + G(x_0-1, y_0+2) + \\ G(x_0+1, y_0-2) + G(x_0+1, y_0+2)\} \times \beta$$

($\alpha$ and $\beta$ are arbitrary constants satisfying $\alpha \times 4 - \beta \times 8 = 1$ in which $a > (1/4)$ and $\beta > 0$).

According to the thirty-fifth aspect, the same advantage as in the sixteenth aspect can be further achieved in the twenty-third aspect.

A thirty-sixth aspect of the present invention provides the image processing apparatus according to the thirty-fourth aspect, wherein the optimal color difference selecting means includes: G pixel variation calculating means for calculating a variation of G pixel values around a G pixel missing position to calculate a weighting factor based on the variation; and multiplying means for multiplying a similarity with the surrounding color difference candidate of the color difference candidate of the G pixel missing position calculated based on the G interpolation candidate calculated by the third interpolation calculating means by the weighting factor.

According to the thirty-sixth aspect, the same advantage as in the seventeenth aspect can be further achieved in the twenty-third aspect.

A thirty-seventh aspect of the present invention provides the image processing apparatus according to the thirty-first aspect, wherein the similarity is a difference absolute value sum of color difference candidates of the same color X and the same type, and the optimal color difference selecting means includes selecting means for selecting a color difference candidate corresponding to a similarity that provides a minimum value among the M types of similarities and sets the color difference candidate selected by the selecting means as a color difference.

According to the thirty-seventh aspect, the same advantage as in the twentieth aspect can be further achieved in the twenty-third aspect.

BRIEF DESCRIPTION OF THE DRAWINGS

FIG. 3 is a block diagram of a configuration of a color difference interpolation processing unit according to the first embodiment;

FIG. 4 is a block diagram of a configuration of the an RGB calculating unit according to the first embodiment;

FIG. 5 is a diagram depicting a Bayer array of color signals picked up by a single-plate image pickup device of an image pickup unit according to the first embodiment;

FIG. 6 is a diagram depicting a two-dimensional array of G signals outputted from the G interpolation color difference calculating unit according to the first embodiment;

FIG. 7 is a diagram depicting a two-dimensional array of $X-G_i$ signals outputted from the G interpolation color difference calculating unit according to the first embodiment;

FIG. 8 is a diagram depicting positions of adjacent G signals on the Bayer array in the up and down directions used for vertical direction interpolation of a missing G signal position according to the first embodiment;

FIG. 9 is a diagram depicting positions of adjacent G signals on the Bayer array in the left and right directions used for horizontal direction interpolation of a missing G signal position according to the first embodiment;

FIG. 13 is a diagram depicting positions of color difference signals on the Bayer array used for calculating a surrounding similarity among color differences of missing G signal positions calculated based on the adjacent four pixel interpolation according to the first embodiment;

FIG. 20 is a diagram depicting positions on the Bayer array of G signals of surrounding twelve pixels used in the diagonal direction interpolation of a missing G signal position according to the third embodiment;

FIG. 21 is a diagram depicting positions on the Bayer array of color difference signals used for calculating a surrounding similarity among the color differences of missing G signal positions calculated based on surrounding twelve pixel interpolation according to the third embodiment;

FIG. 24 is a diagram depicting positions on the Bayer array of color signals X used to constitute the low-pass filter in a low-pass filter processing unit according to the fourth embodiment;

FIG. 27 is a diagram depicting $X-G_v$ and $X^\wedge-G_v$ of a 5×5 pixel area calculated using $G_v$ obtained by the vertical interpolation according to a fifth embodiment of the present invention;

FIG. 28 is a diagram depicting $X-G_h$ and $X^\wedge-G_h$ of a 5×5 pixel area calculated using $G_h$ obtained by the horizontal interpolation according to the fifth embodiment;

FIG. 29 is a diagram depicting $X-G_a$ and $X^\wedge-G_a$ of a 5×5 pixel area calculated using $G_a$ obtained by the four pixel interpolation according to the fifth embodiment;

FIG. 30 is a diagram depicting $X-G_d$ and $X^\wedge-G_d$ of a 5×5 pixel area calculated using $G_d$ obtained by the diagonal interpolation according to the fifth embodiment;

FIG. 31 is a diagram plotting, in a two-dimensional color difference space, a color difference X–G$_v$ or X^–G$_v$ of a surrounding local area in relation to G$_v$ obtained by the vertical interpolation according to the fifth embodiment;

FIG. 32 is a diagram plotting, in a two-dimensional color difference space, a color difference X–G$_h$ or X^–G$_h$ of a surrounding local area in relation to G$_h$ obtained by the horizontal interpolation according to the fifth embodiment;

FIG. 33 is a diagram plotting, in a two-dimensional color difference space, a color difference X–G$_a$ or X^–G$_a$ of a surrounding local area in relation to G$_a$ obtained by the four pixel interpolation according to the fifth embodiment;

FIG. 34 is a diagram plotting, in a two-dimensional color difference space, a color difference X–G$_d$ or X^–G$_d$ of a surrounding local area in relation to G$_d$ obtained by the diagonal interpolation according to the fifth embodiment;

FIG. 35 is a diagram depicting an example with a horizontal stripe pattern with high spatial frequency in a vertical direction in determination areas according to the fifth embodiment; and FIG. 36 is a diagram depicting the emergence of a checked pattern in G signals when surrounding color difference similarities of the first to fourth embodiments are used in an example of FIG. 35 according to the fifth embodiment.

DETAILED DESCRIPTION OF THE PREFERRED EMBODIMENTS

Preferred embodiments of the present invention will now be described with reference to the drawings.

First Embodiment

Figure 1:
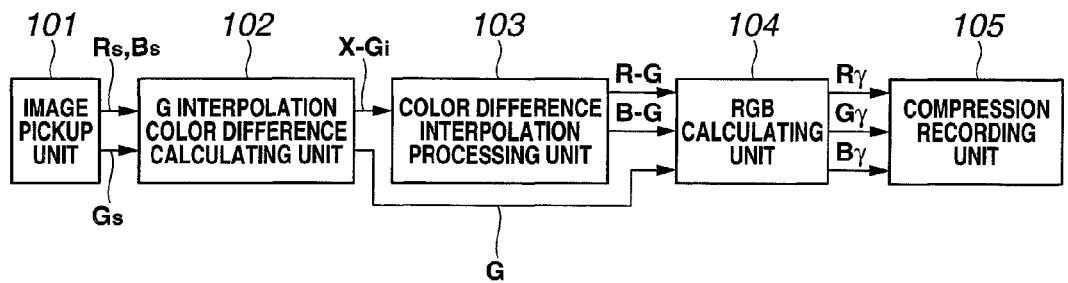
FIG. 1 is a block diagram of an overall configuration of an image processing apparatus according to a first embodiment of the present invention.

FIGS. 1 to 15 depict a first embodiment of the present invention. FIG. 1 is a block diagram of an overall configuration of an image processing apparatus.

As shown in FIG. 1, the image processing apparatus includes an image pickup unit 101, a G interpolation color difference calculating unit 102, a color difference interpolation processing unit 103, an RGB calculating unit 104, and a compression recording unit 105.

Although not shown, the image pickup unit 101 is constituted by a lens, an IR cut filter, an optical low-pass filter, a single-plate image pickup device (hereinafter, simply referred to as "image pickup device" or the like), an amplifier, an A/D converter, and an image pickup controller. The lens forms an optical image of a subject on the image pickup device. The IR cut filter filters out the light in the infrared region from the luminous flux passing through the lens. The optical low-pass filter is an optical filter that limits the bandwidth such that the resolution of the optical image formed on the image pickup device by the lens has a spatial frequency characteristic in which the moiré is not generated above the tolerable level due to the aliasing distortion in the sampling interval of G signal. The image pickup device is a single-plate image pickup device with a color filter of Bayer array as shown in FIG. 5. The image pickup device is constituted by, for example, a CCD or a CMOS. FIG. 5 is a diagram depicting a Bayer array of color signals picked up by the single-plate image pickup device of the image pickup unit 101. The amplifier amplifies the signals outputted from the image pickup device in analog. The A/D converter converts the analog signals amplified by the amplifier to digital signals. The image pickup device controller controls and drives the image pickup device for picking up an image, and after picking up the image, outputs the digital signals outputted from the A/D converter to the G interpolation color difference calculating unit 102 according to the color components as described below.

In the configuration, the light formed on the single-plate image pickup device through the lens, the IR cut filter, and the optical low-pass filter is photoelectrically converted based on pixels with color filters in a Bayer array as shown in FIG. 5. The photoelectrically converted electrical signals of the pixels are amplified by the amplifier, converted to digital signals by the A/D converter, and outputted as digital color signals R$_s$, G$_s$, and B$_s$. The image pickup device controller divides the color signals R$_s$, G$_s$, and B$_s$ outputted from the A/D converter into R$_s$ and B$_s$, and G$_s$, and outputs the signals to the G interpolation color difference calculating unit 102. The image pickup device controller further includes a noise reduction processing function, a white balance processing function, and the like for the color signals R$_s$, G$_s$, and B$_s$, and the processes are applied to R$_s$, G$_s$, and B$_s$, to be outputted to the G interpolation color difference calculating unit 102.

The G interpolation color difference calculating unit 102 calculates interpolation G pixels G$_i$ corresponding to the pixel positions of the inputted color signals R$_s$ and B$_s$ and color difference signals R–G$_i$ and B–G$_i$ at the pixel positions. The G interpolation color difference calculating unit 102 arranges the color difference signals R–G$_i$ and B–G$_i$ in a two-dimensional array as shown in FIG. 7 and outputs the color difference signals in a two-dimensional array to the color difference interpolation processing unit 103 in order of raster scanning. FIG. 7 is a diagram depicting the two-dimensional array of X–G$_i$ signals outputted from the G interpolation color difference calculating unit 102. The G interpolation color difference calculating unit 102 arranges the G signals in a two-dimensional array as shown in FIG. 6 and outputs the G signals in a two-dimensional array to the RGB calculating unit 104 in order of raster scanning. FIG. 6 is a diagram depicting the two-dimensional array of the G signals outputted from the G interpolation color difference calculating unit 102. The G interpolation color difference calculating unit 102 will be described below in further detail.

The color difference interpolation processing unit 103 is color difference interpolating means and interpolates missing color differences R–G in the entire pixels and missing color differences B–G in the entire pixels in a two-dimensional array as shown in FIG. 7 by using surrounding color differences R–G$_i$ or B–G$_i$ of the same color. The color difference interpolation processing unit 103 then outputs the color differences R–G of all pixel positions and the color differences B–G of all pixel positions obtained by interpolation to the RGB calculating unit 104.

The RGB calculating unit 104 is RGB pixel calculating means and calculates RGB signals based on two types of color difference signals R–G and B–G inputted from the color difference interpolation processing unit 103 and the G signals inputted from the G interpolation color difference calculating unit 102. The RGB calculating unit 104 then applies a color matching process and a γ-correction process to the calculated RGB signals to calculate Rγ, Gγ, and Bγ signals and outputs the calculated Rγ, Gγ, and Bγ signals to the compression recording unit 105.

The compression recording unit 105 converts the Rγ, Gγ, and Bγ signals inputted from the RGB calculating unit 104 to Y, U, and V signals, further converts the Y, U, and V signals to compressed data applied with a high-efficiency compression encoding process such as JPEG and MPEG, and saves the compressed data in a recording medium.

Figure 2:
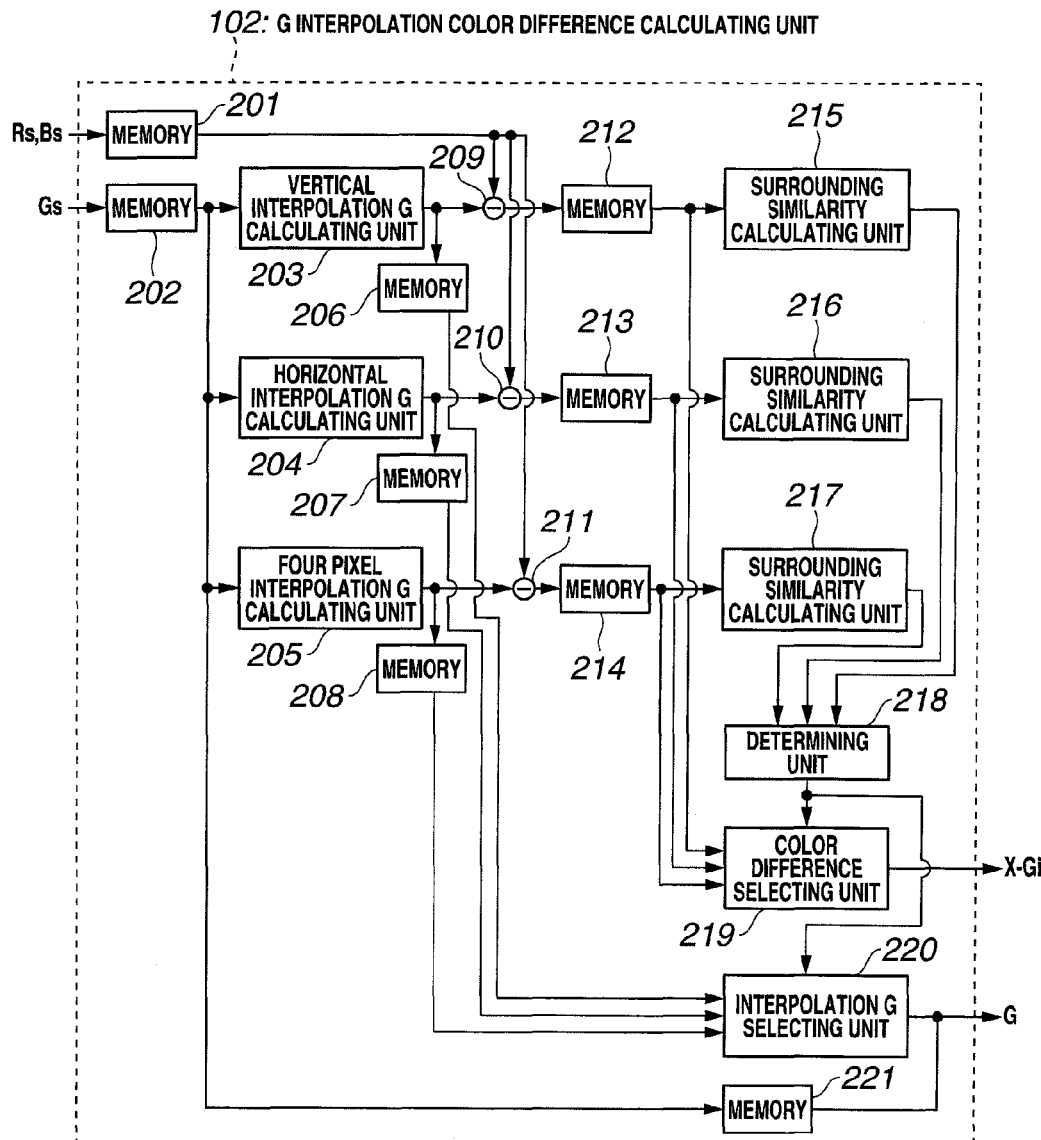
FIG. 2 is a block diagram of a configuration of a G interpolation color difference calculating unit according to the first embodiment.

FIG. 2 is a block diagram of a configuration of the G interpolation color difference calculating unit 102.

The G interpolation color difference calculating unit 102 includes a memory 201, a memory 202, a vertical interpolation G calculating unit 203, a horizontal interpolation G calculating unit 204, a four pixel interpolation G calculating unit 205, a memory 206, a memory 207, a memory 208, a subtracting unit 209, a subtracting unit 210, a subtracting unit 211, a memory 212, a memory 213, a memory 214, a surrounding similarity calculating unit 215, a surrounding similarity calculating unit 216, a surrounding similarity calculating unit 217, a determining unit 218, a color difference selecting unit 219, an interpolation G selecting unit 220, and a memory 221.

The color signals $R_s$ and $B_s$ outputted from the image pickup unit 101 are stored in the memory 201, and the color signals $G_s$ are stored in the memory 202 for an amount of predetermined lines to obtain a delay until the pixels that make it possible to execute a two-dimensional interpolation process of missing G pixel positions are collected. In the example of FIG. 2, the number of lines stored in the memories 201 and 202 is at least three.

Although R pixels or B pixels are arranged at the missing G pixel positions, the two color signals are collectively referred to as X, X pixels, or the like in the following description.

The vertical interpolation G calculating unit 203 is interpolation candidate calculating means, first interpolation calculating means, that uses neighboring G pixels in the vertical direction as shown in FIG. 8 to calculate a G interpolation candidate based on an interpolation formula $G_v=(G_1+G_2)/2$, outputs and stores the candidate in the memory 206, and outputs the candidate to the subtracting unit 209. FIG. 8 is a diagram depicting positions of adjacent G signals on the Bayer array in the up and down directions used for vertical direction interpolation of a missing G signal position.

The horizontal interpolation G calculating unit 204 is interpolation candidate calculating means, second interpolation calculating means, that uses neighboring G pixels in the horizontal direction as shown in FIG. 9 to calculate a G interpolation candidate based on an interpolation formula $G_h=(G_3+G_4)/2$, outputs and stores the candidate in the memory 207, and outputs the candidate to the subtracting unit 210. FIG. 9 is a diagram depicting positions of adjacent G signals on the Bayer array in the left and right directions used for horizontal direction interpolation of a missing G signal position.

Figures 10, 11, 12:
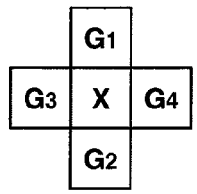
FIG. 10 is a diagram depicting positions of adjacent G signals on the Bayer array in the up, down, left, and right directions used for adjacent four pixel interpolation of a missing G signal position according to the first embodiment.
FIG. 11 is a diagram depicting positions of color difference signals on the Bayer array used for calculating a surrounding similarity among color differences of missing G signal positions calculated based on the vertical direction interpolation according to the first embodiment.
FIG. 12 is a diagram depicting positions of color difference signals on the Bayer array used for calculating a surrounding similarity among color differences of missing G signal positions calculated based on the horizontal direction interpolation according to the first embodiment.

The four pixel interpolation G calculating unit 205 is interpolation candidate calculating means, third interpolation calculating means that uses neighboring G pixels in the vertical and horizontal four directions as shown in FIG. 10 to calculate a G interpolation candidate based on an interpolation formula $G_a=(G_1+G_2+G_3+G_4)/4$, outputs and stores the candidate in the memory 208, and outputs the candidate to the subtracting unit 211. FIG. 10 is a diagram depicting positions of adjacent G signals on the Bayer array in the up, down, left, and right directions used for adjacent four pixel interpolation of a missing G signal position.

The subtracting unit 209 is color difference candidate calculating means that accepts X pixels at the same positions as the missing G pixels from the memory 201, calculates color difference signals (color difference candidates) $X-G_v$, and outputs and stores the signals in the memory 212.

The subtracting unit 210 is color difference candidate calculating means that accepts X pixels at the same positions as the missing G pixels from the memory 201, calculates color difference signals (color difference candidates) $X-G_h$, and outputs and stores the signals in the memory 213.

The subtracting unit 211 is color difference candidate calculating means that accepts X pixels at the same positions as the missing G pixels from the memory 201, calculates color difference signals (color difference candidates) $X-G_a$, and outputs and stores the signals in the memory 214.

The surrounding similarity calculating units 215, 216, and 217 later use the color difference signals stored in the memories 212, 213, and 214 to calculate surrounding similarities. The surrounding similarity calculating units 215, 216, and 217 are designed to calculate the similarities of color difference signals in neighboring areas including three rows and three columns of same-type color difference signals (i.e., color difference signals with the same type of G interpolation candidates $G_v$, $G_h$, and $G_a$ used for calculating the color difference candidates and with the same color X, and therefore, for example, $R-G_v$ and $B-G_v$ are not the same-type color difference signals) as shown in FIGS. 11 to 13. Therefore, the memories 212, 213, and 214 as well as the memories 206, 207, and 208 can store at least five lines of data to obtain a delay that allows the surrounding similarity calculating units 215, 216, and 217 to calculate the similarity.

When the color difference signals enough to execute the surrounding similarity calculation process of color differences are stored in the memories 212, 213, and 214, the memories 212, 213, and 214 output the color difference signals $X-G_v$, $X-G_h$, and $X-G_a$ to the surrounding similarity calculating units 215, 216, and 217, respectively.

The surrounding similarity calculating unit 215 serves as optimal color difference selecting means and selecting means and calculates color difference surrounding similarities $S_v(k, l)$ at missing G pixel positions (k,l) as follows.

As shown in FIG. 11, the surrounding similarity calculating unit 215 first uses a central color difference signal $(X-G_v)_{k,l}$ ("$(X-G_v)_{k,l}$" is an abbreviation of "$X(k,l)-G_v(k,l)$", the same applies hereinafter) and eight color difference signals $(X-G_v)_{k-2,l-2}$, $(X-G_v)_{k,l-2}$, $(X-G_v)_{k+2,l-2}$, $(X-G_v)_{k-2,l}$, $(X-G_v)_{k+2,l}$, $(X-G_v)_{k-2,l+2}$, $(X-G_v)_{k,l+2}$, and $(X-G_v)_{k+2,l+2}$ at surrounding positions of the central color difference signal to calculate a first color difference surrounding similarity candidate $Sv_1(k,l)$ as follows. FIG. 11 is a diagram depicting positions of color difference signals on the Bayer array used for calculating the surrounding similarity among the color differences of the missing G signal positions calculated based on the vertical direction interpolation.

$$Sv_1(k, 1) = |(X-G_v)_{k-2,l-2} - (X-G_v)_{k,1}| + |(X-G_v)_{k,1-2} - (X-G_v)_{k,1}| +$$
$$|(X-G_v)_{k+2,1-2} - (X-G_v)_{k,1}| + |(X-G_v)_{k-2,1} - (X-G_v)_{k,1}| +$$
$$|(X-G_v)_{k+2,1} - (X-G_v)_{k,1}| + |(X-G_v)_{k-2,1+2} - (X-G_v)_{k,1}| +$$
$$|(X-G_v)_{k,1+2} - (X-G_v)_{k,1}| + |(X-G_v)_{k+2,1+2} - (X-G_v)_{k,1}|$$

The surrounding similarity calculating unit 215 further uses the central color difference signal $(X-G_v)_{k,l}$ and two color difference signals $(X-G_v)_{k,l-2}$ and $(X-G_v)_{k,l+2}$ at surrounding positions in the part surrounded by thick lines in FIG. 11 to calculate a difference absolute value sum, uses other color difference signals to calculate other difference absolute value sums, and further weights the difference absolute value sums as shown below to calculate a second color difference surrounding similarity candidate $Sv_2(k,l)$.

$$Sv_1(k, 1) = |(X-G_v)_{k-2,l-2} - (X-G_v)_{k,1}| + |(X-G_v)_{k,1-2} - (X-G_v)_{k,1}| +$$
$$|(X-G_v)_{k+2,1-2} - (X-G_v)_{k,1}| + |(X-G_v)_{k-2,1} - (X-G_v)_{k,1}| +$$
$$|(X-G_v)_{k+2,1} - (X-G_v)_{k,1}| + |(X-G_v)_{k-2,1+2} - (X-G_v)_{k,1}| +$$
$$|(X-G_v)_{k,1+2} - (X-G_v)_{k,1}| + |(X-G_v)_{k+2,1+2} - (X-G_v)_{k,1}|$$

P and Q are arbitrary constants satisfying 2P+6Q=8, in which $4 \geq P > 1$ and $1 > Q \geq 0$.

The surrounding similarity calculating unit 215 compares the calculated first color difference surrounding similarity candidate $Sv_1(k,l)$ and the second color difference surrounding similarity candidate $Sv_2(k,l)$ and employs, as a color difference surrounding similarity $Sv(k,l)$, the candidate with not a larger value (candidate with a smaller value when the candidates are not the same value), i.e. the candidate with not low similarity (candidate with a higher similarity when the candidates are not the same similarity).

Setting the candidate with not a larger value between two color difference surrounding similarity candidates $Sv_1(k,l)$ and $Sv_2(k,l)$ as the color difference surrounding similarity $Sv(k,l)$ makes it possible to deal with both of a steep vertical edge border section and a gradually changing vertical edge border, thereby reducing determination errors.

Similarly, the surrounding similarity calculating unit 216 serves as optimal color difference selecting means and selecting means and calculates color difference surrounding similarities $Sh(k,l)$ at missing G pixel positions $(k,l)$ as follows.

As shown in FIG. 12, the surrounding similarity calculating unit 216 first uses a central color difference signal $(X-G_h)_{k,l}$ and eight color difference signals $(X-G_h)_{k-2,l-2}$, $(X-G_h)_{k,l-2}$, $(X-G_h)_{k+2,l-2}$, $(X-G_h)_{k-2,l}$, $(X-G_h)_{k+2,l}$, $(X-G_h)_{k-2,l+2}$, $(X-G_h)_{k,l+2}$, and $(X-G_h)_{k+2,l+2}$ at surrounding positions of the central color difference signal to calculate a first color difference surrounding similarity candidate $Sh_1(k,l)$ as follows. FIG. 12 is a diagram depicting positions of color difference signals on the Bayer array used for calculating the surrounding similarity among the color differences of the missing G signal positions calculated based on the horizontal direction interpolation.

$$Sh_1(k, 1) = |(X - G_h)_{k-2,1-2} - (X - G_h)_{k,1}| + |(X - G_h)_{k,1-2} - (X - G_h)_{k,1}| +$$
$$|(X - G_h)_{k+2,1-2} - (X - G_h)_{k,1}| + |(X - G_h)_{k-2,1} - (X - G_h)_{k,1}| +$$
$$|(X - G_h)_{k+2,1} - (X - G_h)_{k,1}| + |(X - G_h)_{k-2,1+2} - (X - G_h)_{k,1}| +$$
$$|(X - G_h)_{k,1+2} - (X - G_h)_{k,1}| + |(X - G_h)_{k+2,1+2} - (X - G_h)_{k,1}|$$

The surrounding similarity calculating unit 216 further uses the central color difference signal $(X-G_h)_{k,l}$ and two color difference signals $(X-G_h)_{k-2,l}$ and $(X-G_h)_{k+2,l}$ at surrounding positions in the part surrounded by thick lines in FIG. 12 to calculate a difference absolute value sum, uses other color difference signals to calculate other difference absolute value sums, and further weights the difference absolute value sums as shown below to calculate a second color difference surrounding similarity candidate $Sh_2(k,l)$.

$$Sh_2(k, 1) =$$
$$\{|(X - G_h)_{k-2,1} - (X - G_h)_{k,1}| + |(X - G_h)_{k+2,1} - (X - G_h)_{k,1}|\} \times P +$$
$$\{|(X - G_h)_{k-2,1-2} - (X - G_h)_{k,1}| +$$
$$|(X - G_h)_{k,1-2} - (X - G_h)_{k,1}| + |(X - G_h)_{k+2,1-2} - (X - G_h)_{k,1}| +$$
$$|(X - G_h)_{k-2,1+2} - (X - G_h)_{k,1}| + |(X - G_h)_{k,1+2} - (X - G_h)_{k,1}| +$$
$$|(X - G_h)_{k+2,1+2} - (X - G_h)_{k,1}|\} \times Q$$

P and Q are arbitrary constants satisfying $2P+6Q=8$, in which $4 \geq P > 1$ and $1 > Q \geq 0$.

The surrounding similarity calculating unit 216 compares the calculated first color difference surrounding similarity candidate $Sh_1(k,l)$ and the second color difference surrounding similarity candidate $Sh_2(k,l)$ and employs, as a color difference surrounding similarity $Sh(k,l)$, the candidate with not a larger value (candidate with smaller value when the candidates are not the same value), i.e. the candidate with not a lower similarity (candidate with a higher similarity when the candidates are not the same similarity).

Setting the candidate with not a larger value between two color difference surrounding similarity candidates $Sh_1(k,l)$ and $Sh_2(k,l)$ as the color difference surrounding similarity $Sh(k,l)$ makes it possible to deal with both of a steep horizontal edge border section and a gradually changing horizontal edge border, thereby reducing determination errors.

The surrounding similarity calculating unit 217 serves as optimal color difference selecting means and calculates a color difference surrounding similarity $Sa(k,l)$ at a missing G pixel position $(k,l)$ as follows.

As shown in FIG. 13, the surrounding similarity calculating unit 217 uses a central color difference signal $(X-G_a)_{k,l}$ and eight color difference signals $(X-G_a)_{k-2,l-2}$, $(X-G_a)_{k,l-2}$, $(X-G_a)_{k+2,l-2}$, $(X-G_a)_{k-2,l}$, $(X-G_a)_{k+2,l}$, $(X-G_a)_{k-2,l+2}$, $(X-G_a)_{k,l+2}$, and $(X-G_a)_{k+2,l+2}$ at surrounding positions of the central color difference signal to calculate a difference absolute value sum as follows to thereby calculate the color difference surrounding similarity $S_a(k,l)$. FIG. 13 is a diagram depicting positions of color difference signals on the Bayer array used for calculating the surrounding similarity among the color differences calculated based on the adjacent four pixel interpolation of the missing G signal positions.

$$Sa(k, 1) = |(X - G_a)_{k-2,1-2} - (X - G_a)_{k,1}| + |(X - G_a)_{k,1-2} - (X - G_a)_{k,1}| +$$
$$|(X - G_a)_{k+2,1-2} - (X - G_a)_{k,1}| + |(X - G_a)_{k-2,1} - (X - G_a)_{k,1}| +$$
$$|(X - G_a)_{k+2,1} - (X - G_a)_{k,1}| + |(X - G_a)_{k-2,1+2} - (X - G_a)_{k,1}| +$$
$$|(X - G_a)_{k,1+2} - (X - G_a)_{k,1}| + |(X - G_a)_{k+2,1+2} - (X - G_a)_{k,1}|$$

The color difference surrounding similarities $Sv(k,l)$, $Sh(k,l)$, and $Sa(k,l)$ calculated by the surrounding similarity calculating units 215, 216, and 217 are inputted to the determining unit 218 as optimal color difference selecting means. Although the color difference surrounding similarities $Sv(k,l)$, $Sh(k,l)$, and $Sa(k,l)$ are defined as the difference absolute value sums of the target color differences and the surrounding color differences, in place of the definition, the similarities may be defined as difference square sums.

The determining unit 218 compares values of the three color difference surrounding similarities $Sv(k,l)$, $Sh(k,l)$, and $Sa(k,l)$, selects a G interpolation method that provides the minimum color difference surrounding similarity, and outputs a selection signal corresponding to the selected interpolation method to the color difference selecting unit 219 and the interpolation G selecting unit 220. If there are a plurality of minimum color difference surrounding similarities, the determining unit 218 determines the priorities in order of, for example, $Sa(k,l)$, $Sh(k,l)$, and $Sv(k,l)$ and selects a G interpolation method according to the priorities.

The color difference selecting unit 219 serves as optimal color difference selecting means and selecting means. Based on the selection signal inputted from the determining unit 218, the color difference selecting unit 219 selects and accepts a color difference candidate of a missing G pixel position $(k,l)$ corresponding to the selection signal, i.e. one of the color difference candidate $(X-G_v)_{k,l}$ stored in the memory 212, the color difference candidate $(X-G_h)_{k,l}$ stored in the memory 213, and the color difference candidate $(X-G_a)_{k,l}$ stored in the memory 214, and then outputs the candidate as a color difference to the color difference interpolation processing unit 103. More specifically, the color difference selecting unit 219 is designed to output, to the color difference interpolation processing unit 103, $(X-G_v)_{k,l}$ when the color difference surrounding similarity Sv(k,l) is the smallest, $(X-G_h)_{k,l}$ when Sh(k,l) is the smallest, and $(X-G_a)_{k,l}$ when Sa(k,l) is the smallest. The color difference signals are outputted to the color difference interpolation processing unit 103 in order of raster scanning from upper left to lower right in a two-dimensional array as shown in FIG. 7.

The interpolation G selecting unit 220 serves as optimal color difference selecting means and G interpolation value outputting means. Based on the selection signal inputted from the determining unit 218, the interpolation G selecting unit 220 selects and accepts a G interpolation candidate of a missing G pixel position (k,l) corresponding to the selection signal, i.e. one of the G interpolation candidate $G_v(k,l)$ stored in the memory 206, the G interpolation candidate $G_h(k,l)$ stored in the memory 207, and the G interpolation candidate $G_a(k,l)$ stored in the memory 208, and then outputs the candidate to the RGB calculating unit 104. More specifically, the interpolation G selecting unit 220 is designed to output, to the RGB calculating unit 104, $G_v(k,l)$ when the color difference surrounding similarity $S_v(k,l)$ is the smallest, $G_h(k,l)$ when the color difference surrounding similarity $S_h(k,l)$ is the smallest, and $G_a(k,l)$ when the color difference surrounding similarity $S_a(k,l)$ is the smallest.

The memory 221 temporarily stores data of $G_s$ pixels obtained as picked up pixels. The G interpolation color difference calculating unit 102 is designed to output G signals in a two-dimensional array without missing pixel as shown in FIG. 6 to the RGB calculating unit 104 in order of raster scanning from upper left to lower right. Therefore, the memory 221 is designed to store the data of $G_s$ pixels until the timing of reading out in order of raster scanning and output the data of $G_s$ pixels to the RGB calculating unit 104 at the timing.

FIG. 3 is a block diagram of a configuration of the color difference interpolation processing unit 103.

The color difference interpolation processing unit 103 includes a color difference choosing unit 301, a memory 302, a memory 303, an interpolation processing unit 304, and an interpolation processing unit 305.

The color difference signal $X-G_i$ from the G interpolation color difference calculating unit 102 is designed to be inputted to the color difference choosing unit 301 of the color difference interpolation processing unit 103. When the color difference signal $X-G_i$ is inputted, the color difference choosing unit 301 outputs the signal to the memory 302 if the color difference signal $X-G_i$ is $R-G_i$ and outputs the signal to the memory 303 if the color difference signal $X-G_i$ is $B-G_i$.

The memory 302 stores the color difference signal $R-G_i$ inputted from the color difference choosing unit 301. The memory 302 includes a memory capacity capable of storing the number of lines necessary to interpolate the pixel missing part of the color difference signal $R-G_i$.

Similarly, the memory 303 stores the color difference signal $B-G_i$ inputted from the color difference choosing unit 301. The memory 303 includes a memory capacity capable of storing the number of lines necessary to interpolate the pixel missing part of the color difference signal $B-G_i$.

When the interpolation process can be started, the memories 302 and 303 output pixel data necessary for the interpolation process to the interpolation processing units 304 and 305, respectively.

The interpolation processing unit 304 uses, for example, the following linear interpolation formula to interpolate the color difference signal R–G, generates color difference signals R–G at all pixel positions, and then outputs the signals to the RGB calculating unit 104.

$$(R-G)_{x,y} = \frac{1}{No}(111)\begin{pmatrix}(R-G)_{x-1,y-1} & (R-G)_{x,y-1} & (R-G)_{x+1,y-1}\\(R-G)_{x-1,y} & (R-G)_{x,y} & (R-G)_{x+1,y}\\(R-G)_{x-1,y+1} & (R-G)_{x,y+1} & (R-G)_{x+1,y+1}\end{pmatrix}\begin{pmatrix}1\\1\\1\end{pmatrix}$$

No herein denotes the number of non-missing pixels $R-G_i$ in the 3×3 matrix described above.

Similarly, the interpolation processing unit 305 uses, for example, the following linear interpolation formula to interpolate the color difference signal B–G, generates color difference signals B–G at all pixel positions, and then outputs the signals to the RGB calculating unit 104.

$$(B-G)_{x,y} = \frac{1}{No}(111)\begin{pmatrix}(B-G)_{x-1,y-1} & (B-G)_{x,y-1} & (B-G)_{x+1,y-1}\\(B-G)_{x-1,y} & (B-G)_{x,y} & (B-G)_{x+1,y}\\(B-G)_{x-1,y+1} & (B-G)_{x,y+1} & (B-G)_{x+1,y+1}\end{pmatrix}\begin{pmatrix}1\\1\\1\end{pmatrix}$$

No herein denotes the number of non-missing pixels $B-G_i$ in the 3×3 matrix described above.

FIG. 4 is a block diagram of a configuration of the RGB calculating unit 104.

The RGB calculating unit 104 includes a memory 401, an adding unit 402, an adding unit 403, a color matrix processing unit 404, a γ correcting unit 405, a γ correcting unit 406, and a γ correcting unit 407.

The G signals from the G interpolation color difference calculating unit 102 is inputted and stored in the memory 401 of the RGB calculating unit 104. The memory 401 holds the G signals until the color difference signals R–G and the color difference signals B–G at the same pixel positions as the G signals are inputted from the color difference interpolation processing unit 103 (thus, functions as a memory for delay).

The color difference signals R–G from the color difference interpolation processing unit 103 is inputted to the adding unit 402 of the RGB calculating unit 104. The adding unit 402 then reads out the G signals at the same positions as the inputted color difference signals R–G from the memory 401 and adds the color difference signals R–G and the G signals to generate R signals and then outputs the R signals to the color matrix processing unit 404.

The color difference signals B–G from the color difference interpolation processing unit 103 is inputted to the adding unit 403 of the RGB calculating unit 104. The adding unit 403 then reads out the G signals at the same positions as the inputted color difference signals B–G from the memory 401 and adds the color difference signals B–G and the G signals to generate B signals and then outputs the B signals to the color matrix processing unit 404.

The memory 401 outputs the G signals at the same pixel positions as the R signal calculated by the adding unit 402 and the B signals calculated by the adding unit 403 to the color matrix processing unit 404.

As a result of the processes, the R signal, the G signal, and the B signal at each pixel position are restored.

When the restored R signals, G signals, and B signals are inputted, the color matrix processing unit 404 converts the signals to, for example, signals of an sRGB space. The color matrix processing unit 404 then outputs the converted R signals to the γ correcting unit 405, the converted B signals to the γ correcting unit 406, and the converted G signals to the γ correcting unit 407.

If, for example, the converted R, G, and B signals inputted from the color matrix processing unit 404 are signals of twelve bits, the γ correcting units 405, 406, and 407 respectively apply the γ correction to the signals to generate Rγ signals, Gγ signals, and Bγ signals converted to eight bits and then output the signals to the compression recording unit 105.

The subsequent processes by the compression recording unit 105 are as described above.

Figure 14:
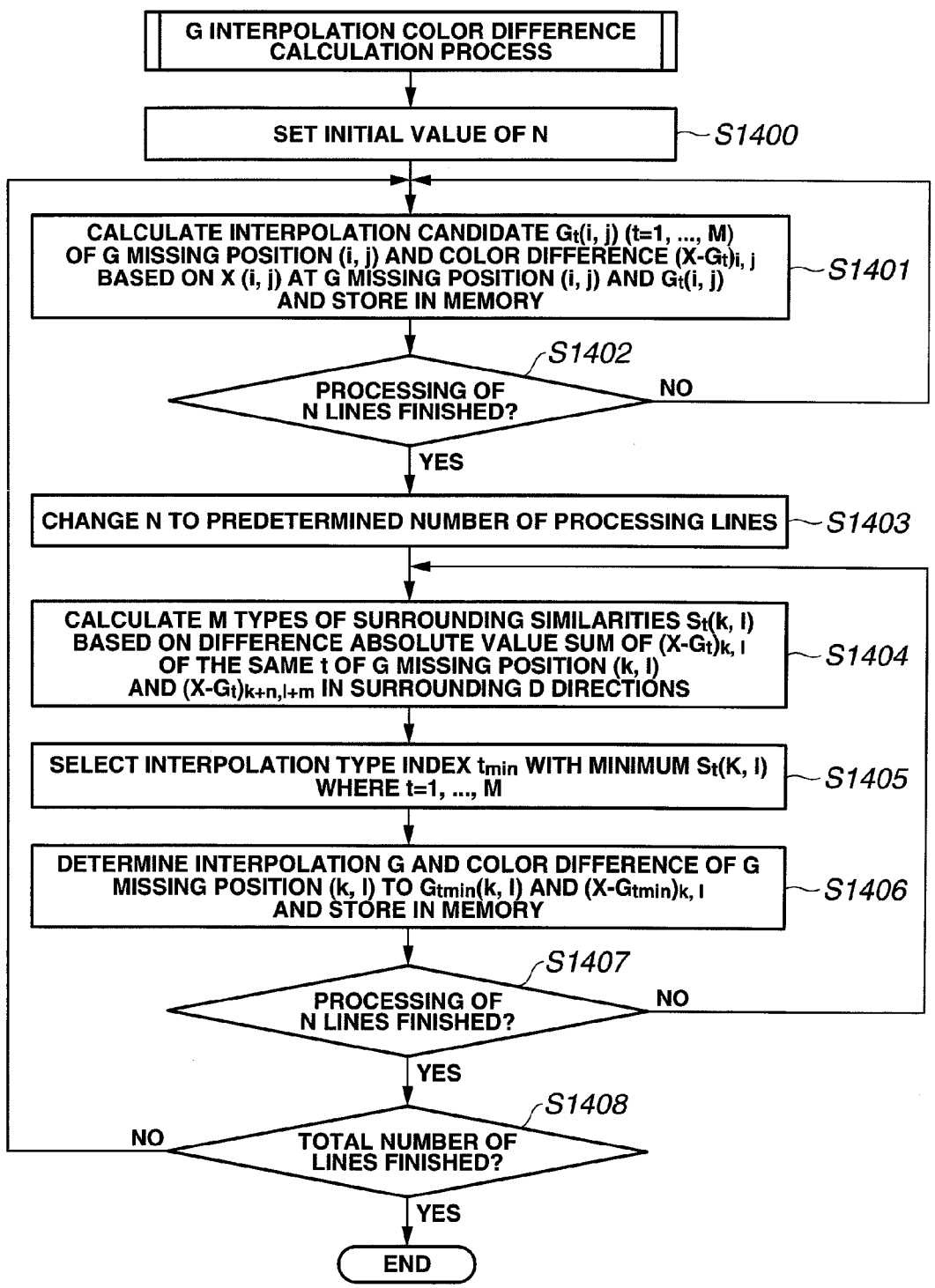
FIG. 14 is a flow chart of a summary of a process executed by the G interpolation color difference calculating unit according to the first embodiment and other embodiments.

FIG. 14 is a flow chart of a summary of the process executed by the G interpolation color difference calculating unit 102. The process described with reference to FIG. 14 is not only applied to the configuration of the G interpolation color difference calculating unit 102 in the first embodiment as shown in FIG. 2, but is also commonly applied to the configuration of the G interpolation color difference calculating unit 102 shown in FIG. 16 of a second embodiment described below, the configuration of the G interpolation color difference calculating unit 102 of a third embodiment shown in FIG. 19, and the configuration of the G interpolation color difference calculating unit 102 of a fourth embodiment shown in FIG. 23. Since the process may not depend on a specific embodiment, the reference numerals will be appropriately omitted in the description of FIG. 14.

Once the process is started, the number of lines N of a memory for storing G interpolation candidate signals of G signal missing positions and a memory for storing color difference candidate signals of the G signal missing positions in a single-plate Bayer array image that is picked up by the image pickup unit 101 and stored in a memory and that is inputted to the G interpolation color difference calculating unit 102 in order of raster scanning is set to an initial value (step S1400).

Subsequently, G signals around a G signal missing position (ij) are used to calculate M types (M is an integer two or greater) of G interpolation candidates $G_t(i,j)$ (t=1, ..., M) of the missing position, and the M types of G interpolation candidates $G_t(i,j)$ are subtracted from the X(i,j) signal (as described, the X signal denotes an R signal or a B signal. The same applies hereinafter) of the G signal missing position (i,j) to thereby calculate M types of color difference candidates $(X-G_t)_{i,j}$, which are then stored in the memory (step S1401).

Although M=3 in the first embodiment and the second embodiment to be described next and M=4 in the third and fourth embodiments described below, more types of interpolation candidates may also be prepared. Although the linear interpolation is employed as an interpolation method above, the arrangement is not limited to this. Cubic interpolation or other non-linear interpolation may also be employed. Furthermore, although G signals around the G signal missing position (i,j) are used for the interpolation, surrounding R signals and B signals may also be used for the interpolation. Therefore, the interpolation method should not be construed as being limited, and an arbitrary interpolation method can also be employed.

Whether processing of N lines is finished is determined (step S1402). If it is determined that processing of N lines is not finished, the process returns to step S1401, and the above processes are executed.

On the other hand, if it is determined in step S1402 that processing of N lines is finished, the number of lines N is set to a predetermined number of processing lines required to determine the interpolation G signals and the color difference signals as described below (step S1403).

A surrounding similarity $S_t(k,l)$ is then calculated based on a difference absolute value sum (may be weighted depending on the calculating direction of difference) of a color difference $(X-G_t)_{k,l}$ calculated based on a same interpolation type t of the G signal missing position (k,l) stored in the memory and color differences $(X-G_t)_{k+n,l+m}$ (although n=−2, 0, 2 and m=−2, 0, 2 with n and m not 0 at the same time in the first embodiment and second to fourth embodiments described below, color differences of a wider surrounding area may also be used) in neighboring D directions (D is an integer 1 or greater, and D=8, i.e. neighboring eight directions, in the example shown in FIGS. 11 to 13) (step S1404). The smaller the value of the surrounding similarity $S_t(k,l)$, the higher the similarity.

Values of the calculated M types of surrounding similarities $S_t(k,l)$ (t=1, ..., M) (M=3 in the first embodiment) are compared to select a minimum (highest in similarity) interpolation type index $t_{min}$ (step S1405).

Based on the selected interpolation type index $t_{min}$, the interpolation G signal of the G signal missing position (k,l) is determined to be $G_{tmin}(k,l)$, while the color difference signal of the G signal missing position (k,l) is determined to be $(X-G_{tmin})_{k,l}$, and the signals are stored in the memory (step S1406).

Whether processing of N lines is finished is then determined (step S1407). If it is determined that the processing of N lines is not yet finished, the process returns to step S1404, and the above processes are executed.

If it is determined in step S1407 that the processing of N lines is finished, whether processing of the total number of lines as an output image is finished is further determined (step S1408).

If it is determined that the processing of the total number of lines is not yet finished, the process returns to step S1401 and the above processes are executed while unnecessary $G_t$, $(X-G_t)$, and $S_t$ of a predetermined number of lines stored in the memory are replaced by calculated new values.

On the other hand, if it is determined in step S1408 that the processing of the total number of lines is finished, the G interpolation color difference calculation process is terminated.

Figure 15:
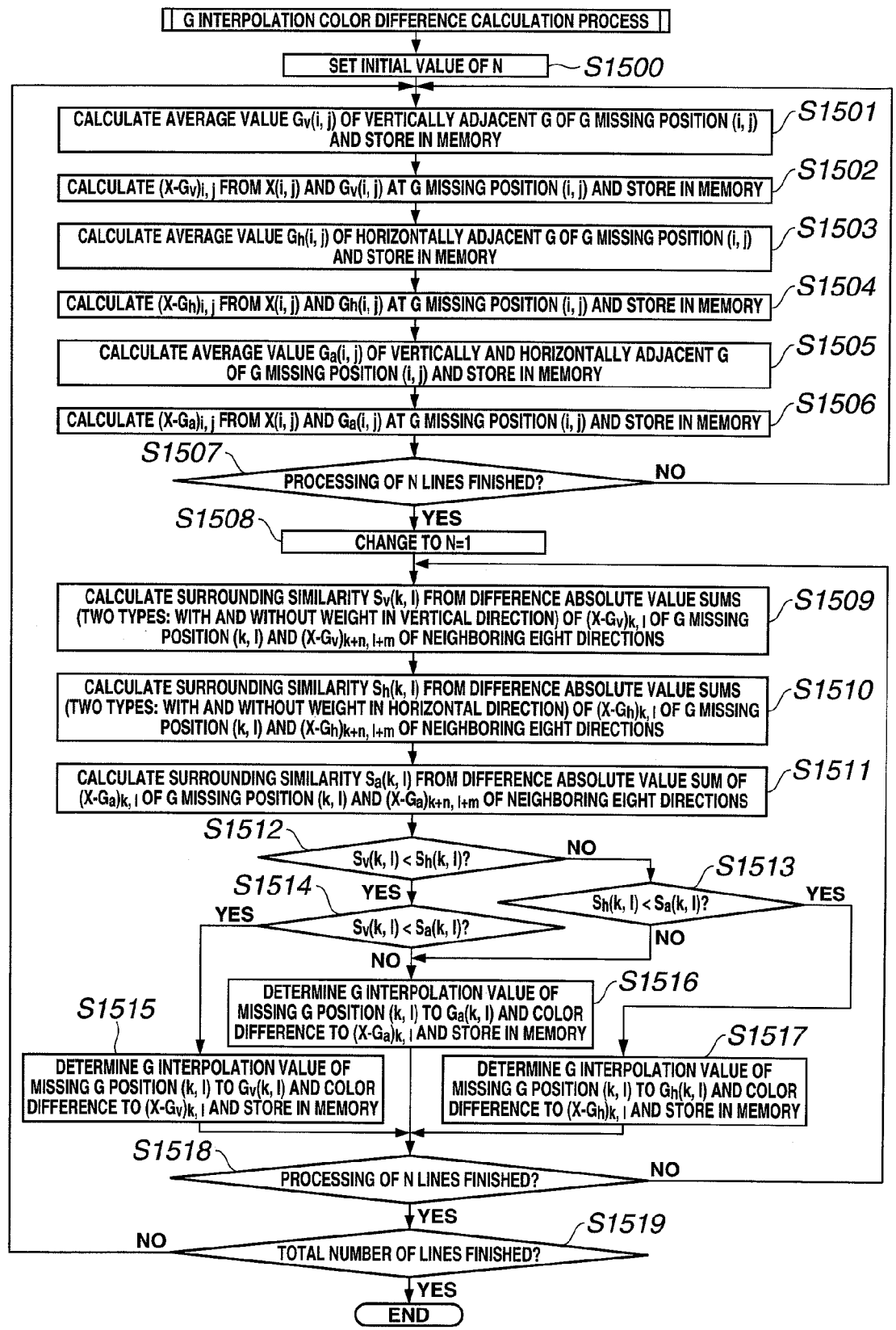
FIG. 15 is a flow chart of a process of the G interpolation color difference calculating unit in a configuration shown in FIG. 2 according to the first embodiment.

FIG. 15 is a flow chart of a process of the G interpolation color difference calculating unit 102 in a configuration shown in FIG. 2.

The single-plate Bayer array image that is picked up by the image pickup unit 101 and that is stored in the memory is designed to be inputted to the G interpolation color difference calculating unit 102 in order of raster scanning. As described, the G interpolation color difference calculating unit 102 is designed to store the $R_s$ signals and the $B_s$ signals in the single-plate Bayer array image inputted in order of raster scanning to the memory 201 and the $G_s$ signals to the memory 202 for a predetermined amount of data.

With the predetermined amount of data being stored in the memories 201 and 202, the number of lines N of the memories 206 to 208 for storing the G interpolation candidate values of missing G signal and the number of lines N of the memories 212 to 214 for storing the color difference candidate values of missing G signal are set to a predetermined initial value (N=5 in the first embodiment) (step S1500).

The vertical interpolation G calculating unit 203 calculates an average value of the G signals above and below the G signal missing position (i,j) as shown in FIG. 8, and the average value is stored in the memory 206 as an interpolation candidate $G_v(i,j)$ (step S1501). The subtracting unit 209 subtracts the interpolation candidate $G_v(i,j)$ from X(i,j) of the G signal missing position (i,j) to calculate a color difference candidate $(X-G_v)_{i,j}$, and the candidate is stored in the memory 212 (step S1502).

Subsequently, an average value of the G signals left and right of the G signal missing position (i,j) as shown in FIG. 9 is calculated, and the average value is stored in the memory 207 as an interpolation candidate $G_h(i,j)$ (step S1503). The subtracting unit 210 subtracts the interpolation candidate $G_h(i,j)$ from $X(i,j)$ of the G signal missing position (i,j) to calculate a color difference candidate $(X-G_h)_{i,j}$, and the candidate is stored in the memory 213 (step S1504).

An average value of the G signals above, below, left, and right of the G signal missing position (i,j) as shown in FIG. 10 is calculated, and the average value is stored in the memory 208 as an interpolation candidate $G_a(i,j)$ (step S1505). The subtracting unit 211 subtracts the interpolation candidate $G_a(i,j)$ from $X(i,j)$ of the G signal missing position (i,j) to calculate a color difference candidate $(X-G_a)_{i,j}$, and the candidate is stored in the memory 214 (step S1506).

Whether the processing of N lines is finished is determined at this point (step S1507). If it is determined that the processing of N lines is not finished yet, the process returns to step S1501, and the above processes are executed.

In step S1507, if it is determined that the processing of N lines is finished, N is set to 1 (step S1508).

The surrounding similarity calculating unit 215 then calculates, as a color difference surrounding similarity candidate $Sv_1(k,l)$, a difference absolute value sum of the color difference $(X-G_v)_{k,l}$ calculated based on the same interpolation type (X has the same color, and the type of G is the same $G_v$) of the G signal missing position (k,l) stored in the memory 212 and same-type color differences $(X-G_v)_{k+n,l+m}$ in neighboring eight directions (n=−2, 0, 2, m=−2, 0, 2, and n and m are not 0 at the same time). The surrounding similarity calculating unit 215 further applies a heavy weight on vertically neighboring same-type color differences $(X-G_v)_{k+n,l+m}$ (n=0, and m=−2, 2) among the same-type color differences $(X-G_v)_{k+n,l+m}$ in the neighboring eight directions to obtain a difference absolute value sum to thereby calculate a color difference surrounding similarity candidate $Sv_2(k,l)$. The surrounding similarity calculating unit 215 then calculates a surrounding similarity $Sv(k,l)$ based on the calculated color difference surrounding similarity candidate $Sv_1(k,l)$ and the color difference surrounding similarity candidate $Sv_2(k,l)$ (step S1509).

Similarly, the surrounding similarity calculating unit 216 calculates, as a color difference surrounding similarity candidate $Sh_1(k,l)$, a difference absolute value sum of the color difference $(X-G_h)_{k,l}$ calculated based on the same interpolation type (X has the same color, and the type of G is the same $G_h$) of the G signal missing position (k,l) stored in the memory 213 and same-type color differences $(X-G_h)_{k+n,l+m}$ in neighboring eight directions (n=−2, 0, 2, m=−2, 0, 2, and n and m are not 0 at the same time). The surrounding similarity calculating unit 216 further applies a heavy weight on horizontally neighboring same-type color differences $(X-G_h)_{k+n,l+m}$ (n=−2, 2, and m=0) among the same-type color differences $(X-G_h)_{k+n,l+m}$ in the neighboring eight directions to obtain a difference absolute value sum to thereby calculate a color difference surrounding similarity candidate $Sh_2(k,l)$. The surrounding similarity calculating unit 216 then calculates a surrounding similarity $Sh(k,l)$ based on the calculated color difference surrounding similarity candidate $Sh_1(k,l)$ and the color difference surrounding similarity candidate $Sh_2(k,l)$ (step S1510).

Similarly, the surrounding similarity calculating unit 217 calculates, as a surrounding similarity $Sa(k,l)$, a difference absolute value sum of the color difference $(X-G_a)_{k,l}$ calculated based on the same interpolation type (X has the same color, and the type of G is the same $G_a$) of the G signal missing position (k,l) stored in the memory 214 and color differences $(X-G_a)_{k+n,l+m}$ in neighboring eight directions (n=−2, 0, 2, m=−2, 0, 2, and n and m are not 0 at the same time (step S1511).

As described, the smaller the values of the calculated surrounding similarities $Sv(k,l)$, $Sh(k,l)$, and $Sa(k,l)$, the higher the similarities.

Once the three surrounding similarities $Sv(k,l)$ $Sh(k,l)$, and $Sa(k,l)$ are calculated, the surrounding similarity $Sv(k,l)$ and the surrounding similarity $Sh(k,l)$ are first compared (step S1512).

If the surrounding similarity $Sv(k,l)$ is determined to be smaller than the surrounding similarity $Sh(k,l)$, the surrounding similarity $Sv(k,l)$ and the surrounding similarity $Sa(k,l)$ are further compared (step S1514).

On the other hand, if the surrounding similarity $Sv(k,l)$ is determined to be equal to or greater than the surrounding similarity $Sh(k,l)$ in step S1512, the surrounding similarity $Sh(k,l)$ and surrounding similarity $Sa(k,l)$ are further compared (step S1513).

If the surrounding similarity $Sv(k,l)$ is determined to be smaller than the surrounding similarity $Sa(k,l)$ in step S1514, the signal interpolation value of the G signal missing position (k,l) is determined to be $G_v(k,l)$, the color difference is determined to be $(X-G_v)_{k,l}$, and the signal interpolation value and the color difference are stored in the memory (step S1515).

If the surrounding similarity $Sv(k,l)$ is determined to be equal to or greater than the surrounding similarity $Sa(k,l)$ in step S1514, or if the surrounding similarity $Sh(k,l)$ is determined to be equal to or greater than the surrounding similarity $Sa(k,l)$ in step S1513, the signal interpolation value of the G signal missing position (k,l) is determined to be $G_a(k,l)$, the color difference is determined to be $(X-G_a)_{k,l}$, and the signal interpolation value and the color difference are stored in the memory (step S1516).

Furthermore, if the surrounding similarity $Sh(k,l)$ is determined to be smaller than the surrounding similarity $Sa(k,l)$ in step S1513, the signal interpolation value of the G signal missing position (k,l) is determined to be $G_h(k,l)$, the color difference is determined to be $(X-G_h)_{k,l}$, and the signal interpolation value and the color difference are stored in the memory (step S1517).

After the execution of the process of one of step S1515, step S11516, and step S1517, whether processing of N lines is finished is determined (step S1518). If it is determined that the processing is not finished yet, the process returns to step S1509, and the above processes are executed.

On the other hand, if it is determined that the processing of N lines is finished in step S1518, whether processing of the total number of lines as an output image is finished is determined (step S1519).

If it is determined that the processing of the total number of lines is not finished yet, the process returns to step S1501, and the above processes are executed while $G_v$, $G_h$, $G_a$, $(X-G_v)$, $(X-G_h)$, $(X-G_a)$, Sv, Sh, and Sa of unnecessary lines stored in the memory are replaced by calculated new values.

If it is determined that the processing of the total number of lines is finished in step S1519, the G interpolation color difference calculation process is terminated.

According to the first embodiment, a missing G pixel that is an unspecified parameter when calculating the color difference can be selected from a plurality of types of G interpolation candidates as the most probable pixel based on the precondition that the correlation of the color difference signals are locally high. As a result, a missing G pixel optimal for the local edge of image is interpolated, thereby making it possible to prevent the generation of false color and the resolution degradation of the edge portions in the vertical direction and the horizontal direction.

Since the surrounding similarity is calculated based on the color difference, the chroma is not reduced, and the false color can be effectively reduced.

Second Embodiment

Figure 16:
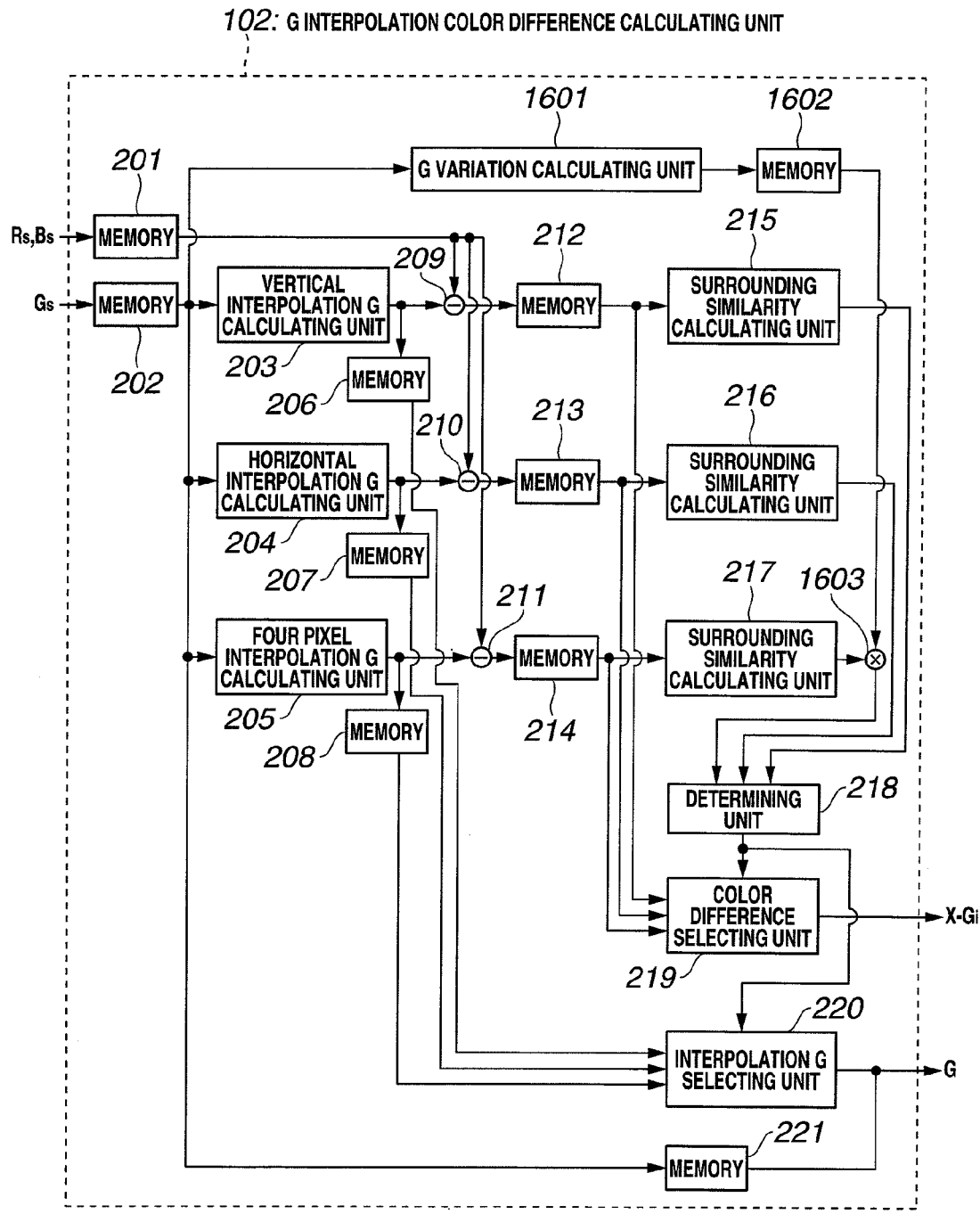
FIG. 16 is a block diagram of a configuration of the G interpolation color difference calculating unit according to a second embodiment of the present invention.
Figure 17:
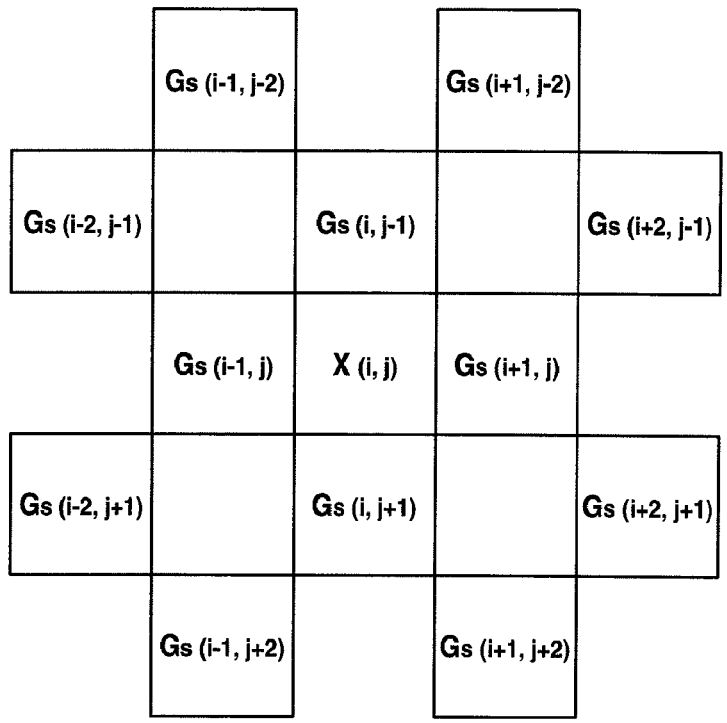
FIG. 17 is a diagram depicting positions on the Bayer array of G signals used by a G variation calculating unit according to the second embodiment.
Figure 18:
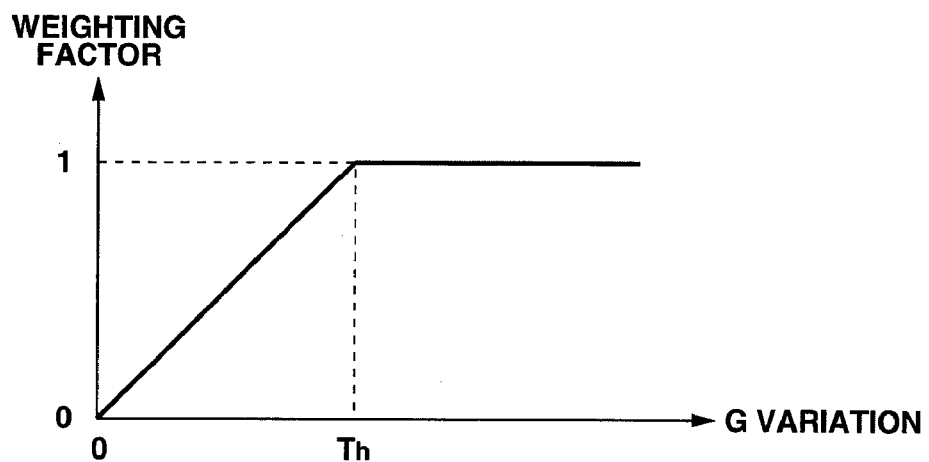
FIG. 18 is a diagram of a relationship between a G variation calculated by the G variation calculating unit and a weighting factor for a surrounding similarity calculated using the adjacent four pixel interpolation according to the second embodiment.

FIGS. 16 to 18 depict the second embodiment of the present invention. FIG. 16 is a block diagram of a configuration of the G interpolation color difference calculating unit. FIG. 17 is a diagram depicting positions on the Bayer array of G signals used by a G variation calculating unit. FIG. 18 is a diagram of a relationship between a G variation calculated by the G variation calculating unit and a weighting factor for the surrounding similarity calculated by using adjacent four pixel interpolation.

In the second embodiment, the same parts as in the first embodiment are designated with the same reference numerals, and the description will not be repeated. Only different points will be mainly described.

The second embodiment is designed to further improve the image quality of a flat section of a picked up image compared to the first embodiment.

Specifically, an erroneous determination may occur in a minimum value determination of color difference similarity in three interpolation switching determinations of missing G pixel described in the first embodiment if an amount of change associated with an amount of noise specific to the image pickup device becomes predominant compared to three differences (the differences are essentially small in the image flat section) of color difference surrounding similarity associated with a local correlation of image in the image flat section. The vertical interpolation, the horizontal interpolation, and the four pixel interpolation may be often switched randomly or periodically depending on the spatial development pattern of noise. Consequently, an unnatural pattern may emerge, degrading the image quality.

In the present embodiment, to prevent the image quality degradation, an image variation is further quantified to detect the variation, and a weighting process is executed to increase the priority of the four pixel interpolation in accordance with the detected variation.

A G variation calculating unit 1601, a memory 1602, and a multiplying unit 1603 are further added to the G interpolation color difference calculating unit 102 of the first embodiment in the G interpolation color difference calculating unit 102 of the present embodiment. The memory 202 is connected to the G variation calculating unit 1601. The G variation calculating unit 1601 is connected to the memory 1602 as optimal color difference selecting means, the memory 1602 is connected to the multiplying unit 1603, and the multiplying unit 1603 is connected to the determining unit 218. The multiplying unit 1603 is also connected to the surrounding similarity calculating unit 217.

Operations of the G interpolation color difference calculating unit 102 shown in FIG. 16 that are different from the operations of the G interpolation color difference calculating unit 102 shown in FIG. 2 will be mainly described. Primarily, different operations are related to the G variation calculating unit 1601 and the multiplying unit 1603.

Serving as optimal color difference selecting means and G pixel variation calculating means, the G variation calculating unit 1601 reads out $G_s$ signals arranged around a missing G pixel position (i,j) as shown in FIG. 17 among the $G_s$ signals stored in the memory 202 and calculates a G variation (i,j) as follows.

$$G \text{ variation } (i,j) = D_c(i,j)/P + \{D_{r1}(i,j) + D_{r2}(i,j) + D_{r3}(i,j) + D_{r4}(i,j)\}/Q$$

P and Q are arbitrary constants satisfying P>0 and Q>0, in which $$D_c(i,j) = |G_s(i-1,j) - G_s(i,j-1) + G_s(i+1,j) - G_s(i,j+1)| +$$
$$|G_s(i-1,j) + G_s(i,j-1) - G_s(i+1,j) - G_s(i,j+1)| +$$
$$|G_s(i-1,j) - G_s(i,j-1) - G_s(i+1,j) + G_s(i,j+1)|$$

$$D_{r1}(i,j) = |G_s(i-2,j-1) - G_s(i-1,j-2) + G_s(i,j-1) - G_s(i-1,j)| +$$
$$|G_s(i-2,j-1) + G_s(i-1,j-2) - G_s(i,j-1) - G_s(i-1,j)| +$$
$$|G_s(i-2,j-1) - G_s(i-1,j-2) - G_s(i,j-1) + G_s(i-1,j)|$$

$$D_{r2}(i,j) = |G_s(i,j-1) - G_s(i+1,j-2) + G_s(i+2,j-1) - G_s(i+1,j)| +$$
$$|G_s(i,j-1) + G_s(i+1,j-2) - G_s(i+2,j-1) - G_s(i+1,j)| +$$
$$|G_s(i,j-1) - G_s(i+1,j-2) - G_s(i+2,j-1) + G_s(i+1,j)|$$

$$D_{r3}(i,j) = |G_s(i,j+1) - G_s(i+1,j) + G_s(i+2,j+1) - G_s(i+1,j+2)| +$$
$$|G_s(i,j+1) + G_s(i+1,j) - G_s(i+2,j+1) - G_s(i+1,j+2)| +$$
$$|G_s(i,j+1) - G_s(i+1,j) - G_s(i+2,j+1) + G_s(i+1,j+2)|$$

$$D_{r4}(i,j) = |G_s(i-2,j+1) - G_s(i-1,j) + G_s(i,j+1) - G_s(i-1,j+2)| +$$
$$|G_s(i-2,j+1) + G_s(i-1,j) - G_s(i,j+1) - G_s(i-1,j+2)| +$$
$$|G_s(i-2,j+1) - G_s(i-1,j) - G_s(i,j+1) + G_s(i-1,j+2)|$$

Based on the calculated G variation (i,j), the G variation calculating unit 1601 uses a function shaped as shown in FIG. 18 to calculate a weighting factor w(i,j). In the function shown in FIG. 18, the weight is 1 if the G variation is equal to or greater than a predetermined threshold Th, and the weight is proportional to the G variation if the G variation is less than the threshold Th (thus, the smaller the G variation, the smaller the weight). The relationship of the weighting factor w(i,j) with the G variation is calculated based on a predetermined calculation formula, or is converted with reference to a pre-stored lookup table. The threshold Th may also be able to be changed according to the amount of amplification (corresponding to ISO sensitivity) of the amplifier of the image pickup unit 101.

The weighting factor w(i,j) calculated by the G variation calculating unit 1601 is outputted and stored in the memory 1602.

Serving as optimal color difference selecting means and multiplying means, the multiplying unit 1603 multiplies the surrounding similarity Sa of the color difference X−$G_a$ of the four pixel interpolation $G_a$ outputted from the surrounding similarity calculating unit 217 and the weighting factor w corresponding to the same pixel position as the surrounding similarity Sa among the weighting factors w stored in the memory 1602 to calculate Sa×w and outputs the calculated Sa×w to the determining unit 218.

The subsequent determination process by the determining unit 218 or the processes after that are the same as in the first embodiment.

As a result of the processes, Sa×w is a value smaller than Sa alone if the G variation is less than (i.e. w<1) the predetermined threshold Th, and therefore, the possibility that Sa×w is the minimum value in the determination by the determining unit 218 is increased. Thus, in a flat area with small G variation, there is less possibility that the vertical interpolation G or the horizontal interpolation G is selected, and there is more possibility that the four pixel interpolation G is selected, thereby canceling the influence of noise.

According to the second embodiment, the generation of false color can be prevented in substantially the same way as in the first embodiment in the edge part, and the generation of unnaturally patterned noise can also be prevented in the flat area.

Third Embodiment

Figure 19:
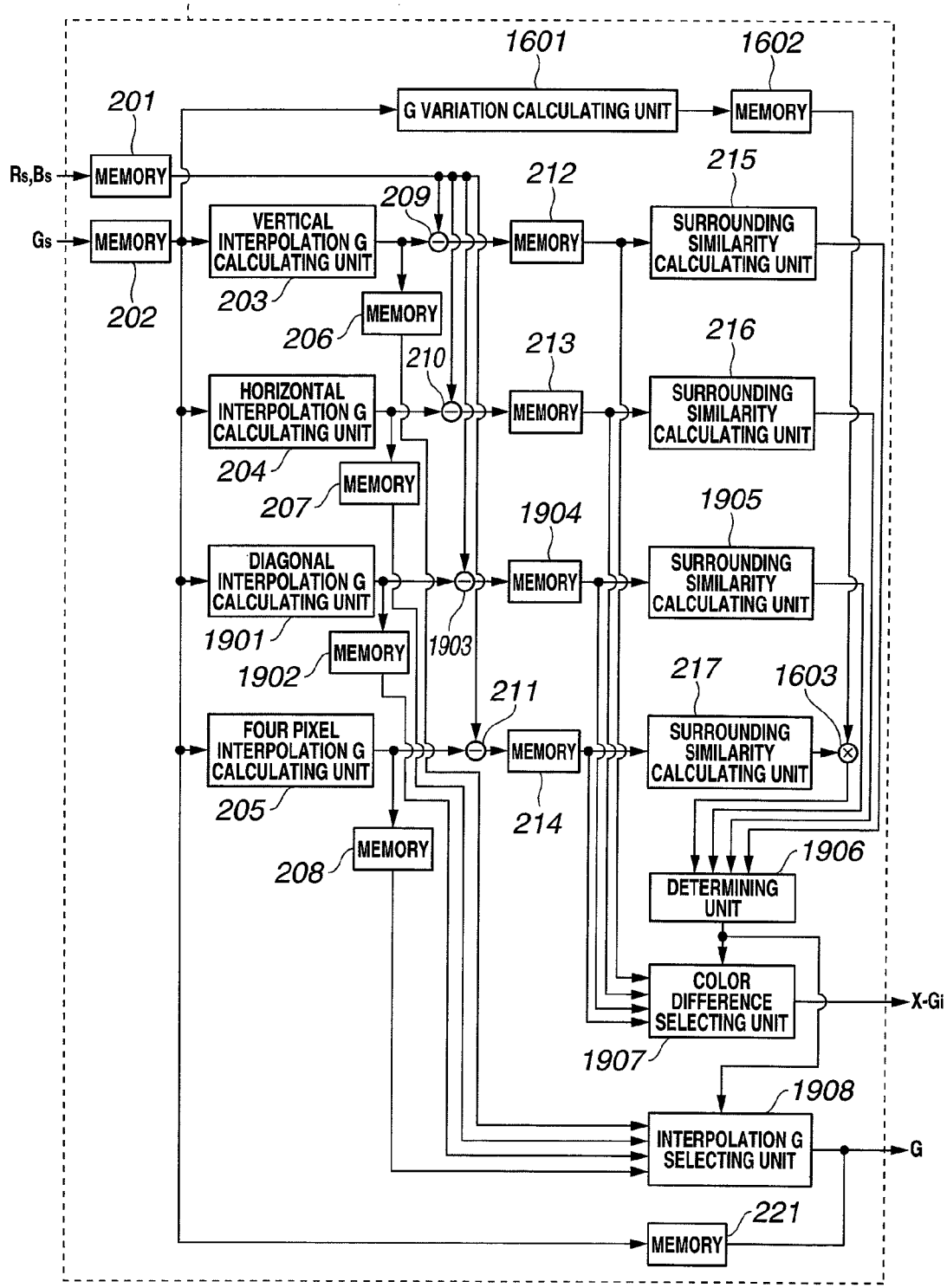
FIG. 19 is a block diagram of a configuration of the G interpolation color difference calculating unit according to a third embodiment of the present invention.
Figure 22:
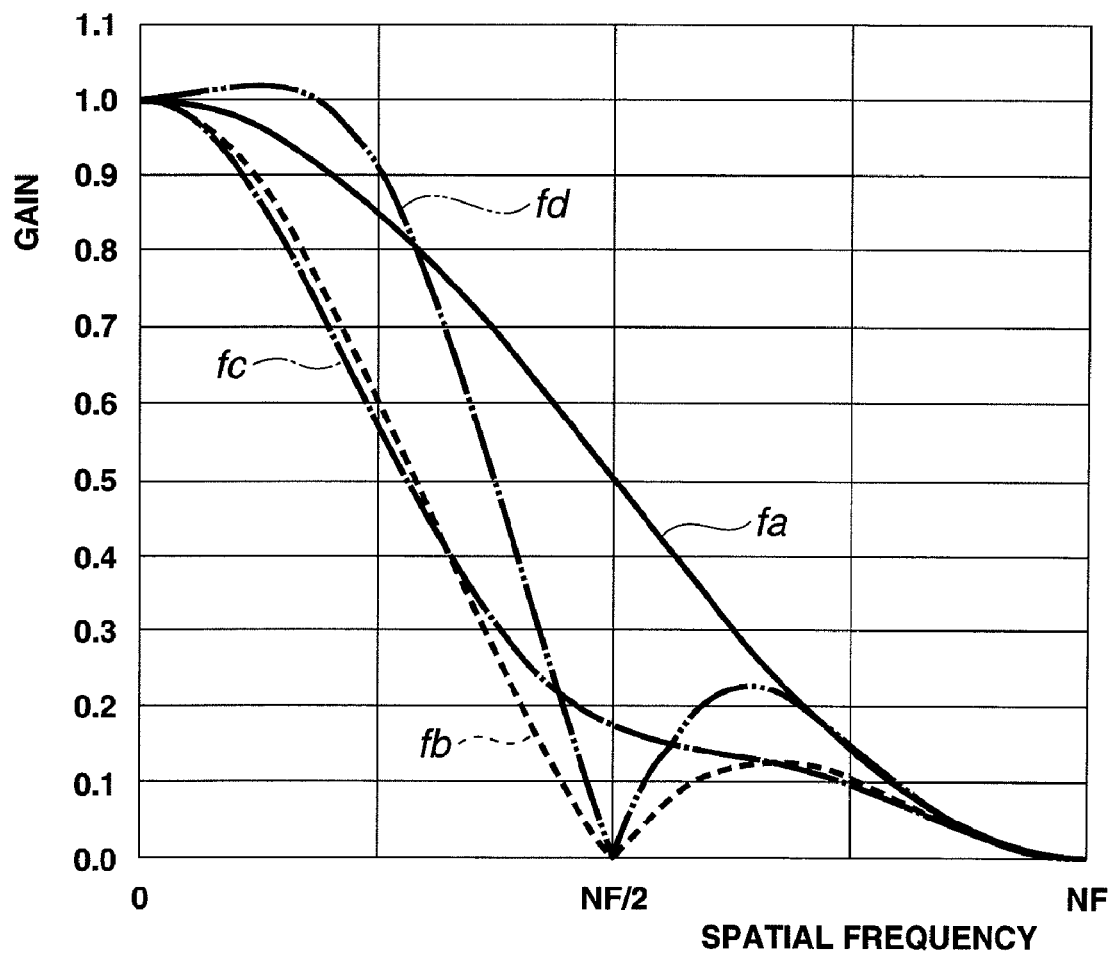
FIG. 22 is a diagram of frequency band characteristics in a diagonal 45 degree direction of a picked up image or the like obtained through an optical low-pass filter according to the third embodiment.

FIGS. 19 to 22 depict the third embodiment of the present invention. FIG. 19 is a block diagram of a configuration of the G interpolation color difference calculating unit. FIG. 20 is a diagram depicting positions on the Bayer array of G signals of surrounding twelve pixels used in diagonal direction interpolation of the missing G signal position. FIG. 21 is a diagram depicting positions on the Bayer array of color difference signals used for calculating the surrounding similarity among the color differences of the missing G signal position calculated based on the surrounding twelve pixel interpolation. FIG. 22 is a diagram of frequency band characteristics in a diagonal 45 degree direction of a picked up image or the like obtained through the optical low-pass filter.

In the third embodiment, the same parts as in the first and second embodiments are designated with the same reference numerals, and the description will not be repeated. Only different points will be mainly described.

The third embodiment is designed to further improve the resolution in the diagonal direction compared to the second embodiment.

In the first and second embodiments, the missing G pixel is interpolated by linear interpolation in the vertical direction, the horizontal direction, and using surrounding four pixels. Among these, when the vertical direction interpolation is applied along the vertical direction edge and the horizontal direction interpolation is applied to the horizontal direction edge, the frequency characteristic in the direction perpendicular to the edge is not changed by interpolation. Thus, the edges are saved without becoming dull. On the other hand, there is no interpolation in a corresponding direction for an edge in the diagonal direction in the first and second embodiments. The surrounding four pixel interpolation is primarily selected as an interpolation method with minimum surrounding color difference similarity.

A frequency characteristic $f_a$ in FIG. 22 indicates a frequency characteristic in the diagonal 45 degree direction relative to the horizontal direction of the picked up image obtained through the optical low-pass filter of the image pickup unit 101. Thus, the frequency characteristic $f_a$ schematically shows a frequency characteristic in the diagonal 45 degree direction of the optical low-pass filter.

As shown in FIG. 22, the frequency characteristic $f_a$ in the diagonal direction of the optical low-pass filter monotonically decreases while depicting a gentle curve as the spatial frequency approaches a Nyquist frequency NF.

The frequency characteristic of the picked up image is a total frequency characteristic including a product of an MTF of lens and a frequency characteristic associated with an opening ratio of the image pickup device in addition to the frequency characteristic $f_a$ in the diagonal direction of the optical low-pass filter. The contribution rates of the frequency characteristic of the lens and the frequency characteristic of the opening ratio are only to the extent that can be ignored compared to the frequency characteristic of the optical low-pass filter. Therefore, the frequency characteristic $f_a$ can be approximately assumed as the frequency characteristic in the diagonal 45 degree direction of the picked up image shown in FIG. 22.

A frequency characteristic $f_b$ in FIG. 22 indicates a frequency characteristic as a result of multiplying the frequency characteristic $f_a$ and the frequency characteristic in the diagonal 45 degree direction of the interpolation G pixel obtained by the surrounding four pixel interpolation.

The frequency characteristic $f_b$ in the diagonal direction of the interpolation G pixel created by the surrounding four pixel interpolation is a product of the frequency characteristic of the interpolation filter and the frequency characteristic of the optical low-pass filter.

As shown in FIG. 22, the frequency characteristic $f_b$ monotonically decreases as the spatial frequency increases from 0, and the gain temporarily becomes 0 at the half of the Nyquist frequency (NF/2). The gain then increases, and after a small peak, the gain again becomes 0 at the Nyquist frequency NF. As compared to the frequency characteristic $f_a$, high frequency components of the frequency characteristic $f_b$ are declined, and the edge in the diagonal direction is dull.

To improve the dullness of the edge in the diagonal direction, a diagonal interpolation process including a characteristic with less reduction of high frequency components in the diagonal direction is further installed in the third embodiment.

The configuration of the G interpolation color difference calculating unit 102 including the diagonal interpolation function will be described with reference to FIG. 19.

A diagonal interpolation G calculating unit 1901, a memory 1902, a subtracting unit 1903, a memory 1904, and a surrounding similarity calculating unit 1905 are further added to the G interpolation color difference calculating unit 102 of the second embodiment in the G interpolation color difference calculating unit 102 of the present embodiment. A determining unit 1906 as optimal color difference selecting means is installed in place of the determining unit 218. A color difference selecting unit 1907 as optimal color difference selecting means and selecting means is installed in place of the color difference selecting unit 219. An interpolation G selecting unit 1908 as optimal color difference selecting means and G interpolation value outputting means is installed in place of the interpolation G selecting unit 220.

The memory 202 is connected to the diagonal interpolation G calculating unit 1901. The diagonal interpolation G calculating unit 1901 is connected to the memory 1902 and the subtracting unit 1903. The memory 1902 as well as the memories 206, 207, and 208 are connected to the interpolation G selecting unit 1908. Meanwhile, the subtracting unit 1903 is color difference candidate calculating means, which is connected to the memory 201 and connected to the surrounding similarity calculating unit 1905 through the memory 1904. The surrounding similarity calculating unit 1905 as well as the surrounding similarity calculating units 215 and 216 are connected to the determining unit 1906. The surrounding similarity calculating unit 217 is connected to the determining unit 1906 through the multiplying unit 1603. The determining unit 1906 is connected to the color difference selecting unit 1907 and the interpolation G selecting unit 1908. The memory 1904 as well as the memories 212, 213, and 214 are connected to the color difference selecting unit 1907.

Operations of the G interpolation color difference calculating unit 102 shown in FIG. 19 that are different from the operations of the G interpolation color difference calculating unit 102 shown in FIG. 16 will be mainly described. Primarily, different operations are related to the diagonal interpolation G calculating unit 1901, the memory 1902, the subtracting unit 1903, the memory 1904, the surrounding similarity calculating unit 1905, the determining unit 1906, the color difference selecting unit 1907, and the interpolation G selecting unit 1908.

The color signals $R_s$ and the color signals $B_s$ outputted from the image pickup unit 101 are stored in the memory 201, and the color signals $G_s$ outputted from the image pickup unit 101 are stored in the memory 202 for an amount of predetermined lines to obtain a delay until the pixels enough to execute the two-dimensional interpolation process of missing G pixel position are collected. In the example shown in FIG. 19, the number of lines stored in the memory 201 and the number of lines stored in the memory 202 are at least five.

Four types of arrangements of G pixels shown in FIGS. 8, 9, 10, and 20 are used as the interpolation method of missing G pixel.

It is the same as described above that the vertical interpolation G calculating unit 203 uses G pixels arranged as shown in FIG. 8 to calculate interpolation candidates of missing G pixel based on the interpolation formula $G_v=(G_1+G_2)/2$.

It is also the same as described above that the horizontal interpolation G calculating unit 204 uses G pixels arranged as shown in FIG. 9 to calculate interpolation candidates of missing G pixel based on the interpolation formula $G_h=(G_3+G_4)/2$.

Furthermore, it is also the same as described above that the four pixel interpolation G calculating unit 205 uses G pixels arranged as shown in FIG. 10 to calculate interpolation candidates of missing G pixel based on the interpolation formula $G_a=(G_1+G_2+G_3+G_4)/4$.

The diagonal interpolation G calculating unit 1901 of the present embodiment is interpolation candidate calculating means, fourth interpolation calculating means, that is designed to use G pixels arranged as shown in FIG. 20 to calculate interpolation candidates of missing G pixel based on an interpolation formula $G_d=(G_1+G_2+G_3+G_4)\times\alpha-(G_5+G_6+G_7+G_8+G_9+G_{10}+G_{11}+G_{12})\times\beta$. In this case, $\alpha$ and $\beta$ are arbitrary constants satisfying $\alpha\times4-\beta\times8=1$, in which $\alpha>(1/4)$ and $\beta>0$.

The interpolation candidates calculated by the vertical interpolation G calculating unit 203, the horizontal interpolation G calculating unit 204, the four pixel interpolation G calculating unit 205, and the diagonal interpolation G calculating unit 1901 are stored in the memories 206, 207, 208, and 1902 and outputted to the subtracting units 209, 210, 211, and 1903, respectively.

The subtracting units 209, 210, 211, and 1903 read out X pixels at the same positions as the missing G pixels from the memory 201 and subtract the G interpolation candidates to calculate the color difference candidates $X-G_v, X-G_h, X-G_a$, and $X-G_d$, respectively.

The calculated color difference candidates $X-G_v, X-G_h, X-G_a$, and $X-G_d$ are stored in the memories 212, 213, 214, and 1904, respectively.

The surrounding similarity calculating units 215, 216, 217, and 1905 later use the color difference signals stored in the memories 212, 213, 214, and 1904 to calculate the surrounding similarities. The surrounding similarity calculating units 215, 216, 217, and 1905 are designed to calculate the similarity of color difference signals in a neighboring area including three rows and three columns of same-type color difference signals (i.e., color difference signals with the same type of G interpolation candidates $G_v, G_h, G_a$, and $G_d$ used for calculating the color difference candidates and with the same color X, and therefore, for example, $R-G_v$ and $B-G_v$ are not the same-type color difference signals) as shown in FIGS. 11, 12, 13, and 21. Therefore, the memories 212, 213, 214, and 1904 as well as the memories 206, 207, 208, and 1902 can store at least five lines of data to obtain a delay that allows the surrounding similarity calculating units 215, 216, 217, and 1905 to calculate the similarity.

When the color difference signals enough to execute the surrounding similarity calculation process of color difference are stored in the memories 212, 213, 214, and 1904, the memories 212, 213, 214, 1904 output the color difference signals $X-G_v, X-G_h, X-G_a$, and $X-G_d$ to the surrounding similarity calculating units 215, 216, 217, and 1905, respectively.

The surrounding similarity calculating unit 1905 is an optimal color difference selecting means, and as with Sv(k,l), Sh(k,l), and Sa(k,l) described in the first and second embodiments, uses, as shown in FIG. 21, a central color difference signal $(X-G_d)_{k,l}$ and eight color difference $(X-G_d)_{k-2,l-2}$, $(X-G_d)_{k,l-2}$, $(X-G_d)_{k+2,l-2}$, $(X-G_d)_{k-2,l}$, $(X-G_d)_{k+2,l}$, $(X-G_d)_{k-2,l+2}$, $(X-G_d)_{k,l+2}$, and $(X-G_d)_{k+2,l+2}$ at surrounding positions of the central color difference signal to calculate a difference absolute value sum as follows, thereby calculating the color difference surrounding similarity Sd(k,l) in the missing G pixel position (k,l).

$$Sd(k,l) = |(X-G_d)_{k-2,l-2} - (X-G_d)_{k,l}| + |(X-G_d)_{k,l-2} - (X-G_d)_{k,l}| +$$
$$|(X-G_d)_{k+2,l-2} - (X-G_d)_{k,l}| + |(X-G_d)_{k-2,l} - (X-G_d)_{k,l}| +$$
$$|(X-G_d)_{k+2,l} - (X-G_d)_{k,l}| + |(X-G_d)_{k-2,l+2} - (X-G_d)_{k,l}| +$$
$$|(X-G_d)_{k,l+2} - (X-G_d)_{k,l}| + |(X-G_d)_{k+2,l+2} - (X-G_d)_{k,l}|$$

As in the second embodiment, the multiplying unit 1603 multiplies the color difference surrounding similarity Sa(k,l) in the case of four pixel interpolation among the calculated four color difference surrounding similarities Sv(k,l), Sh(k,l), Sa(k,l), and Sd(k,l) by the weighting factor w(k,l) that is calculated by the G variation calculating unit 1601 and that is stored in the memory 1602.

In this way, four color difference surrounding similarities Sv(k,l), Sh(k,l), Sd(k,l), and Sa(k,l)×w(k,l) are inputted to the determining unit 1906.

The determining unit 1906 compares the values of the four color difference surrounding similarities Sv(k,l), Sh(k,l), Sd(k,l), and Sa(k,l)×w(k,l), selects a G interpolation method that provides the minimum color difference surrounding similarity, and outputs a selection signal corresponding to the selected interpolation method to the color difference selecting unit 1907 and the interpolation G selecting unit 1908. If a plurality of minimum color difference surrounding similarities exist, the determining unit 1906 determines the priorities in order of, for example, Sa(k,l)×w(k,l), Sd(k,l), Sh(k,l), and Sv(k,l) and selects a G interpolation method according to the priorities.

Based on the selection signal inputted from the determining unit 1906, the color difference selecting unit 1907 selects and accepts a color difference candidate of a missing G pixel position (k,l) corresponding to the selection signal, i.e. one of the color difference candidate $(X-G_v)_{k,l}$ stored in the memory 212, the color difference candidate $(X-G_h)_{k,l}$ stored in the memory 213, the color difference candidate $(X-G_a)_{k,l}$ stored in the memory 214, and the color difference candidate $(X-G_d)_{k,l}$ stored in the memory 1904 and then outputs the candidate as a color difference to the color difference interpolation processing unit 103. More specifically, the color difference selecting unit 1907 is designed to output, to the color difference interpolation processing unit 103, $(X-G_v)_{k,l}$ when the color difference surrounding similarity Sv(k,l) is the smallest, $(X-G_h)_{k,l}$ when Sh(k,l) is the smallest, $(X-G_d)_{k,l}$ when Sd(k,l) is the smallest, and $(X-G_a)_{k,l}$ when Sa(k,l)×w(k,l) is the smallest.

Based on the selection signal inputted from the determining unit 1906, the interpolation G selecting unit 1908 selects and accepts a G interpolation candidate of a missing G pixel position (k,l) corresponding to the selection signal, i.e. one of the G interpolation candidate $G_v$(k,l) stored in the memory 206, the G interpolation candidate $G_h$(k,l) stored in the memory 207, the G interpolation candidate $G_a$(k,l) stored in the memory 208, and the G interpolation candidate $G_d$(k,l) stored in the memory 1902, and then outputs the candidate to the RGB calculating unit 104. More specifically, the interpolation G selecting unit 1908 is designed to output, to the RGB calculating unit 104, $G_v$(k,l) when the color difference surrounding similarity Sv(k,l) is the smallest, $G_h$(k,l) when Sh(k,l) is the smallest, $G_d$(k,l) when Sd(k,l) is the smallest, and $G_a$(k,l) when Sa(k,l)×w(k,l) is the smallest.

According to the third embodiment, advantages substantially the same as in the first and second embodiments can be achieved, and a missing G pixel that is an unspecified parameter when calculating the color difference can be selected from four types of G interpolation candidates as the most probable pixel based on the precondition that the correlation of the color difference signals are locally high. As a result, a missing G pixel optimal for the local edge of image is interpolated, thereby making it possible to prevent the generation of false color and the resolution degradation of the edge portions not only in the horizontal direction and the vertical direction, but also in the diagonal direction.

Fourth Embodiment

Figure 23:
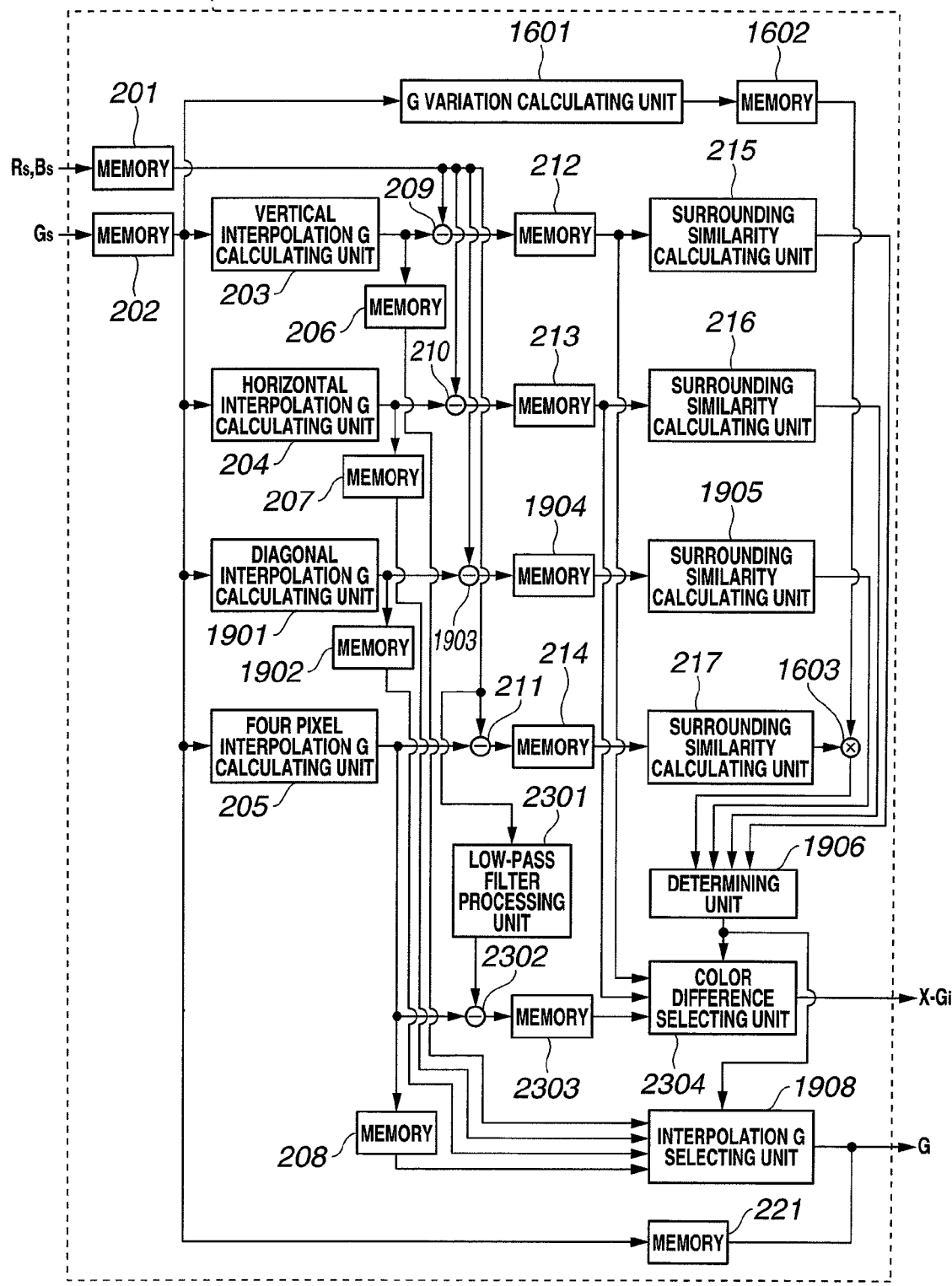
FIG. 23 is a block diagram of a configuration of the G interpolation color difference calculating unit according to a fourth embodiment of the present invention.
Figure 25:
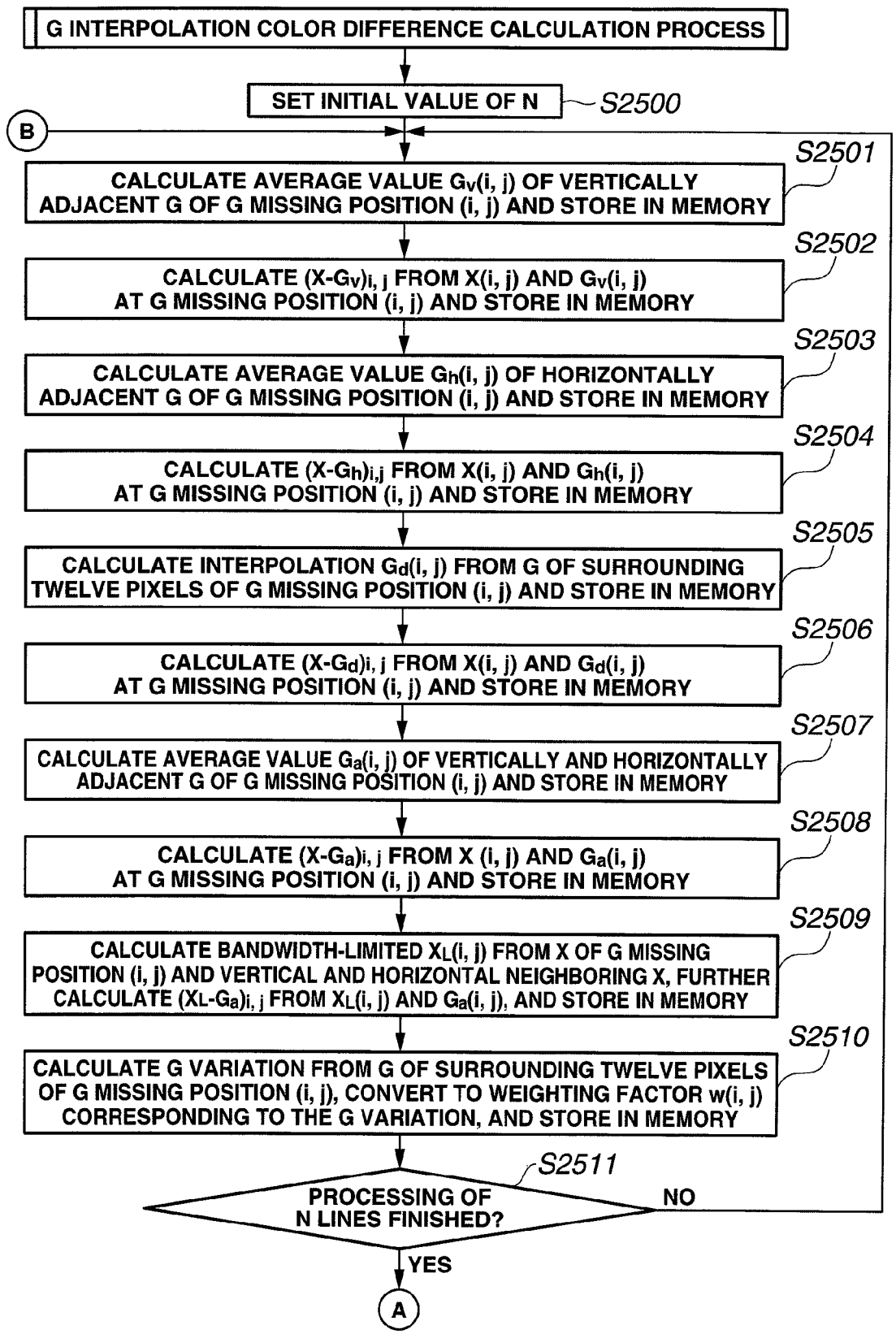
FIG. 25 is a flow chart of a part of a process by the G interpolation color difference calculating unit according to the fourth embodiment.
Figure 26:
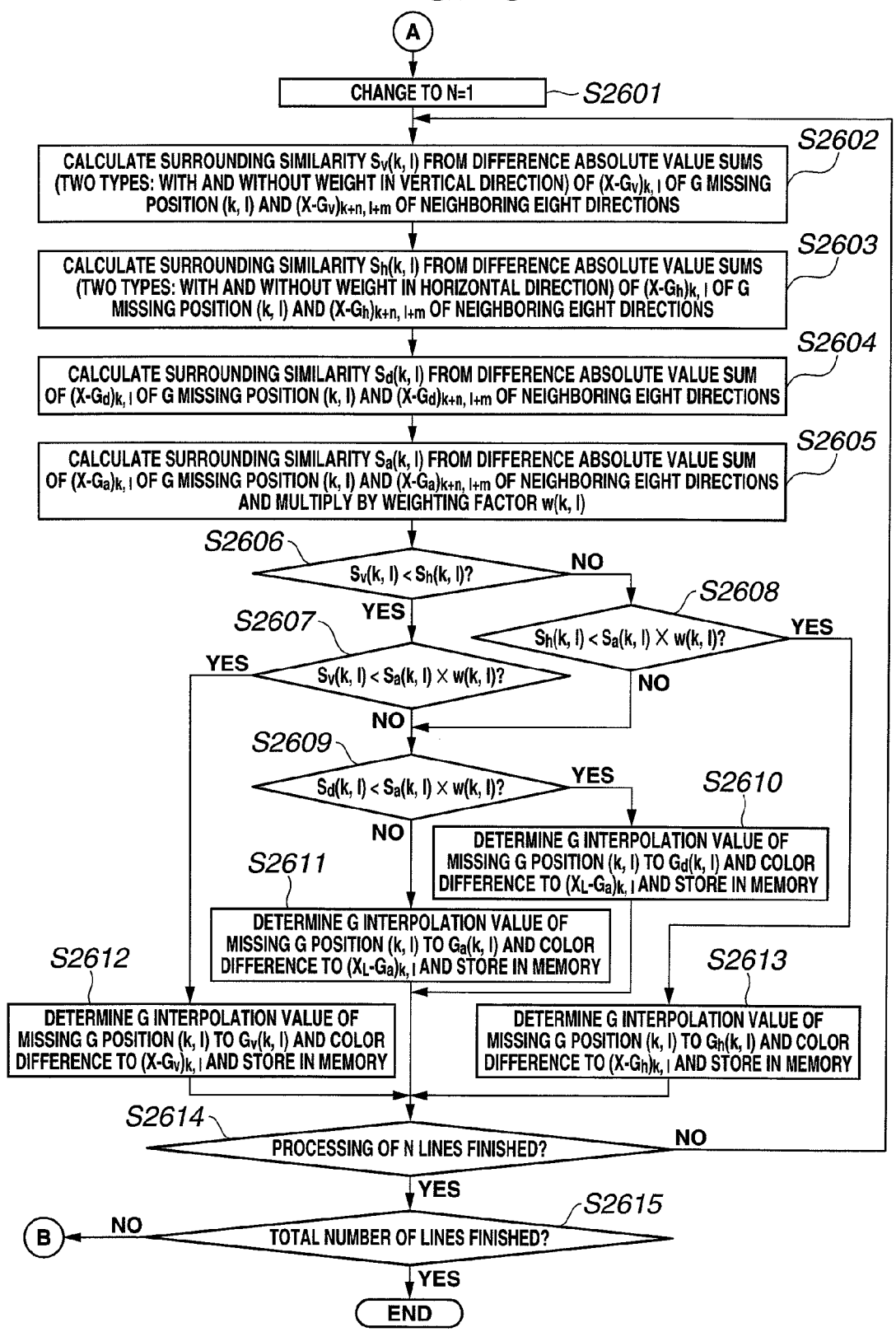
FIG. 26 is a flow chart of another part of the process by the G interpolation color difference calculating unit according to the fourth embodiment.

FIGS. 23 to 26 depict a fourth embodiment of the present invention. FIG. 23 is a block diagram of a configuration of the G interpolation color difference calculating unit. FIG. 24 is a diagram depicting positions on the Bayer array of a color signal X used to constitute the low-pass filter in the low-pass filter processing unit. FIG. 25 is a flow chart of a part of the process by the G interpolation color difference calculating unit. FIG. 26 is a flow chart of another part of the process by the G interpolation color difference calculating unit.

In the fourth embodiment, the same parts as in the first to third embodiments are designated with the same reference numerals, and the description will not be repeated. Only different points will be mainly described.

The fourth embodiment is designed to further amend the false color in the diagonal direction compared to the third embodiment.

In the third embodiment, the missing G pixel is interpolated by vertical direction, horizontal direction, surrounding four pixel, and surrounding twelve pixel interpolations. The vertical direction interpolation is applied to the vertical direction edge area. The horizontal direction interpolation is applied to the horizontal direction edge area. The surrounding twelve pixel interpolation is applied to the diagonal direction edge area. The surrounding four pixel interpolation is applied to other areas. The vertical direction interpolation $G_v$ applied to the vertical direction edge and the horizontal direction interpolation $G_h$ applied to the horizontal direction edge are interpolations along the edges. Therefore, spatial frequency characteristic in a direction perpendicular to the edge is not degraded, and an error due to the difference between the frequency characteristics of the interpolation G pixel and the X pixel does not occur unless an error occurs in the interpolation selection in relation to the color differences X-$G_v$ and X-$G_h$. Meanwhile, FIG. 22 shows an example of a spatial frequency characteristic $f_d$ in the diagonal direction interpolation $G_d$. The frequency characteristic $f_d$ indicates a frequency characteristic as a result of multiplying the frequency characteristic $f_a$ and the frequency characteristic in the diagonal 45 degree direction of interpolation G pixel obtained by the surrounding 12 pixel interpolation. The frequency characteristic $f_d$ is not approximated to the spatial frequency characteristic $f_a$ (see FIG. 22) in the diagonal direction of pixel sampled by the image pickup device. Therefore, an error occurs to the color difference X-$G_d$ due to the difference in the frequency characteristics. An error often occurs in the diagonal edge area including high frequency components, and specifically, a false color is generated. To reduce the false color in the edge area in the diagonal direction, the frequency characteristic of interpolation G pixel and the frequency characteristic of X pixel (R pixel or B pixel) whose color difference from the interpolation G pixel is to be calculated need to be matched. Therefore, a four pixel interpolation G signal and an $X_L$ pixel are used to calculate the color difference in the diagonal direction. Low-pass filter processing is applied to the X pixel (R pixel or B pixel) to obtain the $X_L$ pixel such that the spatial frequency characteristic in the diagonal direction of the $X_L$ pixel becomes a spatial frequency characteristic $f_c$ (see FIG. 22) which is approximated to the spatial frequency characteristic $f_b$ (see FIG. 22) in the diagonal direction of the four pixel interpolation G signal. Therefore, the frequency characteristic $f_c$ indicates a frequency characteristic as a result of multiplying the frequency characteristic $f_a$ and the frequency characteristic in which the color signal X of missing G signal position is bandwidth-limited by the low-pass filter constituted by surrounding same color signals.

As a result of the process, the error of the color difference candidate $X_L$-$G_a$ due to the difference in the spatial frequency characteristics becomes small in accordance with other color difference candidates X-$G_d$ and X-$G_a$, and the false color can be reduced compared to the third embodiment. It is obvious that the calculated color difference candidate $X_L$-$G_a$ can also be applied to areas other than the diagonal edge.

FIG. 24 shows pixels used for low-pass filtering applied to X pixels at the missing G pixel position (i,j). Five pixels X(i,j), X(i−2,j), X(i,j−2), X(i+2,j), and X(i,j+2) are pixels used for the low-pass filtering. The low-pass filtering constituted by five pixels is expressed as follows.

$$X_L(i, j) = a \times X(i, j) + b \times \{X(i-2, j) + X(i, j-2) + X(i+2, j) + X(i, j+2)\}$$

In the formula, a and b are predetermined constants satisfying a+4 b=1, in which 1>a>0 and (¼)>b>0.

In the fourth embodiment, a process of calculating the color difference after adjusting the frequency characteristic of X pixel to the interpolation characteristic of G pixel and a selection process of color difference calculated in the process are further installed.

A configuration of the G interpolation color difference calculating unit 102 including the low-pass filter function will be described with reference to FIG. 23.

A low-pass filter processing unit 2301 as bandwidth limiting means, a subtracting unit 2302, and a memory 2303 are further added to the G interpolation color difference calculating unit 102 of the third embodiment in the G interpolation color difference calculating unit 102 of the present embodiment. In place of the color difference selecting unit 1907, a color difference selecting unit 2304 serving as optimal color difference selecting means and selecting means is added.

The memory 201 is also connected to the low-pass filter processing unit 2301, and the low-pass filter processing unit 2301 is connected to the subtracting unit 2302. The subtracting unit 2302 is color difference candidate calculating means and is connected to the four pixel interpolation G calculating unit 205 and the color difference selecting unit 2304 through the memory 2303. The color difference selecting unit 2304 is also connected to the memories 212, 213, and the determining unit 1906. Therefore, unlike in the third embodiment, the color difference selecting unit 2304 is not connected to the memories 214 and 1904.

Operations of the G interpolation color difference calculating unit 102 shown in FIG. 23 that are different from the operations of the G interpolation color difference calculating unit 102 shown in FIG. 19 will be mainly described. Primarily, different operations are related to the low-pass filter processing unit 2301, the subtracting unit 2302, the memory 2303, and the color difference selecting unit 2304.

The color signals $R_s$ and the color signals $B_s$ outputted from the image pickup unit 101 are stored in the memory 201, and the color signals $G_s$ outputted from the image pickup unit 101 are stored in the memory 202 for an amount of predetermined lines to obtain a delay until the pixels enough to execute the two-dimensional interpolation process of missing G pixel position are collected. In the example shown in FIG. 23, the number of lines stored in the memory 201 and the number of lines stored in the memory 202 are at least five.

Four types of arrangements of G pixels shown in FIGS. 8, 9, 10, and 20 are used as the interpolation method of missing G pixel.

It is the same as described above that the vertical interpolation G calculating unit 203 uses the G pixels arranged as shown in FIG. 8 to calculate an interpolation candidate of missing G pixel based on the interpolation formula $G_v=(G_1+G_2)/2$.

It is also the same as described above that the horizontal interpolation G calculating unit 204 uses the G pixel arranged as shown in FIG. 9 to calculate an interpolation candidate of missing G pixel based on the interpolation formula $G_h=(G_3+G_4)/2$.

Furthermore, it is also the same as described above that the four pixel interpolation G calculating unit 205 uses G pixels arranged as shown in FIG. 10 to calculate an interpolation candidate of missing G pixel based on the interpolation formula $G_a=(G_1+G_2+G_3+G_4)/4$.

It is also the same as described above that the diagonal interpolation G calculating unit 1901 uses G pixels arranged as shown in FIG. 20 to calculate an interpolation candidate of missing G pixel based on an interpolation formula $G_d=(G_1+G_2+G_3+G_4)\times\alpha-(G_5+G_6+G_7+G_8+G_9+G_{10}+G_{11}+G_{12})\times\beta$. As described, $\alpha$ and $\beta$ are arbitrary constants satisfying $\alpha\times4-\beta\times8=1$ in which $\alpha>(\frac{1}{4})$ and $\beta>0$.

The interpolation candidates calculated by the vertical interpolation G calculating unit 203, the horizontal interpolation G calculating unit 204, the four pixel interpolation G calculating unit 205, and the diagonal interpolation G calculating unit 1901 are stored in the memories 206, 207, 208, and 1902 and outputted to the subtracting units 209, 210, 211, and 1903, respectively.

The subtracting units 209, 210, 211, and 1903 read out X pixels at the same positions as the missing G pixels from the memory 201 and subtract the G interpolation candidates to calculate the color difference candidates $X-G_v$, $X-G_h$, $X-G_a$, and $X-G_d$, respectively.

The calculated color difference candidates $X-G_v$, $X-G_h$, $X-G_a$, and $X-G_d$ are stored in the memories 212, 213, 214, and 1904, respectively.

The low-pass filter processing unit 2301 reads out X pixels from the memory 201, executes the low-pass filtering process, and calculates $X_L$ pixels.

The subtracting unit 2302 reads out the $X_L$ pixels calculated by the low-pass filter processing unit 2301 and the four pixel interpolation $G_a$ calculated by the four pixel interpolation G calculating unit 205 to calculate the color differences $X_L-G_a$.

The calculated color differences $X_L-G_a$ are stored in the memory 2303.

The surrounding similarity calculating units 215, 216, 217, and 1905 later use the color difference signals stored in the memories 212, 213, 214, and 1904 to calculate the surrounding similarity. The surrounding similarity calculating units 215, 216, 217, and 1905 are designed to calculate the similarity of color difference signals in a neighboring area including three rows and three columns of same-type color difference signals (i.e., color difference signals with the same type of G interpolation candidates $G_v$, $G_h$, $G_a$, and $G_d$ used for calculating the color difference candidates and with the same color X, and therefore, for example, $R-G_v$ and $B-G_v$ are not the same-type color difference signals) as shown in FIGS. 11, 12, 13, and 21. Therefore, the memories 212, 213, 214, and 1904 as well as the memories 206, 207, 208, and 1902 can store at least five lines of data to obtain a delay that allows the surrounding similarity calculating units 215, 216, 217, and 1905 to calculate the similarity.

When the color difference signals enough to execute the surrounding similarity calculation process of color difference are stored in the memories 212, 213, 214, and 1904, the memories 212, 213, 214, and 1904 output the color difference signals $X-G_v$, $X-G_h$, $X-G_a$, and $X-G_d$ to the surrounding similarity calculating units 215, 216, 217, and 1905, respectively.

As described in the third embodiment, the surrounding similarity calculating units 215, 216, 217, and 1905 calculate the surrounding similarities Sv(k,l), Sh(k,l), Sa(k,l), and Sd(k,l) of color difference signals, respectively.

As in the second embodiment, the multiplying unit 1603 multiplies the color difference surrounding similarity Sa(k,l) in the case of four pixel interpolation among the calculated four color difference surrounding similarities Sv(k,l), Sh(k,l), Sa(k,l), and Sd(k,l) by the weighting factor w(k,l) that is calculated by the G variation calculating unit 1601 and that is stored in the memory 1602.

In this way, four color difference surrounding similarities Sv(k,l), Sh(k,l), Sd(k,l), and Sa(k,l)×w(k,l) are inputted to the determining unit 1906.

The determining unit 1906 compares the values of the four color difference surrounding similarities Sv(k,l), Sh(k,l), Sd(k,l), and Sa(k,l)×w(k,l), selects a G interpolation method that provides the minimum color difference surrounding similarity, and outputs a selection signal corresponding to the selected interpolation method to the color difference selecting unit 2304 and the interpolation G selecting unit 1908. If a plurality of minimum color difference surrounding similarities exist, the determining unit 1906 determines the priorities in order of, for example, Sa(k,l)×w(k,l), Sd(k,l), Sh(k,l), and Sv(k,l) and selects a G interpolation method according to the priorities.

Based on the selection signal inputted from the determining unit 1906, the color difference selecting unit 2304 selects and accepts a color difference candidate of a missing G pixel position (k,l) corresponding to the selection signal, i.e. one of the color difference candidate $(X-G_v)_{k,l}$ stored in the memory 212, the color difference candidate $(X-G_h)_{k,l}$ stored in the memory 213, and the color difference candidate $(X_L-G_a)_{k,l}$ stored in the memory 2303, and then outputs the candidate as a color difference to the color difference interpolation processing unit 103. More specifically, the color difference selecting unit 2304 is designed to output, to the color difference interpolation processing unit 103, $(X-G_v)_{k,l}$ when the color difference surrounding similarity Sv(k,l) is the smallest, $(X-G_h)_{k,l}$ when Sh(k,l) is the smallest, $(X_L-G_a)_{k,l}$ when Sd(k,l) or Sa(k,l)×w(k,l) is the smallest.

Based on the selection signal inputted from the determining unit 1906, the interpolation G selecting unit 1908 selects and accepts a G interpolation candidate of a missing G pixel position (k,l) corresponding to the selection signal, i.e. one of the G interpolation candidate $G_v(k,l)$ stored in the memory 206, the G interpolation candidate $G_h(k,l)$ stored in the memory 207, the G interpolation candidate $G_a(k,l)$ stored in the memory 208, and the G interpolation candidate $G_d(k,l)$ stored in the memory 1902, and then outputs the candidate to the RGB calculating unit 104. More specifically, the interpolation G selecting unit 1908 is designed to output, to the RGB calculating unit 104, $G_v(k,l)$ when the color difference surrounding similarity Sv(k,l) is the smallest, $G_h(k,l)$ when Sh(k,l) is the smallest, $G_d(k,l)$ when Sd(k,l) is the smallest, and $G_a(k,l)$ when Sa(k,l)×w(k,l) is the smallest.

The subsequent processes are the same as in the third embodiment.

A procedure of the G interpolation color difference calculation process in the present embodiment will be described with reference to FIGS. 25 and 26. Although FIGS. 25 and 26 should be depicted as one drawing, the drawing is divided into two drawings due to space limitation.

The single-plate Bayer array image that is picked up by the image pickup unit 101 and that is stored in the memory is designed to be inputted to the G interpolation color difference calculating unit 102 in order of raster scanning. As described, the G interpolation color difference calculating unit 102 is designed to store the $R_s$ signals and the $B_s$ signals in the single-plate Bayer array image inputted in order of raster scanning to the memory 201 and the $G_s$ signals to the memory 202 for a predetermined amount of data.

With the predetermined amount of data being stored in the memories 201 and 202, the number of lines N of the memories 206 to 208 and 1902 for storing the G interpolation candidate values of missing G signal and the number of lines N of the memories 212 to 214 and 1904 for storing the color difference candidate values of missing G signal are set to a predetermined initial value (N=5 in the fourth embodiment) (step S2500).

The vertical interpolation G calculating unit 203 calculates an average value of the G signals above and below the G signal missing position (i,j) as shown in FIG. 8, and the average value is stored in the memory 206 as an interpolation candidate $G_v(i,j)$ (step S2501). The subtracting unit 209 subtracts the interpolation candidate $G_v(i,j)$ from X(i,j) of the G signal missing position (i,j) to calculate a color difference candidate $(X-G_v)_{i,j}$, and the candidate is stored in the memory 212 (step S2502).

Subsequently, an average value of the G signals left and right of the G signal missing position (i,j) as shown in FIG. 9 is calculated, and the average value is stored in the memory 207 as an interpolation candidate $G_h(i,j)$ (step S2503). The subtracting unit 210 subtracts the interpolation candidate $G_h(i,j)$ from X(i,j) of the G signal missing position (i,j) to calculate a color difference candidate $(X-G_h)_{i,j}$, and the candidate is stored in the memory 213 (step S2504).

An interpolation value $G_d(i,j)$ of the G signal missing position (i,j) is calculated based on the surrounding twelve G signals as shown in FIG. 12, and the interpolation values is stored in the memory 1902 (step S2505). The subtracting unit 1903 subtracts the interpolation candidate $G_d(i,j)$ from X(i,j) of the G signal missing position (i,j) to calculate a color difference candidate $(X-G_d)_{i,j}$, which is stored in the memory 1904 (step S2506).

An average value of the G signals above, below, left, and right of the G signal missing position (i,j) as shown in FIG. 10 is calculated, and the average value is stored in the memory 208 as an interpolation candidate $G_a(i,j)$ (step S2507). The subtracting unit 211 subtracts the interpolation candidate $G_a(i,j)$ from X(i,j) of the G signal missing position (i,j) to calculate a color difference candidate $(X-G_a)_{i,j}$, which is stored in the memory 214 (step S2508).

The low-pass filter processing unit 2301 then uses X(i,j) of the G signal missing position (i,j) and neighboring X signals above, below, left, and right of the G signal missing position (i,j) to calculate bandwidth-limited $X_L(i,j)$, and the subtracting unit 2302 calculates a color difference $(X_L-G_a)_{i,j}$ based on the bandwidth-limited $X_L(i,j)$ ($X_L$ is a bandwidth-limited signal $R_L$ of R signal or a bandwidth-limited signal $B_L$ of B signal) and the interpolation candidate $G_a(i,j)$ calculated in step S2507 and stores the color difference in the memory 2303 (step S2509).

Subsequently, the G variation calculating unit 1601 calculates a G variation based on the G signals of the surrounding twelve pixels of the G signal missing position (i,j), converts the calculated G variation to a weighting factor w(i,j), and stores the factor in the memory 1602 (step S2510).

At this point, whether processing of N lines is finished is determined (step S2511). If it is determined that the processing of N lines is not finished yet, the process returns to step S2501, and the above processes are executed.

If it is determined in step S2511 that the processing of N lines is finished, the process moves to the process shown in FIG. 26, and N is set to 1 (step S2601).

The surrounding similarity calculating unit 215 then calculates, as a color difference surrounding similarity candidate $Sv_1(k,l)$, a difference absolute value sum of the color difference $(X-G_v)_{k,l}$ calculated based on the same interpolation type (X has the same color, and the type of G is the same $G_v$) of the G signal missing position (k,l) stored in the memory 212 and same-type color differences $(X-G_v)_{k+n,l+m}$ in neighboring eight directions (n=−2, 0, 2, m=−2, 0, 2, and n and m are not 0 at the same time). The surrounding similarity calculating unit 215 further applies a heavy weight on vertically neighboring same-type color differences $(X-G_v)_{k+n,l+m}$ (n=0 and m=−2, 2) among the same-type color differences $(X-G_v)_{k+n,l+m}$ in the neighboring eight directions to obtain a difference absolute value sum to thereby calculate a color difference surrounding similarity candidate $Sv_2(k,l)$. The surrounding similarity calculating unit 215 then calculates a surrounding similarity Sv(k,l) based on the calculated color difference surrounding similarity candidate $Sv_1(k,l)$ and the color difference surrounding similarity candidate $Sv_2(k,l)$ (step S2602).

Similarly, the surrounding similarity calculating unit 216 calculates, as a color difference surrounding similarity candidate $Sh_1(k,l)$, a difference absolute value sum of the color difference $(X-G_h)_{k,l}$ calculated based on the same interpolation type (X has the same color, and the type of G is the same $G_h$) of the G signal missing position (k,l) stored in the memory 213 and color differences $(X-G_h)_{k+n,l+m}$ in neighboring eight directions (n=−2, 0, 2, m=−2, 0, 2, and n and m are not 0 at the same time). The surrounding similarity calculating unit 216 further applies a heavy weight on horizontally neighboring same-type color differences $(X-G_h)_{k+n,l+m}$ (n=−2, 2, and m=0) among the same-type color differences $(X-G_h)_{k+n,l+m}$ in the neighboring eight directions to obtain a difference absolute value sum to thereby calculate a color difference surrounding similarity candidate $Sh_2(k,l)$. The surrounding similarity calculating unit 216 then calculates a surrounding similarity Sh(k,l) based on the calculated color difference surrounding similarity candidate $Sh_1(k,l)$ and the color difference surrounding similarity $Sh_2(k,l)$ (step S2603).

Similarly, the surrounding similarity calculating unit 1905 calculates, as a surrounding similarity Sd(k,l), a difference absolute value sum of the color difference $(X-G_d)_{k,l}$ calculated based on the same interpolation type (X has the same color, and the type of G is the same $G_d$) of the G signal missing position (k,l) stored in the memory 1904 and color differences $(X-G_d)_{k+n,l+m}$ in neighboring eight directions (n=−2, 0, 2, m=−2, 0, 2, and n and m are not 0 at the same time) (step S2604).

Similarly, the surrounding similarity calculating unit 217 calculates, as a surrounding similarity Sa(k,l), a difference absolute value sum of the color difference $(X-G_a)_{k,l}$ calculated based on the same interpolation type (X has the same color, and the type of G is the same $G_a$) of the G signal missing position (k,l) stored in the memory 214 and color differences $(X-G_a)_{k+n,l+m}$ in neighboring eight directions (n=−2, 0, 2, m=−2, 0, 2, and n and m are not 0 at the same time), and the multiplying unit 1603 multiplies the calculated Sa(k,l) by the weighting factor w(k,l) (step S2605).

As described, the smaller the values of the calculated surrounding similarities Sv(k,l), Sh(k,l), Sd(k,l), and Sa(k,l)×w (k,l), the higher the similarities.

Once the four surrounding similarities Sv(k,l) Sh(k,l), Sd(k,l), and Sa(k,l)×w(k,l) are calculated, the surrounding similarities Sv(k,l) and Sh(k,l) are first compared (step S2606).

If the surrounding similarity Sv(k,l) is determined to be smaller than the surrounding similarity Sh(k,l), the surrounding similarity Sv(k,l) and the surrounding similarity Sa(k,l)× w(k,l) are further compared (step S2607).

If the surrounding similarity Sv(k,l) is determined to be equal to or greater than the surrounding similarity Sh(k,l) in step S2606, the surrounding similarity Sh(k,l) and the surrounding similarity Sa(k,l)×w(k,l) are further compared (step S2608).

If the surrounding similarity Sv(k,l) is determined to be equal to or greater than the surrounding similarity Sa(k,l)×w (k,l) in step S2607, or if the surrounding similarity Sh(k,l) is determined to be equal to or greater than the surrounding similarity Sa(k,l)×w(k,l) in step S2608, the surrounding similarity Sd(k,l) and the surrounding similarity Sa(k,l)×w(k,l) are further compared (step S2609).

If the surrounding similarity Sd(k,l) is determined to be smaller than the surrounding similarity Sa(k,l)×w(k,l) in step S2609, the signal interpolation value of the G signal missing position (k,l) is determined to be $G_d(k,l)$, the color difference is determined to be $(X_L-G_a)_{k,l}$, and the signal interpolation value and the color difference are stored in the memory (step S2610).

If the surrounding similarity Sd(k,l) is determined to be equal to or greater than the surrounding similarity Sa(k,l)×w (k,l) in step S2609, the signal interpolation value of the G signal missing position (k,l) is determined to be $G_a(k,l)$, the color difference is determined to be $(X_L-G_a)_{k,l}$, and the signal interpolation value and the color difference are stored in the memory (step S2611).

On the other hand, if the surrounding similarity Sv(k,l) is determined to be smaller than the surrounding similarity Sa(k,l)×w(k,l) in step S2607, the signal interpolation value of the G signal missing position (k,l) is determined to be $G_v(k,l)$, the color difference is determined to be $(X-G_v)_{k,l}$, and the signal interpolation value and the color difference are stored in the memory (step S2612).

If the surrounding similarity Sh(k,l) is determined to be smaller than the surrounding similarity Sa(k,l)×w(k,l) in step S2608, the signal interpolation value of the G signal missing position (k,l) is determined to be $G_h(k,l)$, the color difference is determined to be $(X-G_h)_{k,l}$, and the signal interpolation value and the color difference are stored in the memory (step S2613).

After the execution of any of the processes in step S2610, step S2611, step S2612, and step S2613, whether processing of N lines is finished is determined (step S2614). If it is determined that the processing is not finished yet, the process returns to step S2602, and the above processes are executed.

On the other hand, if it is determined that the processing of N lines is finished in step S2614, whether processing of the total number of lines as an output image is finished is determined (step S2615).

If it is determined that the processing of the total number of lines is not finished yet, the process returns to step S2501 of FIG. 25, and the above processes are executed while $G_v$, $G_h$, $G_d$, $G_a$, $(X-G_v)$, $(X-G_h)$, $(X-G_d)$, $(X-G_a)$, $(X_L-G_a)$, Sv, Sh, Sd, Sa, and w of the unnecessary lines stored in the memory are replaced by calculated new values.

If it is determined that the processing of the total number of lines is finished in step S2615, the G interpolation color difference calculation process is terminated.

Although the method of selecting a similarity from surrounding similarities Sv, Sh, Sd, and Sa×w in steps S2606 to S2609 in the description of the flow chart is not enough to determine the minimum value of the four surrounding similarities, the method is illustrated as an example of a simplified selection method. To accurately obtain the minimum value from four surrounding similarities, it is obvious that a step of comparing Sv and Sd as well as a step of comparing Sh and Sd are necessary in addition to the four comparison steps.

The flow chart described with reference to FIGS. 25 and 26 is an example related to the procedure designed to suppress the memory capacity to the minimum. However, the arrangement is not limited to this. The process can also be changed to secure a memory enough to store at least one frame of the calculated data. If a memory of one frame can be secured, the initial value of N of step S2500 and a value of N of step S2601 can be replaced by the total number of lines. This makes it possible to execute a procedure of creating one frame of G interpolation candidates and color difference candidates and then selecting an optimal interpolation G and a color difference pixel by pixel from the plurality of G interpolation candidates and color difference candidates.

The procedure of securing a memory of one frame can also be implemented in the same way in the flow chart of a process described in the first embodiment.

According to the fourth embodiment, advantages substantially the same as in the first to third embodiments can be achieved. In addition, the color difference signal is calculated after making a modification (vertical direction interpolation and horizontal direction interpolation need not be modified, and only four pixel interpolation needs to be modified) such that the frequency characteristic of the X signal (R or B signal) of the missing G pixel position is approximated to the frequency characteristics of three interpolations (vertical direction interpolation, horizontal direction interpolation, and four pixel interpolation) of the G interpolation candidate used for calculating the color difference signal. Therefore, generation of false color can be prevented.

As in the third embodiment, a missing G pixel is selected from four types of G interpolation candidates as the most probable pixel. Therefore, resolution degradation of the edge portion in the diagonal direction can be prevented.

In this way, M types of G interpolation candidates are prepared as interpolation candidates of a missing G pixel, and a G interpolation candidate corresponding to the color difference candidate with the highest surrounding similarity among the M types of color difference candidates obtained based on the G interpolation candidates and the X signals (R signals or B signals) at the G signal missing position is selected as the missing G pixel. Therefore, generation of false color can be sufficiently suppressed without reducing the chroma. An optimal interpolation value with less reduction in resolution of missing G signal can also be obtained.

The modification process of approximating the frequency characteristic of X signals during four pixel interpolation as described in the fourth embodiment can also be applied to the first and second embodiments in the same way. However, in that case, a low-pass filter processing unit needs to be installed in the early part of the input of X signal of the subtracting unit 211. As a result, not $X-G_a$, but $X_L-G_a$ is stored in the memory 214. Therefore, $(X_L-G_a)$ stored in the memory 214 is used for the similarity Sa calculated by the surrounding similarity calculating unit 217. The configuration and the process also make it possible to suppress the false color in the first and second embodiments.

Although the color difference surrounding similarity is calculated in the above description based on the color differences obtained from X (R or B) located at the center of the calculation area and the color X of the same type, the calculation may also be performed using color differences obtained from a different color X^. In that case, instead of calculating the difference absolute value sum of the color difference X–G located at the center and surrounding X^–G, a difference absolute sum of a plurality of surrounding X^–G may be calculated, which may then be added with the difference absolute value sum of X–G of color X of the same type to define the color difference surrounding similarity.

Fifth Embodiment

FIGS. 27 to 36 depict a fifth embodiment of the present invention. FIG. 27 is a diagram depicting $X-G_v$ and $X^\wedge-G_v$ of a 5×5 pixel area calculated using $G_v$ obtained by vertical interpolation. FIG. 28 is a diagram depicting $X-G_h$ and $X^\wedge-G_h$ of a 5×5 pixel area calculated using $G_h$ obtained by horizontal interpolation. FIG. 29 is a diagram depicting $X-G_a$ and $X^\wedge-G_a$ of a 5×5 pixel area calculated using $G_a$ obtained by four pixel interpolation. FIG. 30 is a diagram depicting $X-G_d$ and $X^\wedge-G_d$ of a 5×5 pixel area calculated using $G_d$ obtained by diagonal interpolation. FIG. 31 is a diagram plotting, in a two-dimensional color difference space, a color difference $X-G_v$ or $X^\wedge-G_v$ of a surrounding local area in relation to $G_v$ obtained by vertical interpolation. FIG. 32 is a diagram plotting, in a two-dimensional color difference space, a color difference $X-G_h$ or $X^\wedge-G_h$ of a surrounding local area in relation to $G_h$ obtained by horizontal interpolation. FIG. 33 is a diagram plotting, in a two-dimensional color difference space, a color difference $X-G_a$ or $X^\wedge G_a$ of a surrounding local area in relation to $G_a$ obtained by four pixel interpolation.

FIG. 34 is a diagram plotting, in a two-dimensional color difference space, a color difference $X-G_d$ or $X^\wedge-G_d$ of a surrounding local area in relation to $G_d$ obtained by diagonal interpolation. FIG. 35 is a diagram depicting an example with a horizontal stripe pattern with high spatial frequency in a vertical direction in determination areas. FIG. 36 is a diagram depicting the emergence of a checked pattern in G signals when the surrounding color difference similarities of the first to fourth embodiments are used in the example of FIG. 35.

In the fifth embodiment, the same parts as in the first to fourth embodiments are designated with the same reference numerals, and the description will not be repeated. Only different points will be mainly described.

In the fifth embodiment, the definition of the color difference surrounding similarities calculated by the surrounding calculating units 215 to 217 and 1905 is different from those of the first to fourth embodiments. Since the configuration of the present invention is the same as the first to fourth embodiments, the drawings, the reference numerals, and the like will be cited accordingly.

FIG. 27 shows $X-G_v$ or $X^\wedge-G_v$ of a 5×5 pixel area calculated using $G_v$ obtained by interpolation based on adjacent G signals in the vertical direction of a G signal missing position. In this case, X^ denotes a color (except G) different from the color X at the position with missing G pixel. If X=R, then X^=B. If X=B, then X^=R.

The surrounding similarity calculating unit 215 uses the color differences $X-G_v$ and $X^\wedge-G$ shown in FIG. 27 to calculate the color difference surrounding similarity Sv(k,l) defined as follows.

$$Sv(k,l)=Sv_1(k,l)+Sv_2(k,l)$$

In this case, $Sv_1(k,l)$ denotes a similarity of the color difference $X-G_v$, while $Sv_2(k,l)$ denotes a similarity of the color difference $X^\wedge-G_v$. Specific examples of the similarities are as follows.

$$Sv_1(k,l) = \{|(X-G_v)_{k,l-2} - (X-G_v)_{k,l}| + |(X-G_v)_{k,l+2} - (X-G_v)_{k,l}|\} \times$$
$$Wv_{xc} + \{|(X-G_v)_{k-2,l-2} - (X-G_v)_{k-2,l}| +$$
$$|(X-G_v)_{k-2,l+2} - (X-G_v)_{k-2,l}| + |(X-G_v)_{k+2,l-2} -$$
$$(X-G_v)_{k+2,l}| + |(X-G_v)_{k+2,l+2} - (X-G_v)_{k+2,l}|\} + Wv_{xa}$$
$$Sv_2(k,l) = \{|X^\wedge-G_v)_{k-1,l-1} - (X^\wedge-G_v)_{k-1,l+1}| +$$
$$|(X^\wedge-G_v)_{k+1,l-1} - (X^\wedge-G_v)_{k+1,l+1}|\} \times Wv_{x^\wedge}$$

Weights $Wv_{xc}$, $Wv_{xa}$, and $Wv_{x^\wedge}$ used for calculating the similarities are in a relationship of $$2\times Wv_{xc}+4\times Wv_{xa}=2\times Wv_{x^\wedge}=W$$

therefore $$Wv_{xc}+2\times Wv_{xa}=Wv_{x^\wedge}.$$

In the first formula, W on the right side denotes a weight with respect to the entire formula.

The calculated color difference surrounding similarity Sv(k,l) denotes an amount of the degree of similarity of the color difference $X-G_v$ and the color difference $X^\wedge-G_v$ in the vertical direction around the G signal missing position (k,l).

FIG. 28 shows $X-G_h$ or $X^\wedge-G_h$ of a 5×5 pixel area calculated using $G_h$ obtained by interpolation based on adjacent G signals in the horizontal direction of a G signal missing position. As described above, if X=R, then X^=B. If X=B, then X^=R.

The surrounding similarity calculating unit 216 uses the color differences $X-G_h$ and $X^\wedge-G_h$ shown in FIG. 28 to calculate the color difference surrounding similarity $Sh(k,l)$ defined as follows.

$$Sh(k,l)=Sh_1(k,l)+Sh_2(k,l)$$

In this case, $Sh_1(k,l)$ denotes a similarity of the color difference $X-G_h$, while $Sh_2(k,l)$ denotes a similarity of the color difference $X^\wedge-G_h$. Specific examples of the similarities are as follows.

$$Sh_1(k, l) = \{|(X - G_h)_{k-2,l} - (X - G_h)_{k,l}| + |(X - G_h)_{k+2,l} - (X - G_h)_{k,l}|\} \times$$
$$Wh_{xc} + \{|(X - G_h)_{k-2,l-2} - (X - G_h)_{k,l-2}| + |(X - G_h)_{k+2,l-2} -$$
$$(X - G_h)_{k,l-2}| + |(X - G_h)_{k-2,l+2} - (X - G_h)_{k,l+2}| +$$
$$|(X - G_h)_{k+2,l+2} - (X - G_h)_{k,l+2}|\} \times Wh_{xa}$$
$$Sh_2(k, l) = \{|X^\wedge - G_h)_{k-1,l-1} - (X^\wedge - G_h)_{k+1,l-1}| +$$
$$|(X^\wedge - G_h)_{k-1,l+1} - (X^\wedge - G_h)_{k+1,l+1}|\} \times Wh_{x^\wedge}$$

Weights $Wh_{xc}$, $Wh_{xa}$, and $Wh_{x^\wedge}$ used for calculating the similarities are in a relationship of $$2 \times Wh_{xc} + 4 \times Wh_{xa} = 2 \times Wh_{x^\wedge} = W$$

therefore $$Wh_{xc} + 2 \times Wh_{xa} = Wh_{x^\wedge}.$$

In the first formula, W on the right side denotes a weight with respect to the entire formula.

The calculated color difference surrounding similarity $Sh(k,l)$ denotes an amount of the degree of similarity of the color difference $X-G_h$ and the color difference $X^\wedge-G_h$ in the horizontal direction around the G signal missing position $(k,l)$.

FIG. 29 shows $X-G_a$ or $X^\wedge-G_a$ of a 5×5 pixel area calculated using $G_a$ obtained by interpolation based on adjacent four pixel G signals of a G signal missing position. As described above, if $X=R$, then $X^\wedge=B$. If $X=B$, then $X^\wedge=R$.

The surrounding similarity calculating unit 217 uses the color differences $X-G_a$ and $X^\wedge-G_a$ shown in FIG. 29 to calculate the color difference surrounding similarity $Sa(k,l)$ defined as follows.

$$Sa(k,l)=Sa_1(k,l)+Sa_2(k,l)$$

In this case, $Sa_1(k,l)$ denotes a similarity of the color difference $X-G_a$, while $Sa_2(k,l)$ denotes a similarity of the color difference $X^\wedge-G_a$. Specific examples of the similarities are as follows.

$$Sa_1(k, l) =$$
$$\{|(X - G_a)_{k-2,l-2} - (X - G_a)_{k,l}| + |(X - G_a)_{k-2,l+2} - (X - G_a)_{k,l}| +$$
$$|(X - G_a)_{k+2,l-2} - (X - G_a)_{k,l}| +$$
$$|(X - G_a)_{k+2,l+2} - (X - G_a)_{k,l}|\} + Wa_{xc} +$$
$$\{|(X - G_a)_{k,l-2} - (X - G_a)_{k,l}| + |(X - G_a)_{k+2,l} - (X - G_a)_{k,l}| +$$
$$|(X - G_a)_{k,l+2} - (X - G_a)_{k,l}| +$$
$$|(X - G_a)_{k-2,l} - (X - G_a)_{k,l}|\} \times Wa_{xa}$$

$$Sa_2(k, l) = \{|X^\wedge - G_a)_{k-1,l-1} - (X - G_a)_{k+1,l+1}| +$$
$$|(X^\wedge - G_a)_{k-1,l+1} - (X^\wedge - G_a)_{k+1,l-1}|\} \times Wa_{x^\wedge}$$

Weights $Wa_{xc}$, $Wa_{xa}$, and $Wa_{x^\wedge}$ used for calculating the similarities are in a relationship of $$4 \times Wa_{xc} + 4 \times Wa_{xa} = 2 \times Wa_{x^\wedge} = W$$

therefore $$2 \times (Wa_{xc} + Wa_{xa}) = Wa_{x^\wedge}.$$

In the first formula, W on the right side denotes a weight with respect to the entire formula.

The calculated color difference surrounding similarity $Sa(k,l)$ denotes an amount of the degree of similarity of the color difference $X-G_a$ and the color difference $X^\wedge-G_a$ regardless of the direction around the G signal missing position $(k,l)$.

FIG. 30 shows $X-G_d$ or $X^\wedge-G_d$ of a 5×5 pixel area calculated using $G_d$ obtained by interpolation based on surrounding twelve pixel G signals of a G signal missing position. As described above, if $X=R$, then $X^\wedge=B$. If $X=B$, then $X^\wedge=R$.

The surrounding similarity calculating unit 1905 uses the color differences $X-G_d$ and $X^\wedge-G_d$ shown in FIG. 30 to calculate color difference surrounding similarity $Sd(k,l)$ defined as follows.

$$Sd(k, l) = \begin{cases} Sd_{slash}(k, l) \times 2 & (\text{if } Sd_{slash}(k, l) < Sd_{backslash}(k, l)) \\ Sd_{backslash}(k, l) \times 2 & (\text{if } Sd_{slash}(k, l) \geq Sd_{backslash}(k, l)) \end{cases}$$

In this case, $Sd_{slash}(k,l)$ and $Sd_{backslash}(k,l)$ are calculated as follows.

$$Sd_{slash}(k,l)=Sd_{slash1}(k,l)+Sd_{slash2}(k,l)$$

$$Sd_{backslash}(k,l)=Sd_{backslash1}(k,l)+Sd_{backslash2}(k,l)$$

In this case, $Sd_{slash1}(k,l)$ and $Sd_{backslash1}(k,l)$ denote the similarity of the color difference $X-G_d$, while $Sd_{slash2}(k,l)$ and $Sd_{backslash2}(k,l)$ denote the similarity of the color difference $X^\wedge-G_d$. Specific examples of the similarities are as follows.

$$Sd_{slash1}(k, l) =$$
$$\{|(X - G_d)_{k+2,l-2} - (X - G_d)_{k,l}| + |(X - G_d)_{k-2,l+2} - (X - G_d)_{k,l}| \times Wd_{xc} +$$
$$\{|(X - G_d)_{k,l-2} - (X - G_d)_{k-2,l}| + |(X - G_d)_{k,l+2} - (X - G_d)_{k+2,l}|\} \times$$
$$Wd_{xa}$$

$$Sd_{slash2}(k, l) = |(X^\wedge - G_d)_{k-1,l+1} - (X^\wedge - G_d)_{k+1,l-1}| \times Wd_{x^\wedge}$$

$$Sd_{backslash1}(k, l) =$$
$$\{|(X - G_d)_{k-2,l-2} - (X - G_d)_{k,l}| + |(X - G_d)_{k+2,l+2} - (X - G_d)_{k,l}| \times$$
$$Wd_{xc} + \{|(X - G_d)_{k+2,l} - (X - G_d)_{k,l-2}| +$$
$$|(X - G_d)_{k-2,l} - (X - G_d)_{k,l+2}|\} \times Wd_{xa}$$

$$Sd_{backslash2}(k, l) = |(X^\wedge - G_d)_{k-1,l-1} - (X^\wedge - G_d)_{k+1,l+1}| \times Wd_{x^\wedge}$$

Weights $Wd_{xc}$, $Wd_{xa}$, and $Wd_{x^\wedge}$ used for calculating the similarities are in a relationship of $$2 \times Wd_{xc} + 2 \times Wd_{xa} = Wd_{x^\wedge} = W$$

therefore $$2 \times (Wd_{xc} + Wd_{xa}) = Wd_{x^\wedge}.$$

In the first formula, W on the right side denotes a weight with respect to the entire formula.

The calculated color difference surrounding similarity Sd(k,l) denotes an amount of the degree of similarity of the color difference $X-G_d$ and the color difference $X^\wedge-G_d$ in either one of the diagonal directions (diagonal direction from lower left to upper right or diagonal direction from upper left to lower right) around the G signal missing position (k,l).

The color difference surrounding similarities Sv, Sh, Sa, and Sd calculated based on the definitions can directly replace the color difference surrounding similarities used in the first to fourth embodiments, and the subsequent processes by the determining units 218 and 1906 are also the same.

The difference between the color difference surrounding similarities shown in the first to fourth embodiments and the color difference surrounding similarity shown in the fifth embodiment is that not only one of the color differences X–G, but also the other color difference X^–G is used. The difference will be conceptually described with reference to FIGS. 31 to 34.

FIGS. 31 to 34 are diagrams plotting the color difference $X-G_t$ or $X^\wedge-G_t$ calculated in accordance with the interpolation type t of the G signal missing positions in a surrounding local area (for example, 5×5 pixel area) of the G signal missing position (k,l) in a two-dimensional color difference space (color difference space with one of the coordinate axes being $R-G_t$ and the other being $B-G_t$, where t=v, h, a, and d).

Only one of the color differences (color differences using G signals obtained by interpolation) $X-G_t$ and $X^\wedge-G_t$ (i.e, either $R-G_t$ or $B-G_t$) can be obtained for a G signal missing position. Therefore, the color difference cannot be directly plotted in the two-dimensional color difference space. The color difference can only be plotted on one of the coordinate axes. Parts with thick lines of FIGS. 31 to 34 illustrate the range of the color difference plotted on the coordinate axis. For example, in the example shown in FIG. 31, $R-G_v$ is distributed on the thick line part of width shown with $\Delta(R-G_v)$ on the $R-G_v$ axis, while $B-G_v$ is distributed on the thick line part of width shown with $\Delta(B-G_v)$ on the $B-G_v$ axis.

The width $\Delta(R-G_t)$ or $\Delta(B-G_t)$ of plot points distributed on a thick line of each coordinate axis is an amount corresponding to the difference absolute value sum $S_{t1}$ or $S_{t2}$ of the surrounding similarity. To be exact, the width and the difference absolute value sum are different, but can be conceptually assumed the same.

In the example shown in FIGS. 31 to 34, it is assumed that, in relation to $\Delta(R-G_t)$, $$\Delta(R-G_v)=\Delta(R-G_h)=\Delta(R-G_a)<\Delta(R-G_d)$$

and in relation to $\Delta(B-G_t)$, $$\Delta(B-G_h)<\Delta(B-G_a)=\Delta(B-G_d)<\Delta(B-G_v)$$

Under the conditions, if a surrounding color difference similarity as described in the first to fourth embodiments is used, $R-G_a$ is selected as a color difference of an R pixel position, while $B-G_h$ is selected as a color difference of an adjacent B pixel position. In that case, the interpolation method of G signal missing position is switched pixel by pixel in the diagonal direction. It is assumed herein, for example, that a horizontal stripe pattern with high spatial frequency exists in the vertical direction as shown in FIG. 35 (the hatch shown in FIG. 35 illustrates only a brightness change of a G signal bandwidth formed near a certain position (k,l) on the image pickup device) in a determination area where the conditions are met. Even in that case, according to the technique of the first to fourth embodiments, the G interpolation value of the position of R pixel (G signal missing position) is the interpolation $G_a$ based on the surrounding four G pixels, in which the G pixels above and below are taken into consideration and averaged. Therefore, the value is significantly different from the G pixels left and right of the R pixel. Thus, the G pixel values significantly changes pixel by pixel (in two pixel cycle) in a row where the R pixel exists. Meanwhile, the G interpolation value of the position of B pixel (G signal missing position) is an average value $G_h$ using only the pixels in the horizontal direction. Therefore, a high-frequency pixel value change in a direction perpendicular to the horizontal stripes does not occur. As a result, in the technique described in the first to fourth embodiments, a checked pattern emerges in relation to the G signals as shown in FIG. 36 (the hatch shown in FIG. 36 illustrates a brightness change of G signals after the interpolation of the G signal missing position using the interpolation type t after picking up an image) in a horizontal stripe pattern area as shown in FIG. 35. This causes generation of false color.

On the other hand, the surrounding color difference similarities described in the fifth embodiment corresponds to $\Delta(R-G_t)+\Delta(B-G_t)$. When the surrounding color difference similarities are applied to the case of FIGS. 31 to 34, the relationship of the dimensions of the surrounding color difference similarities is as follows.

$$\Delta(R-G_h)+\Delta(B-G_h)<\Delta(R-G_a)+\Delta(B-G_a)<\ldots$$

Thus, when the surrounding color difference similarities illustrated in the fifth embodiment are used, $R-G_h$ is selected as the color difference of the R pixel position, while $B-G_h$ is selected as the color difference of the adjacent B pixel position. Therefore, the G interpolation types t in the local area are the same, and the frequent switching of the G interpolation type t can be prevented. Even if a horizontal stripe pattern with high spatial frequency exists in the local area, the horizontal stripe pattern can be reproduced with high accuracy, and the pattern is not changed to the checked pattern as shown in FIG. 36.

Referring to the distribution shown with thick line parts on the axes shown in FIGS. 31 to 34, it can be estimated that the color difference of the surrounding local area of the G signal missing position is distributed in an area hatched with dotted lines in FIGS. 31 to 34, i.e. an area where the width of $\Delta(R-G_t)$ and the width of $\Delta(B-G_t)$ cross. This is because if a missing color difference $(X^\wedge-G_t)_{k,l}$ is interpolated using a surrounding same-type color difference with respect to a color difference $(X-G_t)_{k,l}$ obtained at each G signal missing position (k,l) to calculate a color difference space coordinate $\{(R-G_t)_{k,l}, (B-G_t)_{k,l}\}$ formed of two color difference in each G signal missing position, plotting in the two-dimensional color difference space becomes possible. In that case, assuming that the frequency of the calculated color difference is not spatially high, it can be presumed that the color difference space coordinate value is distributed in an area hatched with dotted lines.

As a result, selecting an optimal color difference is substantially equivalent to selecting a color difference calculated based on a G interpolation type t that makes the area of the area hatched with dotted lines in FIGS. 31 to 34 the smallest. The fifth embodiment illustrates a technique for selecting an optimal color difference, in which the sum of the distribution amounts on two coordinate axes is used as a determination parameter (however, from the perspective of area, the product of the distribution amounts can be used as a determination parameter). On the other hand, the techniques illustrated in the first to fourth embodiments use only a distribution amount on one coordinate axis as a determination parameter.

Although the calculation area of the color difference surrounding similarity is a 5×5 pixel area in the above description, the arrangement is not limited to this. Obviously, a larger N×N pixel (N is an odd number) area can be used. For example, if the calculation area of the color difference surrounding similarity is a 7×7 pixel area, the color difference surrounding similarities can be calculated as follows.

$$Sv_1(k, l) = \{|(X - G_v)_{k,l-2} - (X - G_v)_{k,l}| + |(X - G_v)_{k,l+2} - (X - G_v)_{k,l}|\} \times Wv_{xc} + \{|(X - G_v)_{k-2,l-2} - (X - G_v)_{k-2,l}| + |(X - G_v)_{k-2,l+2} - (X - G_v)_{k-2,l}| + |(X - G_v)_{k+2,l-2} - (X - G_v)_{k+2,l}| + |(X - G_v)_{k+2,l+2} - (X - G_v)_{k+2,l}|\} \times Wv_{xa}$$

$$Sv_2(k, l) = \{|(X^\wedge - G_v)_{k-1,l-1} - (X^\wedge - G_v)_{k-1,l+1}| + |(X^\wedge - G_v)_{k+1,l-1} - (X^\wedge - G_v)_{k+1,l+1}|\} \times Wv_{x^\wedge c} + \{|(X^\wedge - G_v)_{k-1,l-3} - (X^\wedge - G_v)_{k-1,l-1}| + |(X^\wedge - G_v)_{k-1,l+3} - (X^\wedge - G_v)_{k-1,l+1}| + |(X^\wedge - G_v)_{k+1,l-3} - (X^\wedge - G_v)_{k+1,l-1}| + |(X^\wedge - G_v)_{k+1,l+3} - (X^\wedge - G_v)_{k+1,l+1}|\} \times Wv_{x^\wedge a}$$

$$Sh_1(k, l) = \{|(X - G_h)_{k-2,l} - (X - G_h)_{k,l}| + |(X - G_h)_{k+2,l} - (X - G_h)_{k,l}|\} \times Wh_{xc} + \{|(X - G_h)_{k-2,l-2} - (X - G_h)_{k,l-2}| + |(X - G_h)_{k+2,l-2} - (X - G_h)_{k,l-2}| + |(X - G_h)_{k-2,l+2} - (X - G_h)_{k,l+2}| + |(X - G_h)_{k+2,l+2} - (X - G_h)_{k,l+2}|\} \times Wh_{xa}$$

$$Sh_2(k, l) = \{|(X^\wedge - G_h)_{k-1,l-1} - (X^\wedge - G_h)_{k+1,l-1}| + |(X^\wedge - G_h)_{k-1+1} - (X^\wedge - G_h)_{k+1,l+1}|\} \times Wh_{x^\wedge c} + \{|(X^\wedge - G_h)_{k-3,l-1} - (X^\wedge - G_h)_{k-1,l-1}| + \{|(X^\wedge - G_h)_{k-3,l-1} - (X^\wedge - G_h)_{k-1,l-1}| + |(X^\wedge - G_h)_{k+3,l-1} - (X^\wedge - G_h)_{k+1,l-1}| + |(X^\wedge - G_h)_{k-3,l+1} - (X^\wedge - G_h)_{k-1,l+1}| + |(X^\wedge - G_h)_{k+3,l+1} - (X^\wedge - G_h)_{k+1,l+1}|\} \times Wh_{x^\wedge a}$$

$$Sa_1(k, l) = \{|(X - G_a)_{k-2,l-2} - (X - G_a)_{k,l}| + |(X - G_a)_{k-2,l+2} - (X - G_a)_{k,l}| + |(X - G_a)_{k+2,l-2} - (X - G_a)_{k,l}| + |(X - G_a)_{k+2,l+2} - (X - G_a)_{k,1}|\} \times Wa_{xc} + \{|(X - G_a)_{k,l-2} - (X - G_a)_{k,l}| + |(X - G_a)_{k+2,l} - (X - G_a)_{k,l}| + |(X - G_a)_{k,l+2} - (X - G_a)_{k,l}| + |(X - G_a)_{k-2,l} - (X - G_a)_{k,l}|\} \times Wa_{xa}$$

$$Sa_2(k, l) = \{|(X^\wedge - G_a)_{k-1,l-1} - (X^\wedge - G_a)_{k+1,l+1}| + |(X^\wedge - G_a)_{k-1,l+1} - (X^\wedge - G_a)_{k+1,l-1}|\} \times Wa_{x^\wedge c} + \{|(X^\wedge - G_a)_{k-3,l-1} - (X^\wedge - G_a)_{k-1,l-1}| + |(X^\wedge - G_a)_{k-1,l-3} - (X^\wedge - G_a)_{k-1,l-1}| + |(X^\wedge - G_a)_{k+3,l-1} - (X^\wedge - G_a)_{k+1,l-1}| + |(X^\wedge - G_a)_{k+1,l-3} - (X^\wedge - G_a)_{k+1,l-1}| + |(X^\wedge - G_a)_{k-3,l+1} - (X^\wedge - G_a)_{k-1,l+1}| + |(X^\wedge - G_a)_{k-1,l+3} - (X^\wedge - G_a)_{k-1,l+1}| +$$

-continued $$|(X^\wedge - G_a)_{k+3,l+1} - (X^\wedge - G_a)_{k+1,l+1}| + |(X^\wedge - G_a)_{k+1,l+3} - (X^\wedge - G_a)_{k+1,l+1}|\} \times Wa_{x^\wedge a}$$

$$Sd_{slash1}(k, 1) = \{|(X - G_d)_{k+2,l-2} - (X - G_d)_{k,l}| + |(X - G_d)_{k-2,l+2} - (X - G_d)_{k,l}|\} \times Wd_{xc} + \{(X - G_d)_{k,l-2} - (X - G_d)_{k-2,l}| + |(X - G_d)_{k,l+2} - (X - G_d)_{k+2,l}|\} \times Wd_{xa}$$

$$Sd_{slash2}(k, l) = |(X^\wedge - G_d)_{k-1,l-1} - (X^\wedge - G_d)_{k+1,l+1}| \times Wd_{x^\wedge c} + \{|(X^\wedge - G_d)_{k+1,l-3} - (X^\wedge - G_d)_{k-1,l-1}| + |(X^\wedge - G_d)_{k-3,l+1} - (X^\wedge - G_d)_{k-1,l-1}| + |(X^\wedge - G_d)_{k+3,l-1} - (X^\wedge - G_d)_{k+1,l+1}| + |(X^\wedge - G_d)_{k-1,l+3} - (X^\wedge - G_d)_{k+1,l+1}|\} \times Wd_{x^\wedge a}$$

$$Sd_{backslash1}(k, l) = \{|(X - G_d)_{k-2,l-2} - (X - G_d)_{k,l}| + |(X - G_d)_{k+2,l+2} - (X - G_d)_{k,l}|\} \times Wd_{xc} + \{|(X - G_d)_{k+2,l} - (X - G_d)_{k,l-2}| + |(X - G_d)_{k-2,l} - (X - G_d)_{k,l+2}|\} \times Wd_{xa}$$

$$Sd_{backslash2}(k, l) = |(X^\wedge - G_d)_{k-1,l-1} - (X^\wedge - G_d)_{k+1,l+1} \times Wd_{x^\wedge c} + \{|(X^\wedge - G_d)_{k-1,l-3} - (X^\wedge - G_d)_{k+1,l-1}| + |(X^\wedge - G_d)_{k+3,l-1} - (X^\wedge - G_d)_{k+1,l-1}| + |(X^\wedge - G_d)_{k-3,l-1} - (X^\wedge - G_d)_{k-1,l+1}| + |(X^\wedge - G_d)_{k+1,l+3} - (X^\wedge - G_d)_{k-1,l+1}|\} \times Wd_{x^\wedge a}$$

The conditions of the weights are $$2 \times Wv_{xc} + 4 \times Wv_{xa} = 2 \times Wv_{x^\wedge c} + 4 \times Wv_{x^\wedge a} = W$$

$$2 \times Wh_{xc} + 4 \times Wh_{xa} = 2 \times Wh_{x^\wedge c} + 4 \times Wh_{x^\wedge a} = W$$

$$4 \times Wa_{xc} + 4 \times Wa_{xa} = 2 \times Wa_{x^\wedge c} + 8 \times Wa_{x^\wedge a} = W$$

$$2 \times Wd_{xc} + 2 \times Wd_{xa} = Wd_{x^\wedge c} + 4 \times Wd_{x^\wedge a} = W$$

thus, $$Wv_{xc} + 2 \times Wv_{xa} = Wv_{x^\wedge c} + 2 \times Wv_{x^\wedge a}$$

$$Wh_{xc} + 2 \times Wh_{xa} = Wh_{x^\wedge c} + 2 \times Wh_{x^\wedge a}$$

$$2 \times (Wa_{xc} + Wa_{xa}) = Wa_{x^\wedge c} + 4 \times Wa_{x^\wedge a}$$

$$2 \times (Wd_{xc} + Wd_{xa}) = Wd_{x^\wedge c} + 4 \times Wd_{x^\wedge a}$$

In the first formula, W on the right side denotes a weight with respect to the entire formula.

According to the fifth embodiment, the color difference surrounding similarity is calculated based on both of the surrounding similarity related to the color difference X−$G_v$ and the surrounding similarity related to the color difference X^−G. Therefore, determination errors (state of a color difference surrounding similarity of G signal interpolated not along the edge direction of image being selected) of the color difference surrounding similarities in relation to the pixel value change in an arbitrary spatial frequency in a calculation area of color difference surrounding similarity can be further prevented. As a result, generation of false color can be further prevented.

Although the image processing apparatus that generates a color image with sampling positions where RGB pixels coincide from an RGB Bayer array image has been mainly described in the above embodiments, an image processing method for executing the same processes may be applied to a general-purpose processing circuit or the like, or a computer may execute an image processing program recorded in a computer-readable recording medium to perform the same processes.

According to the above embodiments, an image picked up by a single-plate image pickup device with a plurality of color filters being arranged at spatially different positions can be formed into a high-quality color image in which generation of false color, resolution reduction, and chroma reduction in the interpolation process of missing color signals are sufficiently suppressed.

The present invention is not limited to the embodiments described above, but can be embodied by modifying constituent elements upon implementation without departing from the scope of the present invention. Appropriate combinations of a plurality of constituent elements disclosed in the above embodiments make it possible to form various inventions. For example, some of the constituent elements shown in the embodiments may be removed. Furthermore, constituent elements across different embodiments may be appropriately combined. Therefore, it is obvious that various changes and applications can be made without departing from the scope of the invention.

What is claimed is:

1. An image processing apparatus that generates a color image with sampling positions where RGB pixels coincide from an RGB Bayer array image in which a sampling density of G (green) pixels is higher than a sampling density of R (red) pixels and a sampling density of B (blue) pixels and in which the sampling positions of the pixels are different, the image processing apparatus comprising:

interpolation candidate calculating means for calculating M types (M is an integer 2 or more) of G interpolation candidates $G_t(x_0,y_0)$ (t=1, ..., M) for $X(x_0,y_0)$ when a position on the RGB Bayer array image is expressed by (x,y) (x is an integer indicative of a pixel position in a horizontal direction, while y is an integer indicative of a pixel position in a vertical direction), and an R pixel or a B pixel of a G pixel missing position $(x_0,y_0)$ is defined as $X(x_0,y_0)$;

color difference candidate calculating means for calculating a plurality of types of color difference candidates $X(x_0,y_0)-G_t(x_0,y_0)$ based on the calculated M types of G interpolation candidates $G_t(x_0,y_0)$; and optimal color differences selecting means for calculating M types of color difference similarities, based on a plurality of color difference candidates $X(x_0+n,y_0+m)-G_t(x_0+n,y_0+m)$ of X that are calculated for the surrounding positions $(x_0+n,y_0+m)$ based on G interpolation candidates $G_t(x_0+n,y_0+m)$ that are the same type t as the G interpolation candidates $G_t(x_0,y_0)$ used to calculate the color difference candidates $X(x_0,y_0)-G_t(x_0,y_0)$ and that are calculated at surrounding positions $(x_0+n,y_0+m)$ (n and m are arbitrary integers that are not 0 at the same time), and based on the color difference candidates $X(x_0,y_0)-G_t(x_0,y_0)$ and for selecting, as a color difference, based on the calculated M types of color differences similarities, a color difference candidate $X(x_0,y_0)-G_p(x_0,y_0)(1 \leq p \leq M)$ calculated based on a G interpolation candidate $G_p(x_0,y_0)$ among the M types of G interpolation candidates $G_t(x_0,y_0)$.

2. The image processing apparatus according to claim 1, wherein
   the optimal color difference selecting means calculates the color difference similarities based on similarities between the color difference candidates $X(x_0,y_0)-G_t(x_0,y_0)$ and color difference candidates $X(x_0+n,y_0+m)-G_t(x_0+n,y_0+m)$ of the same color X of the color difference candidates $X(x_0,y_0)-G_t(x_0,y_0)$.

3. The image processing apparatus according to claim 2, wherein
   the optimal color difference selecting means includes G interpolation value outputting means for outputting a G interpolation candidate $G_p(x_0,y_0)$ corresponding to the selected color difference candidate $X(x_0,y_0)-G_p(x_0,y_0)$ as a G pixel value of the position $(x_0,y_0)$.

4. The image processing apparatus according to claim 3, further comprising:
   color difference interpolating means for applying a process of interpolating a color difference of a position in which the color difference is not calculated by the optimal color difference selecting means based on the color difference of the same color around the position calculated by the optimal color difference selecting means to a color difference of R pixel and a color difference of B pixel when the position is a G pixel on the RGB Bayer array image, to a color difference of B pixel when the position is an R pixel on the RGB Bayer array image, and to a color difference of R pixel when the position is a B pixel on the RGB Bayer array image; and
   RGB pixel calculating means for calculating an R pixel, a G pixel, and a B pixel based on the color difference calculated by the optimal color difference selecting means or the color difference interpolating means and a G pixel at the same position as the color difference.

5. The image processing apparatus according to claim 2, wherein
   the interpolation candidate calculating means comprises:
   first interpolation calculating means for calculating an average of two G pixels adjacent above and below the X pixel as one type of G interpolation candidate among the M types of G interpolation candidates;
   second interpolation calculating means for calculating an average of two G pixels adjacent left and right of the X pixel as one type of G interpolation candidate among the M types of G interpolation candidates; and
   third interpolation calculating means for calculating an average of four G pixels adjacent above, below, left, and right of the X pixel as one type of G interpolation candidate among the M types of G interpolation candidates.

6. The image processing apparatus according to claim 5, wherein
   the interpolation candidate calculating means further comprises
   fourth interpolation calculating means for using twelve G pixels $G(x_0-1, y_0)$, $G(x_0+1, y_0)$, $G(x_0, y_0-1)$, $G(x_0, y_0+1)$, $G(x_0-2, y_0-1)$, $G(x_0-2, y_0+1)$, $G(x_0+2, y_0-1)$, $G(x_0+2, y_0+1)$, $G(x_0-1,y_0-2)$, $G(x_0-1, y_0+2)$, $G(x_0+1, y_0-2)$, $G(x_0+1, y_0+2)$] located near the $X(x_0,y_0)$ to calculate one type of G interpolation candidate $G_t(x_0,y_0)$ among the M types of G interpolation candidates based on the following formula $$G_t(x_0, y_0) = \{G(x_0-1, y_0) + G(x_0+1, y_0) + G(x_0, y_0-1) + G(x_0, y_0+1)\} \times \alpha - \{G(x_0-2, y_0-1) + G(x_0-2, y_0+1) + G(x_0+2, y_0-1) + G(x_0+2, y_0+1) + G(x_0-1, y_0-2) + G(x_0-1, y_0+2) + G(x_0+1, y_0-2) + G(x_0+1, y_0+2)\} \times \beta$$

($\alpha$ and $\beta$ are arbitrary constants satisfying $\alpha \times 4 - \beta \times 8 = 1$ in which $\alpha > (1/4)$ and $\beta > 0$).

7. The image processing apparatus according to claim 5, wherein
the color difference candidate calculating means includes bandwidth limiting means for calculating a modified pixel $X_L$ in which an X pixel is bandwidth-limited using a surrounding same color X and uses the modified pixel $X_L$ to calculate a color difference candidate based on the G interpolation candidate calculated by the third interpolation calculating means.

8. The image processing apparatus according to claim 5, wherein
the optimal color difference selecting means comprises:
G pixel variation calculating means for calculating a variation of G pixel values around a G pixel missing position to calculate a weighting factor based on the variation; and
multiplying means for multiplying a similarity with the surrounding color difference candidate of the color difference candidate of the G pixel missing position calculated based on the G interpolation candidate calculated by the third interpolation calculating means by the weighting factor.

9. The image processing apparatus according to claim 5, wherein
the optimal color difference selecting means includes selecting means for selecting, as a similarity with the surrounding color difference candidate of the color difference candidate of the G pixel missing position calculated based on the G interpolation candidate calculated by the first interpolation calculating means, a similarity with not a lower similarity between:
a similarity calculated without weighting eight color difference candidates of the same color X and the same type t located closest around the G pixel missing position; and
a similarity calculated by weighting two color difference candidates located above and below among the eight color difference candidates of the same color X and the same type t located closest around the G pixel missing position.

10. The image processing apparatus according to claim 5, wherein
the optimal color difference selecting means includes selecting means for selecting, as a similarity with the surrounding color difference candidate of the color difference candidate of the G pixel missing position calculated based on the G interpolation candidate calculated by the second interpolation calculating means, a similarity with not a lower similarity between:
a similarity calculated without weighting eight color difference candidates of the same color X and the same type t located closest around the G pixel missing position; and
a similarity calculated by weighting two color difference candidates located left and right among the eight color difference candidates of the same color X and the same type t located closest around the G pixel missing position.

11. The image processing apparatus according to claim 2, wherein
the similarity is a difference absolute value sum of a color difference candidate of a G pixel missing position and one or more color difference candidates of the same color X and the same type t located around the G pixel missing position, and
the optimal color difference selecting means includes selecting means for selecting a color difference candidate corresponding to a similarity that provides a minimum value among the M types of similarities and sets the color difference candidate selected by the selecting means as a color difference.

12. The image processing apparatus according to claim 2, further comprising
bandwidth limiting means for calculating $X_L(x_0,y_0)$ in which the $X(x_0,y_0)$ is bandwidth-limited using a surrounding same color X, wherein
the color difference candidate calculating means calculates a plurality of types of color difference candidates $X(x_0,y_0) - G_t(x_0,y_0)$ or $X_L(x_0,y_0) - G_t(x_0,y_0)$ based on calculated M types of G interpolation candidates $G_t(x_0,y_0)$, and
the optimal color difference selecting means selects, as a color difference, based on the similarity, a color difference candidate $X(x_0,y_0) - G_p(x_0,y_0)$ or $X_L(x_0,y_0) - G_q(x_0,y_0)$ ($1 \leq p \leq M$ and $1 \leq q \leq M$) calculated based on a G interpolation candidate $G_p(x_0,y_0)$ or $G_q(x_0,y_0)$ among the M types of G interpolation candidates $G_t(x_0,y_0)$.

13. The image processing apparatus according to claim 12, wherein
the optimal color difference selecting means includes G interpolation value outputting means for outputting a G interpolation candidate $G_p(x_0,y_0)$ or $G_q(x_0,y_0)$ corresponding to the selected color difference candidate $X(x_0,y_0) - G_p(x_0,y_0)$ or $X_L(x_0,y_0) - G_q(x_0,y_0)$ as a G pixel value of the position $(x_0,y_0)$.

14. The image processing apparatus according to claim 13, further comprising:
color difference interpolating means for applying a process of interpolating a color difference of a position in which the color difference is not calculated by the optimal color difference selecting means based on the color difference of the same color around the position calculated by the optimal color difference selecting means to a color difference of R pixel and a color difference of B pixel when the position is a G pixel on the RGB Bayer array image, to a color difference of B pixel when the position is an R pixel on the RGB Bayer array image, and to a color difference of R pixel when the position is a B pixel on the RGB Bayer array image; and
RGB pixel calculating means for calculating an R pixel, a G pixel, and a B pixel based on the color difference calculated by the optimal color difference selecting means or the color difference interpolating means and a G pixel at the same position as the color difference.

15. The image processing apparatus according to claim 12, wherein
the interpolation candidate calculating means comprises:
first interpolation calculating means for calculating an average of two G pixels adjacent above and below the X pixel as one type of G interpolation candidate among the M types of G interpolation candidates;
second interpolation calculating means for calculating an average of two G pixels adjacent left and right of the X pixel as one type of G interpolation candidate among the M types of G interpolation candidates; and
third interpolation calculating means for calculating an average of four G pixels adjacent above, below, left, and right of the X pixel as one type of G interpolation candidate among the M types of G interpolation candidates.

16. The image processing apparatus according to claim 15, wherein
the interpolation candidate calculating means further comprises fourth interpolation calculating means for using twelve G pixels $G(x_0-1, y_0)$, $G(x_0+1, y_0)$, $G(x_0, y_0-1)$, $G(x_0, y_0+1)$, $G(x_0-2, y_0-1)$, $G(x_0-2, y_0+1)$, $G(x_0+2, y_0-1)$, $G(x_0+2, y_0+1)$, $G(x_0-1, y_0-2)$, $G(x_0-1, y_0+2)$, $G(x_0+1, y_0-2)$, $G(x_0+1, y_0+2)$ located near the $X(x_0, y_0)$ to calculate one type of G interpolation candidate $G_t(x_0, y_0)$ among the M types of G interpolation candidates based on the following formula $$G_t(x_0, y_0) = \{G(x_0-1, y_0) + G(x_0+1, y_0) + G(x_0, y_0-1) + G(x_0, y_0+1)\} \times \alpha - \{G(x_0-2, y_0-1) + G(x_0-2, y_0+1) + G(x_0+2, y_0-1) + G(x_0+2, y_0+1) + G(x_0-1, y_0-2) + G(x_0-1, y_0+2) + G(x_0+1, y_0-2) + G(x_0+1, y_0+2)\} \times \beta$$

($\alpha$ and $\beta$ are arbitrary constants satisfying $\alpha \times 4 - \beta \times 8 = 1$ in which $\alpha > (1/4)$ and $\beta > 0$).

17. The image processing apparatus according to claim 15, wherein
the optimal color difference selecting means comprises:
G pixel variation calculating means for calculating a variation of G pixel values around a G pixel missing position to calculate a weighting factor based on the variation; and
multiplying means for multiplying a similarity with the surrounding color difference candidate of the color difference candidate of the G pixel missing position calculated based on the G interpolation candidate calculated by the third interpolation calculating means by the weighting factor.

18. The image processing apparatus according to claim 15, wherein
the optimal color difference selecting means includes selecting means for selecting, as a similarity with the surrounding color difference candidate of the color difference candidate of the G pixel missing position calculated based on the G interpolation candidate calculated by the first interpolation calculating means, a similarity with not a lower similarity between:
a similarity calculated without weighting eight color difference candidates of the same color X and the same type t located closest around the G pixel missing position; and
a similarity calculated by weighting two color difference candidates located above and below among the eight color difference candidates of the same color X and the same type t located closest around the G pixel missing position.

19. The image processing apparatus according to claim 15, wherein
the optimal color difference selecting means includes selecting means for selecting, as a similarity with the surrounding color difference candidate of the color difference candidate of the G pixel missing position calculated based on the G interpolation candidate calculated by the second interpolation calculating means, a similarity with not a lower similarity between:
a similarity calculated without weighting eight color difference candidates of the same color X and the same type t located closest around the G pixel missing position; and
a similarity calculated by weighting two color difference candidates located left and right among the eight color difference candidates of the same color X and the same type t located closest around the G pixel missing position.

20. The image processing apparatus according to claim 12, wherein
the similarity is a difference absolute value sum of a color difference candidate of a G pixel missing position and one or more color difference candidates of the same color X and the same type t located around the G pixel missing position, and
the optimal color difference selecting means includes selecting means for selecting a color difference candidate corresponding to a similarity that provides a minimum value among the M types of similarities and sets the color difference candidate selected by the selecting means as a color difference.

21. A non-transitory computer-readable recording medium recording an image processing program causing a computer to execute a process of generating a color image with sampling positions where RGB pixels coincide from an RGB Bayer array image in which a sampling density of G (green) pixels is higher than a sampling density of R (red) pixels and a sampling density of B (blue) pixels and in which the sampling positions of the pixels are different, a computer-readable recording medium recording an image processing program causing a computer to execute:
interpolation candidate calculating step of calculating M types (M is an integer 2 or more) of G interpolation candidates $G_t(x_0, y_0)$ ($t=1, \ldots, M$) for $X(x_0, y_0)$ when a position on the RGB Bayer array image is expressed by (x,y) (x is an integer indicative of a pixel position in a horizontal direction, while y is an integer indicative of a pixel position in a vertical direction), and an R pixel or a B pixel of a G pixel missing position $(x_0, y_0)$ is defined as $X(x_0, y_0)$, color difference candidate calculating step of calculating a plurality of types of color difference candidates $X(x_0, y_0) - G_t(x_0, y_0)$ based on the calculated M types of G interpolation candidates $G_t(x_0, y_0)$, and optimal color difference selecting step of calculating M types of color difference similarities, based on a plurality of color difference candidates $X(x_0+n, y_0+m) - G_t(x_0+n, y_0+m)$ of X that are calculated for the surrounding positions $(x_0+n, y_0+m)$ based on G interpolation candidates $G_t(x_0+n, y_0+m)$ that are the same type t as the G interpolation candidates $G_t(x_0, y_0)$ used to calculate the color difference candidates $X(x_0, y_0) - G_t(x_0, y_0)$ and that are calculated at surrounding positions $(x_0+n, y_0+m)$ (n and m are arbitrary integers that are not 0 at the same time), and based on the color difference candidates $X(x_0, y_0) - G_t(x_0, y_0)$ and of selecting, as a color difference, based on the calculated M types of color difference similarities, a color difference candidate $X(x_0, y_0) - G_p(x_0, y_0)$ ($1 \leq p \leq M$) calculated based on a G interpolation candidate $G_p(x_0, y_0)$ among the M types of G interpolation candidates $G_t(x_0, y_0)$.

22. An image processing method for generating a color image with sampling positions where RGB pixels coincide from an RGB Bayer array image in which a sampling density of G (green) pixels is higher than a sampling density of R (red) pixels and a sampling density of B (blue) pixels and in which the sampling positions of the pixels are different, the image processing method comprising:
interpolation candidate calculating step of calculating M types (M is an integer 2 or more) of G interpolation candidates $G_t(x_0, y_0)$ ($t=1, \ldots, M$) for $X(x_0, y_0)$ when a position on the RGB Bayer array image is expressed by (x,y) (x is an integer indicative of a pixel position in a horizontal direction, while y is an integer indicative of a pixel position in a vertical direction), and an R pixel or a B pixel of a G pixel missing position $(x_0,y_0)$ is defined as $X(x_0,y_0)$;

color difference candidate calculating step of calculating a plurality of types of color difference candidates $X(x_0, y_0)-G_t(x_0,y_0)$ based on the calculated M types of G interpolation candidates $G_t(x_0,y_0)$; and optimal color difference selecting step of calculating M types of color difference similarities, based on a plurality of color difference candidates $X(x_0+n,y_0+m)-G_t(x_0+n,y_0+m)$ of X that are calculated for the surrounding positions $(x_0+n,y_0+m)$ based on G interpolation candidates $G_t(x_0+n,y_0+m)$ that are the same type t as the G interpolation candidates $G_t(x_0,y_0)$ used to calculate the color difference candidates $X(x_0,y_0)-G_t(x_0,y_0)$ and that are calculated at surrounding positions $(x_0+n,y_0+m)$ (n and m are arbitrary integers that are not 0 at the same time), and based on the color difference candidates $X(x_0,y_0)-G_t(x_0,y_0)$ and of selecting, as a color difference, based on the calculated M types of color difference similarities, a color difference candidate $X(x_0,y_0)-G_p(x_0,y_0)(1 \leq p \leq M)$ calculated based on a G interpolation candidate $G_p(x_0,y_0)$ among the M types of G interpolation candidates $G_t(x_0,y_0)$.

23. The image processing apparatus according to claim 1, wherein
the optimal color difference selecting means calculates the color difference similarities based on similarities based on the color difference candidates $X(x_0,y_0)-G_t(x_0,y_0)$ and a plurality of color difference candidates $X(x_0+n,y_0+m)-G_t(x_0+n,y_0+m)$ of the same color X of the color difference candidates $X(x_0,y_0)-G_t(x_0,y_0)$ and similarities based on a plurality of color difference candidates $X\hat{}(x_0+n,y_0+m)-G_t(x_0+n,y_0+m)$ in a color $X\hat{}$ different from that of the color difference candidates $X(x_0,y_0)-G_t(x_0,y_0)$.

24. The image processing apparatus according to claim 23, wherein
the optimal color difference selecting means includes G interpolation value outputting means for outputting a G interpolation candidate $G_p(x_0,y_0)$ corresponding to the selected color difference candidate $X(x_0,y_0)-G_p(x_0,y_0)$ as a G pixel value of the position $(x_0,y_0)$.

25. The image processing apparatus according to claim 24, further comprising:
color difference interpolating means for applying a process of interpolating a color difference of a position in which the color difference is not calculated by the optimal color difference selecting means based on the color difference of the same color around the position calculated by the optimal color difference selecting means to a color difference of R pixel and a color difference of B pixel when the position is a G pixel on the RGB Bayer array image, to a color difference of B pixel when the position is an R pixel on the RGB Bayer array image, and to a color difference of R pixel when the position is a B pixel on the RGB Bayer array image; and
RGB pixel calculating means for calculating an R pixel, a G pixel, and a B pixel based on the color difference calculated by the optimal color difference selecting means or the color difference interpolating means and a G pixel at the same position as the color difference.

26. The image processing apparatus according to claim 23, wherein the interpolation candidate calculating means comprises:
first interpolation calculating means for calculating an average of two G pixels adjacent above and below the X pixel as one type of G interpolation candidate among the M types of G interpolation candidates;
second interpolation calculating means for calculating an average of two G pixels adjacent left and right of the X pixel as one type of G interpolation candidate among the M types of G interpolation candidates; and
third interpolation calculating means for calculating an average of four G pixels adjacent above, below, left, and right of the X pixel as one type of G interpolation candidate among the M types of G interpolation candidates.

27. The image processing apparatus according to claim 26, wherein
the interpolation candidate calculating means further comprises fourth interpolation calculating means for using twelve G pixels $G(x_0-1, y_0)$, $G(x_0+1, y_0)$, $G(x_0, y_0-1)$, $G(x_0, y_0+1)$, $G(x_0-2, y_0-1)$, $G(x_0-2, y_0+1)$, $G(x_0+2, y_0-1)$, $G(x_0+2, y_0+1)$, $G(x_0-1, y_0-2)$, $G(x_0-1, y_0+2)$, $G(x_0+1, y_0-2)$, $G(x_0+1, y_0+2)$ located near the $X(x_0,y_0)$ to calculate one type of G interpolation candidate $G_t(x_0, y_0)$ among the M types of G interpolation candidates based on the following formula $$G_t(x_0, y_0) = \{G(x_0-1, y_0) + G(x_0+1, y_0) + G(x_0, y_0-1) + G(x_0, y_0+1)\} \times \alpha - \{G(x_0-2, y_0-1) + G(x_0-2, y_0+1) + G(x_0+2, y_0-1) + G(x_0+2, y_0+1) + G(x_0-1, y_0-2) + G(x_0-1, y_0+2) + G(x_0+1, y_0-2) + G(x_0+1, y_0+2)\} \times \beta$$

($\alpha$ and $\beta$ are arbitrary constants satisfying $\alpha \times 4 - \beta \times 8 = 1$ in which $\alpha > (1/4)$ and $\beta > 0$).

28. The image processing apparatus according to claim 26, wherein
the color difference candidate calculating means includes bandwidth limiting means for calculating a modified pixel $X_L$ in which an X pixel is bandwidth-limited using a surrounding same color X and uses the modified pixel $X_L$ to calculate a color difference candidate based on the G interpolation candidate calculated by the third interpolation calculating means.

29. The image processing apparatus according to claim 26, wherein
the optimal color difference selecting means comprises:
G pixel variation calculating means for calculating a variation of G pixel values around a G pixel missing position to calculate a weighting factor based on the variation; and
multiplying means for multiplying a similarity with the surrounding color difference candidate of the color difference candidate of the G pixel missing position calculated based on the G interpolation candidate calculated by the third interpolation calculating means by the weighting factor.

30. The image processing apparatus according to claim 23, wherein
the similarity is a difference absolute value sum of color difference candidates of the same color X and the same type t, and
the optimal color difference selecting means includes selecting means for selecting a color difference candidate corresponding to a similarity that provides a minimum value among the M types of similarities and sets the color difference candidate selected by the selecting means as a color difference.

31. The image processing apparatus according to claim 23, further comprising
    bandwidth limiting means for calculating $X_L(x_0,y_0)$ in which the $X(x_0,y_0)$ is bandwidth-limited using a surrounding same color X, wherein
    the color difference candidate calculating means calculates a plurality of types of color difference candidates $X(x_0,y_0)-G_t(x_0,y_0)$ or $X_L(x_0,y_0)-G_t(x_0,y_0)$ based on calculated M types of G interpolation candidates $G_t(x_0,y_0)$, and
    the optimal color difference selecting means selects, based on the similarity, a color difference candidate $X(x_0,y_0)-G_p(x_0,y_0)$ or $X_L(x_0,y_0)-G_q(x_0,y_0)$ ($1 \leq p \leq M$ and $1 \leq q \leq M$) calculated based on a G interpolation candidate $G_p(x_0,y_0)$ or $G_q(x_0,y_0)$ among the M types of G interpolation candidates $G_t(x_0,y_0)$ as a color difference.

32. The image processing apparatus according to claim 31, wherein
    the optimal color difference selecting means includes G interpolation value outputting means for outputting a G interpolation candidate $G_p(x_0,y_0)$ or $G_q(x_0,y_0)$ corresponding to the selected color difference candidate $X(x_0,y_0)-G_p(x_0,y_0)$ or $X_L(x_0,y_0)-G_q(x_0,y_0)$ as a G pixel value of the position $(x_0,y_0)$.

33. The image processing apparatus according to claim 32, further comprising:
    color difference interpolating means for applying a process of interpolating a color difference of a position in which the color difference is not calculated by the optimal color difference selecting means based on the color difference of the same color around the position calculated by the optimal color difference selecting means to a color difference of R pixel and a color difference of B pixel when the position is a G pixel on the RGB Bayer array image, to a color difference of B pixel when the position is an R pixel on the RGB Bayer array image, and to a color difference of R pixel when the position is a B pixel on the RGB Bayer array image; and
    RGB pixel calculating means for calculating an R pixel, a G pixel, and a B pixel based on the color difference calculated by the optimal color difference selecting means or the color difference interpolating means and a G pixel at the same position as the color difference.

34. The image processing apparatus according to claim 31, wherein
    the interpolation candidate calculating means comprises:
    first interpolation calculating means for calculating an average of two G pixels adjacent above and below the X pixel as one type of G interpolation candidate among the M types of G interpolation candidates;
    second interpolation calculating means for calculating an average of two G pixels adjacent left and right of the X pixel as one type of G interpolation candidate among the M types of G interpolation candidates; and
    third interpolation calculating means for calculating an average of four G pixels adjacent above, below, left, and right of the X pixel as one type of G interpolation candidate among the M types of G interpolation candidates.

35. The image processing apparatus according to claim 34, wherein
    the interpolation candidate calculating means further comprises
    fourth interpolation calculating means for using twelve G pixels $G(x_0-1, y_0)$, $G(x_0+1, y_0)$, $G(x_0, y_0-1)$, $G(x_0, y_0+1)$, $G(x_0-2, y_0-1)$, $G(x_0-2, y_0+1)$, $G(x_0+2, y_0-1)$, $G(x_0+2, y_0+1)$, $G(x_0-1, y_0-2)$, $G(x_0-1, y_0+2)$, $G(x_0+1, y_0-2)$, $G(x_0+1, y_0+2)$, located near the $X(x_0,y_0)$ to calculate one type of G interpolation candidate $G_t(x_0,y_0)$ among the M types of G interpolation candidates based on the following formula $$G_t(x_0, y_0) = \\
\{G(x_0-1, y_0) + G(x_0+1, y_0) + G(x_0, y_0-1) + G(x_0, y_0+1)\} \times \alpha - \\
\{G(x_0-2, y_0-1) + G(x_0-2, y_0+1) + G(x_0+2, y_0-1) + \\
G(x_0+2, y_0+1) + G(x_0-1, y_0-2) + G(x_0-1, y_0+2) + \\
G(x_0+1, y_0-2) + G(x_0+1, y_0+2)\} \times \beta$$

($\alpha$ and $\beta$ are arbitrary constants satisfying $\alpha \times 4 - \beta \times 8 = 1$ in which $\alpha > (1/4)$ and $\beta > 0$).

36. The image processing apparatus according to claim 34, wherein
    the optimal color difference selecting means comprises:
    G pixel variation calculating means for calculating a variation of G pixel values around a G pixel missing position to calculate a weighting factor based on the variation; and
    multiplying means for multiplying a similarity with the surrounding color difference candidate of the color difference candidate of the G pixel missing position calculated based on the G interpolation candidate calculated by the third interpolation calculating means by the weighting factor.

37. The image processing apparatus according to claim 31, wherein
    the similarity is a difference absolute value sum of color difference candidates of the same color X and the same type, and
    the optimal color difference selecting means includes selecting means for selecting a color difference candidate corresponding to a similarity that provides a minimum value among the M types of similarities and sets the color difference candidate selected by the selecting means as a color difference.

* * * * *